(12) United States Patent
Higashi et al.

(10) Patent No.: US 12,410,277 B2
(45) Date of Patent: Sep. 9, 2025

(54) BLOCK POLYISOCYANATE COMPOSITION, RESIN COMPOSITION, RESIN FILM AND LAYERED BODY

(71) Applicant: ASAHI KASEI KABUSHIKI KAISHA, Tokyo (JP)

(72) Inventors: Masatsugu Higashi, Tokyo (JP); Tomoharu Yoshinuma, Tokyo (JP); Masakazu Yamauchi, Tokyo (JP); Misa Horinouchi, Tokyo (JP); Kie Shinomiya, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 17/913,598

(22) PCT Filed: May 14, 2021

(86) PCT No.: PCT/JP2021/018426
§ 371 (c)(1),
(2) Date: Sep. 22, 2022

(87) PCT Pub. No.: WO2021/230352
PCT Pub. Date: Nov. 18, 2021

(65) Prior Publication Data
US 2023/0151137 A1 May 18, 2023

(30) Foreign Application Priority Data

May 15, 2020 (JP) .................... 2020-085957
Nov. 13, 2020 (JP) .................... 2020-189538

(51) Int. Cl.
| | | |
|---|---|---|
| C08G 18/80 | (2006.01) | |
| C08G 18/42 | (2006.01) | |
| C08G 18/73 | (2006.01) | |
| C08J 5/18 | (2006.01) | |

(52) U.S. Cl.
CPC ..... *C08G 18/8096* (2013.01); *C08G 18/4277* (2013.01); *C08G 18/73* (2013.01); *C08G 18/807* (2013.01); *C08J 5/18* (2013.01); *C08J 2375/12* (2013.01)

(58) Field of Classification Search
CPC ........... C08G 18/8096; C08G 18/4277; C08G 18/73; C08G 18/807
See application file for complete search history.

(56) References Cited

U.S. PATENT DOCUMENTS

| | | |
|---|---|---|
| 4,240,943 A | 12/1980 | Sugawara et al. |
| 4,345,057 A | 8/1982 | Yamabe et al. |
| 4,518,522 A | 5/1985 | Markusch et al. |
| 4,640,966 A | 2/1987 | Mitani et al. |
| 4,677,180 A | 6/1987 | Schmitt et al. |
| 5,239,028 A | 8/1993 | Nakagawa et al. |
| 5,621,063 A | 4/1997 | Wolf et al. |
| 6,274,693 B1 | 8/2001 | Poth et al. |
| 6,288,198 B1 | 9/2001 | Mechtel et al. |
| 2002/0165335 A1 | 11/2002 | Kobata et al. |
| 2006/0276611 A1 | 12/2006 | Katamura et al. |
| 2012/0316291 A1 | 12/2012 | Yamauchi et al. |
| 2014/0031484 A1 | 1/2014 | Kobata et al. |
| 2015/0056376 A1 | 2/2015 | Ishikura et al. |
| 2018/0230326 A1 | 8/2018 | Hase et al. |
| 2020/0308338 A1 | 10/2020 | Tanaka et al. |
| 2022/0372327 A1 | 11/2022 | Tomizawa |

FOREIGN PATENT DOCUMENTS

| | | | |
|---|---|---|---|
| CN | 102753596 A | | 10/2012 |
| CN | 112300364 A | | 2/2021 |
| EP | 3 348 593 A1 | | 7/2018 |
| EP | 3 689 936 A1 | | 8/2020 |
| EP | 3 771 720 A1 | | 2/2021 |
| JP | 57-034107 A | | 2/1982 |
| JP | 61-275311 A | | 12/1986 |
| JP | 01-261409 A | | 10/1989 |
| JP | 03-006273 A | | 1/1991 |
| JP | 11-130728 A | | 5/1999 |
| JP | 2000-169793 A | | 6/2000 |
| JP | 2001-521956 A | | 11/2001 |
| JP | 2002-322238 A | | 11/2002 |
| JP | 2004-025046 A | | 1/2004 |
| JP | 2006-199795 A | | 8/2006 |
| JP | 2006-335954 A | | 12/2006 |
| JP | 2010-280778 A | | 12/2010 |
| JP | 2011256217 A | * | 12/2011 |
| JP | 2013006935 A | * | 1/2013 |
| JP | 2013032480 A | * | 2/2013 |
| JP | 2016-112522 A | | 6/2016 |

(Continued)

OTHER PUBLICATIONS

[NPL-1] Kakiuchi et al. (JP 2013-032480 A), Feb. 14, 2013 (EPO machine translation to English). (Year: 2013).*
[NPL-2] Eiko et al. (WO 2019/065890 A1); Apr. 4, 2019 (EPO machine translation to English). (Year: 2019).*
[NPL-3] Itamochi et al. (JP 2011-256217 A); Dec. 22, 2011 (Google Patents machine translation to English). (Year: 2011).*
[NPL-4] Yamauchi (JP 2013-006935 A); Jan. 10, 2013 (EPO machine translation to English). (Year: 2013).*
[NPL-5] Fukuchi et al. (JP 2018-035296 A); Mar. 8, 2018 (EPO machine translation to English). (Year: 2018).*

(Continued)

*Primary Examiner* — Donald M Flores, Jr.
(74) *Attorney, Agent, or Firm* — GREENBLUM & BERNSTEIN P.L.C.

(57) ABSTRACT

This blocked polyisocyanate composition contains a block polyisocyanate derived from one or more diisocyanates, an active hydrogen compound, and a blocking agent containing a malonic acid ester. The active hydrogen compound has a number-average molecular weight of 60 to 5,000 and an average of 1.6 to 2.4 functional groups.

28 Claims, No Drawings

(56) References Cited

FOREIGN PATENT DOCUMENTS

| | | | | |
|---|---|---|---|---|
| JP | 2018035296 A | * | 3/2018 | |
| JP | 2018-130673 A | | 8/2018 | |
| WO | 2012/137881 A1 | | 10/2012 | |
| WO | WO-2019065890 A1 | * | 4/2019 | ............ C08G 18/10 |
| WO | 2019/102925 A1 | | 5/2019 | |
| WO | 2021/084805 A1 | | 5/2021 | |

OTHER PUBLICATIONS

EESR issued in EP Patent Application No. 21804131.7. Oct. 2, 2023.
ISR and Written Opinion issued in International Patent Application No. PCT/JP2021/018426, Jul. 6, 2021, translation.
IPRP issued in International Patent Application No. PCT/JP2021/018426, Nov. 15, 2022, translation.
Search Report issued in EP Patent Application No. 24156888.0, Jun. 17, 2024.

* cited by examiner

BLOCK POLYISOCYANATE COMPOSITION, RESIN COMPOSITION, RESIN FILM AND LAYERED BODY

TECHNICAL FIELD

The present invention relates to a blocked polyisocyanate composition, a resin composition, a resin film and a layered body.

The present invention claims priority on the basis of Japanese Patent Application No. 2020-085957 filed in Japan on May 15, 2020, and Japanese Patent Application No. 2020-189538 filed in Japan on Nov. 13, 2020, the contents of which are incorporated herein by reference.

BACKGROUND OF THE INVENTION

A polyurethane resin coating material conventionally has particularly excellent abrasion resistance, chemical resistance and contamination resistance. Particularly, a polyurethane resin coating material using a polyisocyanate obtained from either an aliphatic diisocyanate or an alicyclic diisocyanate has further excellent weather resistance, and the demand therefor has tended to increase. However, a polyurethane resin coating material is generally used as a two-component composition, and therefore the use thereof is extremely inconvenient. Namely, a conventionally-used polyurethane resin coating material is composed of two components, that is, polyol and polyisocyanate, and there is a need to store the polyol and the polyisocyanate separately and to mix them when used to be coated. In addition, there is a problem in that once the polyol and the polyisocyanate are mixed, the coating material gels for a short time and cannot be used. Such a problem makes it extremely difficult to use the polyurethane resin coating material to conduct automatic coating in a field in which line coating, such as automobile coating or weak electrical coating, is conducted. In addition, since an isocyanate readily reacts with water, the isocyanate cannot be used in an aqueous coating material such as an electrodeposition coating material. In addition, in the case where a coating material containing an isocyanate is used, there is a need to sufficiently wash a coating device and a coating tank after the end of the operation, and therefore the operating efficiency significantly deteriorates.

In order to solve the above-mentioned problems, it has been proposed in the past to use a blocked polyisocyanate formed by blocking all active isocyanate groups by a blocking agent. The blocked polyisocyanate does not react with polyols at ordinary temperature. However, the blocking agent dissociates by heating, and active isocyanate groups regenerate and react with polyols, thereby causing a cross-linking reaction, and thus the above-mentioned problems are ameliorated. Accordingly, numerous blocking agents have been studied, and representative examples of the blocking agent include phenol and methylethylketoxime.

However, in the case where a blocked polyisocyanate obtained using such a blocking agent is used, a baking procedure at a high temperature of 140° C. or more is generally needed. The need for such a high-temperature baking procedure is not only disadvantageous from an energy use perspective, but also requires heat resistance of a substrate, which becomes a factor that limits the application thereof.

In contrast, a blocked polyisocyanate using an active methylene-based compound such as acetoacetic acid ester or malonic acid diester has been studied as a blocked polyisocyanate that can be baked at a low-temperature. For example, blocked polyisocyanate compositions that are cured at 90° C. have been proposed in Patent Documents 1 and 2.

DOCUMENTS OF RELATED ART

Patent Documents

Patent Document 1: Japanese Patent Application, First Publication No. 2002-322238
Patent Document 2: Japanese Patent Application, First Publication No. 2006-335954

SUMMARY OF THE INVENTION

Problems to be Solved by the Invention

However, the protection of the global environment and the adaptation to plastic having a low heat resistance have been strongly demanded and a blocked polyisocyanate composition that can be cured at a temperature lower than 90° C. has been desired in recent years. Under such circumstances, no compositions that exhibit favorable dispersibility in a polyvalent polyol (aqueous polyol, water dispersible polyol) having a hydroxy group when mixed therewith, do not cause gelation or excessive viscosity-increase when stored, do not deteriorate curability after storage, exhibit favorable curability at 90° C. or lower, alternatively at 80° C. or lower, and realize excellent hardness and strength of the resultant coating film obtained by curing at the temperature have been known yet.

The present invention has been made in view of the aforementioned circumstances, and provides a blocked polyisocyanate composition that exhibits favorable storage stability when made into a resin composition, and exhibits excellent curability at a low temperature of about 80° C. or 85° C., hardness, strength and solvent resistance, when made into a coating film, as well as a resin composition, a resin film and a layered body using the blocked polyisocyanate composition.

Means to Solve the Problems

The present invention includes the following aspects.
(1) A blocked polyisocyanate composition containing a blocked polyisocyanate derived from at least one diisocyanate, an active hydrogen compound and a blocking agent containing a malonic acid ester, wherein the active hydrogen compound has both a number-average molecular weight of 60 to 5,000 and an average number of functional groups of 1.6 to 2.4.
(2) A blocked polyisocyanate composition containing a blocked polyisocyanate derived from an active hydrogen compound, a polyisocyanate and a blocking agent containing a malonic acid ester, wherein the active hydrogen compound has both a number-average molecular weight of 60 to 5,000 and an average number of functional groups of 1.6 to 2.4.
(3) A blocked polyisocyanate composition according to (1) or (2), wherein the active hydrogen compound is a polyol A.
(4) The blocked polyisocyanate composition according to (3), wherein the polyol A is at least one polyol selected from the group consisting of 1,4-butanediol, 1,6-hexanediol, 3-methyl-1,5-pentanediol, 1,4-cyclohexanedimethanol, glycerol, and polycaprolactone polyols derived therefrom with ε-caprolactone.

(5) The blocked polyisocyanate composition according to any one of (2) to (4), wherein the amount of a constitution unit derived from the active hydrogen compound relative to 100 parts by mass of a constitution unit derived from the polyisocyanate is 0.05 parts by mass to 10 parts by mass.

(6) The blocked polyisocyanate composition according to any one of (2) to (5), wherein the polyisocyanate has an average number of isocyanate groups of 3.5 or more, has an isocyanurate group, and is a polyisocyanate derived from at least one diisocyanate selected from the group consisting of aliphatic diisocyanates and alicyclic diisocyanates.

(7) The blocked polyisocyanate composition according to any one of (2) to (5), wherein the polyisocyanate is derived from a diisocyanate and a polyol B having an average number of functional groups of 2.9 to 8.0.

(8) The blocked polyisocyanate composition according to any one of (2) to (7), wherein the blocked polyisocyanate has a constitution unit of general formula (I).

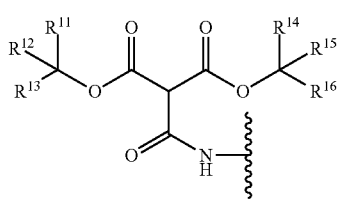

(I)

In the general formula (I), $R^{11}$, $R^{12}$ and $R^{13}$ are each independently an alkyl group which may have at least one substituent selected from the group consisting of a hydroxy group and an amino group, the total carbon number of $R^{11}$, $R^{12}$ and $R^{13}$ is 3 to 20, $R^{14}$, $R^{15}$ and $R^{16}$ are each independently a hydrogen atom or an alkyl group which may have at least one substituent selected from the group consisting of a hydroxy group and an amino group, and a wavy line indicates a bond.

(9) The blocked polyisocyanate composition according to (8), wherein in the general formula (I), the total carbon number of $R^{11}$, $R^{12}$ and $R^{13}$ is 4 to 20.

(10) The blocked polyisocyanate composition according to (8) or (9), containing a constitution unit (I-1) in which, in the general formula (I), the total carbon number of $R^{11}$, $R^{12}$ and $R^{13}$ is 4 to 20 and $R^{16}$ is a hydrogen atom as the constitution unit of general formula (I).

(11) The blocked polyisocyanate composition according to any one of (8) to (10), containing a constitution unit in which in the general formula (I) $R^{11}$, $R^{12}$ and $R^{13}$ are each independently an unsubstituted alkyl group and $R^{14}$, $R^{15}$ and $R^{16}$ are each independently a hydrogen atom or an unsubstituted alkyl group as the constitution unit of general formula (I).

(12) The blocked polyisocyanate composition according to any one of (8) to (11), wherein the molar ratio of hydroxy groups contained in the polyol A to the constitution unit of the general formula (I) is 0.5/99.5 to 15/85.

(13) The blocked polyisocyanate composition according to any one of (1) to (12), wherein the blocked polyisocyanate partially has a constitution unit derived from a hydrophilic compound.

(14) The blocked polyisocyanate composition according to (13), wherein the hydrophilic compound contains at least one compound selected from the group consisting of nonionic compounds and anionic compounds.

(15) The blocked polyisocyanate composition according to any one of (1) to (14), wherein the blocking agent contains a malonic acid ester having a secondary alkyl group.

(16) The blocked polyisocyanate composition, containing a blocked polyisocyanate derived from a polyisocyanate and at least one blocking agent,
wherein the blocked polyisocyanate contains a constitution unit of general formula (I).

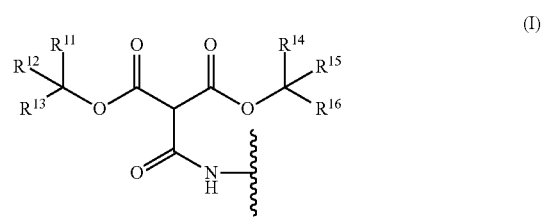

(I)

In the general formula (I), $R^{11}$, $R^{12}$ and $R^{13}$ are each independently an alkyl group which may have at least one substituent selected from the group consisting of a hydroxy group and an amino group, and the total carbon number of $R^{11}$, $R^{12}$ and $R^{13}$ is 4 to 20. $R^{14}$, $R^{15}$ and $R^{16}$ are each independently a hydrogen atom or an alkyl group which may have at least one substituent selected from the group consisting of a hydroxy group and an amino group. A wavy line indicates a bond.

(17) The blocked polyisocyanate composition according to (16), further containing a constitution unit of general formula (II),
wherein the molar ratio of the constitution unit of general formula (II) to the constitution unit of general formula (I) is 4/96 to 96/4.

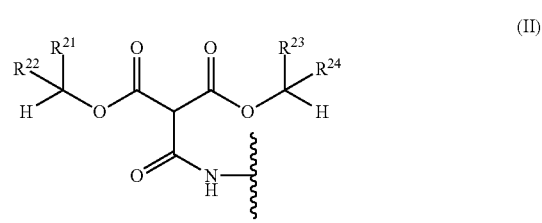

(II)

In the general formula (II), $R^{21}$, $R^{22}$, $R^{23}$ and $R^{24}$ are each independently a hydrogen atom or an alkyl group which may have at least one substituent selected from the group consisting of a hydroxy group and an amino group, and a wavy line indicates a bond.

(18) The blocked polyisocyanate composition according to (16) or (17), containing a constitution unit (I-1) in which $R^{16}$ is a hydrogen atom as the constitution unit of general formula (I).

(19) The blocked polyisocyanate composition according to any one of (16) to (18), wherein in the general formula (I) $R^{11}$, $R^{12}$ and $R^{13}$ are each independently a methyl group or an ethyl group.

(20) The blocked polyisocyanate composition according to any one of (16) to (19), wherein isocyanate groups of the polyisocyanate are partially modified by a nonionic compound.

(21) The blocked polyisocyanate composition according to any one of (16) to (20), wherein the polyisocyanate has an average number of isocyanate groups of 2 or more.

(22) The blocked polyisocyanate composition according to any one of (16) to (21), wherein the polyisocyanate is a polyisocyanate derived from at least one diisocyanate selected from the group consisting of aliphatic diisocyanates and alicyclic diisocyanates.

(23) The blocked polyisocyanate composition according to any one of (16) to (22), wherein the blocked polyisocyanate has an isocyanurate group.

(24) A resin composition containing: the blocked polyisocyanate composition of any one of (1) to (23); and a polyvalent hydroxy compound.

(25) A resin film formed by curing the resin composition of (24).

(26) A layered body including at least two layers of the resin film of (25), constitutions of the at least two layers being different from each other, wherein each layer thickness of the layered body is 1 μm to 50 μm.

(27) A preparation method of the blocked polyisocyanate composition of any one of (1) to (15), including: a first step in which a polyisocyanate composition and a blocking agent containing a malonic acid ester are reacted; and a second step in which the blocked polyisocyanate composition obtained by the first step and an active hydrogen compound are reacted.

Effects of the Invention

The blocked polyisocyanate composition of the above-mentioned aspect makes it possible to provide a blocked polyisocyanate composition that exhibits favorable storage stability when made into a resin composition and exhibits excellent curability at a low temperature of about 80° C. or about 85° C., hardness and strength when made into a coating film. The resin film of the above-mentioned aspect contains the blocked polyisocyanate composition, has a favorable storage stability and exhibits excellent curability at a low temperature of about 80° C., hardness and strength when made into a coating film. The resin film of the above-mentioned aspect is formed by curing the resin composition, and has excellent curability at a low temperature of about 80° C., hardness and strength.

EMBODIMENTS FOR CARRYING OUT THE INVENTION

An embodiment in which the present invention is carried out (hereinafter, abbreviated as "present embodiment") will be described specifically below. The present invention is not intended to be limited to the following present embodiment. The present invention may be modified appropriately within the summary thereof.

In the present specification, the term "polyol" refers to a compound having at least two hydroxy groups (—OH).

In the present specification, the term "polyisocyanate" refers to a reactant in which a plurality of monomer compounds having at least one isocyanate group (—NCO) are bound.

In the present specification, the term "constitution unit" refers to a structure generated from one molecule monomer in a structure constituting a polyisocyanate or a blocked polyisocyanate. For example, the term "constitution unit derived from malonic acid ester" refers to a structure generated from one molecule of malonic acid ester in the blocked polyisocyanate. The constitution unit may be a unit directly formed by a (co)polymerization reaction of monomers, or a unit formed by treating a (co)polymer to allow a part of the unit to be converted to another structure.

<<Blocked Polyisocyanate Composition According to the First Embodiment>>

A blocked polyisocyanate composition according to the first embodiment according to the present invention contains a blocked polyisocyanate derived from at least one diisocyanate, an active hydrogen compound and a blocking agent containing a malonic acid ester.

[Diisocyanate]

The diisocyanate preferably has 4 to 30 carbon atoms, and specific examples thereof include the following. One of these diisocyanates may be used alone, or at least two thereof may be used in combination.

(1) Aromatic diisocyanates such as diphenylmethane-4, 4'-diisocyanate (MDI), 1,5-naphthalene diisocyanate, tollylene diisocyanate (TDI), xylylene diisocyanate, and m-tetramethylxylylene diisocyanate (TMXDI).

(2) Aliphatic diisocyanates such as 1,4-tetramethylene diisocyanate, 1,6-hexamethylene diisocyanate (hereinafter, may be abbreviated as "HDI"), 2,2,4-trimethyl-1,6-diisocyanatohexane, 2,4,4-trimethyl-1,6-hexamethylene diisocyanate, 2-methylpentane-1,5-diisocyanate (MPDI), and lysine diisocyanate (hereinafter, may be abbreviated as "LDI").

(3) Alicyclic diisocyanates such as isophorone diisocyanate (hereinafter, may be abbreviated as "IPDI"), 1,3-bis(diisocyanatemethyl)cyclohexane, 4,4'-dicyclohexylmethane diisocyanate, diisocyanate norbornane, and di(isocyanatemethyl)norbornane.

Among these, at least one selected from the group consisting of the aliphatic diisocyanates and the alicyclic diisocyanates is preferably used. HDI or IPDI is more preferably used from the viewpoint of ease of industrial availability. HDI is even more preferably used from the viewpoint of a decrease in the viscosity of the blocked polyisocyanate component.

Furthermore, the aliphatic diisocyanate and the alicyclic diisocyanate are preferably used in combination as the diisocyanate, and both HDI and IPDI are particularly preferably used. The combinational use of the aliphatic diisocyanate and the alicyclic diisocyanate makes it possible to improve the toughness and the hardness of the resultant coating film.

In the case where the aliphatic diisocyanate and the alicyclic diisocyanate are used in combination, the mass ratio of the constitution unit derived from the aliphatic diisocyanate to the constitution unit derived from the alicyclic diisocyanate is preferably 50/50 to 95/5, more preferably 60/40 to 92/8, and even more preferably 65/35 to 90/10.

In the case where the mass ratio of the constitution unit derived from the aliphatic diisocyanate to the constitution unit derived from the alicyclic diisocyanate is the above-mentioned lower limit or more, the flexibility of the resultant coating film can be further effectively prevented from deteriorating. In contrast, in the case where the mass ratio is the above-mentioned upper limit or less, the hardness of the resultant coating film can be further improved.

The mass ratio of the constitution unit derived from the aliphatic diisocyanate to the constitution unit derived from the alicyclic diisocyanate can be determined by the following method. First, the mass of unreacted aliphatic diisocyanate and the mass of unreacted alicyclic diisocyanate are calculated from the mass of unreacted diisocyanate after reaction and the aliphatic diisocyanate concentration and the alicyclic diisocyanate concentration in the unreacted diisocyanate determined by gas chromatography analysis. Then, the mass of unreacted aliphatic diisocyanate and the mass of unreacted alicyclic diisocyanate, determined by the above-mentioned calculation, are subtracted from the mass of charged aliphatic diisocyanate and the mass of charged alicyclic diisocyanate, respectively, to obtain differences as the mass of the constitution unit derived from the aliphatic diisocyanate and the mass of the constitution unit derived from the alicyclic diisocyanate, respectively. Then, the mass of the constitution unit derived from the aliphatic diisocyanate is divided by the mass of the constitution unit derived from the alicyclic diisocyanate to obtain the mass ratio of the constitution unit derived from the aliphatic diisocyanates to the constitution unit derived from the alicyclic diisocyanates.

[Active Hydrogen Compound]

The active hydrogen compound according to the present embodiment is a compound having a hydroxy group and/or an amino group as an active hydrogen group.

The number-average molecular weight Mn of the active hydrogen compound is 60 to 5,000, preferably 100 to 4,700, more preferably 300 to 4,500, and even more preferably 500 to 4,000. In the case where the number-average molecular weight Mn of the active hydrogen compound is within the above-mentioned range, the curability at a low temperature of about 80° C. and strength of the resultant coating film are excellent.

The number-average molecular weight Mn of the active hydrogen compound is the number-average molecular weight determined by gel permeation chromatography (GPC) analysis with reference to polystyrene standards, for example. Specifically, the analysis may be conducted using the method described in the below-mentioned examples.

The average number of functional groups of the active hydrogen compound is 1.6 to 2.4, preferably 1.8 to 2.2, and even more preferably 1.9 to 2.1. In the case where the average number of functional groups of the active hydrogen compound is within the above-mentioned range, high curability can be realized while suppressing gelation during synthesis of the blocked polyisocyanate or storage.

The average number of functional groups of the active hydrogen compound can be calculated using the following equation. In the equation, "Mn" is the number-average molecular weight of the active hydrogen compound, the "content ratio of hydroxy groups" is the content ratio (% by mass) of hydroxy groups relative to 100% by mass of the solid content of the active hydrogen compound, "17" is the molecular weight (g/mol) of hydroxy groups, the "content ratio of amino groups" is the content ratio (% by mass) of amino groups relative to 100% by mass of the active hydrogen compound, and "15" is the molecular weight (g/mol) of amino groups.

(Average number of functional groups of the active
hydrogen compound)={(Mn of the active
hydrogen compound)×(content ratio of hydroxy
groups)×0.01}/17+{(Mn of the active hydrogen
compound)×(content ratio of amino groups)×
0.01}/15

The amount of the constitution unit derived from the active hydrogen compound relative to 100 parts by mass of the constitution unit derived from the diisocyanate is preferably 0.05 parts by mass to 10 parts by mass, more preferably 0.1 parts by mass to 9 parts by mass, even more preferably 0.25 parts by mass to 8 parts by mass, and even more preferably 0.3 parts by mass to 7 parts by mass.

Alternatively, the amount of the constitution unit derived from the active hydrogen compound relative to 100 parts by mass of the constitution unit derived from the diisocyanate is more preferably 0.6 parts by mass to 9.5 parts by mass.

In the case where the amount of the constitution unit derived from the active hydrogen compound relative to 100 parts by mass of the constitution unit derived from the diisocyanate is the above-mentioned lower limit or more, the curability at a low temperature of about 80° C., hardness and strength when made into a coating film tend to become excellent. In contrast, in the case where the amount of the constitution unit derived from the active hydrogen compound relative to 100 parts by mass of the constitution unit derived from the diisocyanate is the above-mentioned upper limit or less, gelation can be suppressed when the blocked polyisocyanate composition is synthesized, and the storage stability of the resultant resin composition can be made to be favorable.

The amount of the constitution unit derived from the active hydrogen compound relative to 100 parts by mass of the constitution unit derived from the diisocyanate may be calculated from the formulation ratio of raw materials, for example. Alternatively, the amount of the constitution unit derived from the active hydrogen compound relative to 100 parts by mass of the constitution unit derived from the diisocyanate may also be determined by nuclear magnetic resonance (NMR), infrared absorption spectroscopy (IR), gas chromatography (GC), or mass spectrometry (MS), for example.

Although the active hydrogen compound having an amino group is not particularly limited, examples thereof include: aliphatic diamine compounds such as ethylenediamine, trimethylenediamine, hexamethylenediamine, and octamethylenediamin; aromatic diamine compounds such as phenylenediamine, and 4,4'-methylene bi(phenylamine); alicyclic diamine compounds such as cyclopentyldiamine, cyclohexyldiamine, 4,4'-diaminodicyclohexylmethane, 1,4-diaminocyclohexane, and isophorone diamine; and aspartate ester compounds.

Although the active hydrogen compound having both an amino group and a hydroxy group is not particularly limited, examples thereof include 1-amino-2-propanol, and 5-amino-1-pentanol.

[Polyol A]

It is preferable that the active hydrogen compound according to the present embodiment contain only a hydroxy group (hereinafter, abbreviated as polyol A).

The number-average molecular weight Mn of the polyol A is 60 to 5,000, preferably 100 to 4,700, more preferably 300 to 4,500, and even more preferably 500 to 4,000. In the case where the number-average molecular weight Mn of the polyol A is within the above-mentioned range, the curability at a low temperature of about 80° C. and the strength of the resultant coating film are excellent. The number-average molecular weight Mn of the polyol A is the number-average molecular weight determined by gel permeation chromatography (GPC) analysis with reference to polystyrene standards, for example. Specifically, the analysis may be conducted using the method described in the below-mentioned examples.

The average number of functional groups of the polyol A is 1.6 to 2.4, preferably 1.8 to 2.2, and more preferably 1.9 to 2.1. In the case where the average number of functional groups of the polyol A is within the above-mentioned range, high curability can be realized while suppressing gelation during synthesis of the blocked polyisocyanate or gelation at the time of storage. The average number of functional groups of the polyol A can be calculated using the following equation. In the equation, "Mn" is the number-average molecular weight of the polyol A, the "content ratio of hydroxy groups" is the content ratio (% by mass) of hydroxy groups relative to 100% by mass of the solid content in the polyol A, and "17" is the molecular weight (g/mol) of hydroxy groups.

(Average number of functional groups of polyol A)={(Mn of polyol A)×(Content ratio of hydroxy groups)×0.01}/17

The polyol A may be at least one polyol selected from the group consisting of: 1,3-butanediol; 1,4-butanediol; 1,6-hexanediol; 3-methyl-1,5-pentanediol; 1,4-cyclohexanedimethanol; glycerol; polycaprolactone polyols derived from them with ε-caprolactone; polyether polyols; polycarbonate polyols; and acrylic polyols; for example. Among these, at least one diol selected from the group consisting of 1,4-butanediol, 1,6-hexanediol, 3-methyl-1,5-pentanediol, 1,4-cyclohexanedimethanol and glycerol; or polycaprolactone diols derived from these diols with ε-caprolactone are preferable, and at least one diol selected from the group consisting of 1,4-butanediol, 1,6-hexanediol, 3-methyl-1,5-pentanediol and 1,4-cyclohexanedimethanol; or polycaprolactone diols derived from these diols with ε-caprolactone are more preferable.

Examples of commercially-available polycaprolactone diol products include "PLACCEL 205UT" (having a number-average molecular weight of 530), "PLACCEL 220CPT" (having a number-average molecular weight of 2,000), and "PLACCEL 240CP" (having a number-average molecular weight of 4,000), which are manufactured by DAICEL ChemTech, Inc.

[Blocking Agent]

The blocking agent contains a malonic acid ester. Although the malonic acid ester is not particularly limited, either a malonic acid ester having a secondary alkyl group or a malonic acid ester having a primary alkyl group and a malonic acid ester having a tertiary alkyl group are preferably contained, and both a malonic acid ester having a secondary alkyl group and a malonic acid ester having a tertiary alkyl group are more preferably contained. The blocking agent may contain one malonic acid ester having a secondary alkyl group, one malonic acid ester having a primary alkyl group, and one malonic acid ester having a tertiary alkyl group, or may contain each of two or more thereof in combination.

Although the malonic acid ester having a primary alkyl group is not particularly limited, examples thereof include dimethyl malonate, diethyl malonate, dipropyl malonate, dibutyl malonate, dicyclohexyl malonate, and diphenyl malonate. Among these, diethyl malonate is preferable as the malonic acid ester having a primary alkyl group.

Although the malonic acid ester having a secondary alkyl group is not particularly limited, examples thereof include di-sec-butyl malonate, diisopropyl malonate, and isopropylethyl malonate. Among these, diisopropyl malonate is preferable as the malonic acid ester having a secondary alkyl group.

Although the malonic acid ester having a tertiary alkyl group is not particularly limited, examples thereof include di-tert-butyl malonate, di(2-methyl-2-butyl) malonate, di(2-methyl-2-pentyl) malonate, (tert-butyl)ethyl malonate, (2-methyl-2-butyl) malonate, (2-methyl-2-butyl)isopropyl malonate, (2-methyl-2-pentyl)ethyl malonate, (2-methyl-2-pentyl)isopropyl malonate, and (2-methyl-2-pentyl)hexylisopropyl malonate. Among these, di(2-methyl-2-butyl) malonate, di(2-methyl-2-pentyl) malonate, (2-methyl-2-butyl)isopropyl malonate, (2-methyl-2-pentyl)ethyl malonate, or (2-methyl-2-pentyl)isopropyl malonate is preferable; (2-methyl-2-butyl) malonate, (2-methyl-2-butyl)isopropyl malonate, (2-methyl-2-pentyl)ethyl malonate, or (2-methyl-2-pentyl)hexylisopropyl malonate is preferable; alternatively di-tert-butyl malonate, (2-methyl-2-butyl)isopropyl malonate, or (2-methyl-2-pentyl)isopropyl malonate is preferable.

As the malonic acid ester having a tertiary alkyl group, a commercially-available product may be used, or a product synthesized by the method in Reference Document 1 (Japanese Unexamined Patent Application, First Publication No. Hei 11-130728) may also be used.

The amount of the malonic acid ester having a secondary alkyl group and the malonic acid ester having a tertiary alkyl group relative to the total mol of all blocking agents used to synthesize the blocked polyisocyanate is preferably 50% by mol or more, more preferably 70% by mol or more, even more preferably 90% by mol or more, particularly preferably 95% by mol or more, and most preferably 100% by mol.

In the case where the amount of the malonic acid ester having a secondary alkyl group and the malonic acid ester having a tertiary alkyl group is within the above-mentioned range, the low-temperature curability of the resultant resin film can be further improved.

(Other Blocking Agent)

The blocking agent used to prepare the blocked polyisocyanate may contain another blocking agent in addition to the malonic acid ester having a secondary alkyl group and the malonic acid ester having a tertiary alkyl group within a range in which the storage stability of the resultant resin composition and the low-temperature curability of the resultant resin film are not deteriorated.

Examples of another blocking agent include: 1) alcohol-based compounds; 2) alkylphenol-based compounds; 3) phenol-based compounds; 4) active methylene-based compounds other than the malonic acid ester having a secondary alkyl group and the malonic acid ester having a tertiary alkyl group; 5) mercaptan-based compounds; 6) acid amide-based compounds; 7) acid imide-based compounds; 8) imidazole-based compounds; 9) urea-based compounds; 10) oxime-based compounds; 11) amine-based compounds; 12) imide-based compounds; 13) bisulfite salts; 14) pyrazole-based compounds; and 15) triazole-based compounds. Specific examples of the blocking agent include the following compounds.

1) Alcohol-based compounds: Alcohols such as methanol, ethanol, 2-propanol, n-butanol, sec-butanol, 2-ethyl-1-hexanol, 2-methoxyethanol, 2-ethoxyethanol, and 2-butoxyethanol.
2) Alkylphenol-based compounds: Mono and dialkylphenols having an alkyl group having 4 or more carbon atoms as a substituent. Specific examples of the alkylphenol-based compounds include: monoalkylphenols such as n-propylphenol, iso-propylphenol, n-butylphenol, sec-butylphenol, tert-butylphenol, n-hexylphenol, 2-ethylhexylphenol, n-octylphenol, and n-nonylphenol; and dialkylphenols such as di-n-propylphenol, diisopropylphenol, isopropylcresol, di-n-butylphenol, di-tert-butylphenol, di-sec-butylphenol, di-n-octylphenol, di-2-ethylhexylphenol, and di-n-nonylphenol.
3) Phenol-based compounds: Phenol, cresol, ethylphenol, styrenated phenol, and hydroxybenzic acid ester.
4) Active methylene-based compounds: Dimethyl malonate, diethyl malonate, methyl acetoacetate, ethyl acetoacetate, methyl isobutanoylacetate, ethyl isobutanoylacetate, and acetylacetone.
5) Mercaptan-based compounds: Butylmercaptan, and dodecylmercaptan.
6) Acid amide-based compounds: Acetanilide, amide acetate, ε-caprolactam, δ-valerolactam, and γ-butyrolactam.
7) Acid imide-based compounds: Succinimide, and maleimide.
8) Imidazole-based compounds: Imidazole, and 2-methylimidazole.
9) Urea-based compounds: Urea, thiourea, and ethyleneurea.
10) Oxime-based compounds: Formaldoxime, acetoaldoxime, acetoxime, methylethylketoxime, and cyclohexanone oxime.
11) Amine-based compounds: Diphenylamine, aniline, carbazole, di-n-propylamine, diisopropylamine, and isopropylethylamine.
12) Imine-based compounds: Ethyleneimine, and polyethyleneimine.
13) Bisulfite salt compounds: Sodium bisulfite.
14) Pyrazole-based compounds: pyrazole, 3-methylpyrazole, and 3,5-dimethylpyrazole.
15) Triazole-based compounds: 3,5-dimethyl-1,2,4-triazole.

(Other Constitution Component)

The blocked polyisocyanate composition according to the present embodiment may further contain an additive such as a solvent in addition to the above-mentioned blocked polyisocyanate.

Examples of the solvent include 1-methylpyrolidone, ethylene glycol monoethyl ether, diethylene glycol monoethyl ether, ethylene glycol monomethyl ether, diethylene glycol monomethyl ether, dipropylene glycol monomethyl ether, propylene glycol monomethyl ether, 3-methoxy-3-methyl-1-butanol, ethylene glycol diethyl ether, diethylene glycol diethyl ether, ethylene glycol dimethyl ether, diethylene glycol dimethyl ether, dipropylene glycol dimethyl ether (DPDM), propylene glycol dimethyl ether, methyl ethyl ketone, acetone, methyl isobutyl ketone, propylene glycol monomethyl ether acetate, ethanol, methanol, isopropanol, 1-propanol, iso-butanol, 1-butanol, tert-butanol, 2-ethylhexanol, cyclohexanol, ethylene glycol, diethylene glycol, triethylene glycol, propylene glycol, dipropylene glycol, 1,4-butanediol, 1,3-butanediol, ethyl acetate, isopropyl acetate, butyl acetate, toluene, xylene, pentane, iso-pentane, hexane, iso-hexane, cyclohexane, solvent naphtha, and mineral spirit. One of these solvents may be used alone or at least two thereof may be used in combination. The solvent preferably has a solubility in water of 5% by mass or more from the viewpoint of the dispersibility in water, and DPDM is specifically preferable.

<Preparation Method of the Blocked Polyisocyanate Composition According to the First Embodiment>

Although the blocked polyisocyanate composition according to the first embodiment is not particularly limited, the blocked polyisocyanate composition may be obtained by reacting the diisocyanate, the active hydrogen compound and the blocking agent, for example. These compounds may be reacted simultaneously to prepare the blocked polyisocyanate composition. The diisocyanate and the active hydrogen compound may be reacted to obtain a polyisocyanate modified with the active hydrogen compound, followed by reacting the polyisocyanate modified with the active hydrogen compound and the blocking agent to prepare the blocked polyisocyanate composition. Alternatively, the diisocyanate and the blocking agent may be reacted to obtain a partially blocked polyisocyanate in which isocyanate groups of the polyisocyanate are partially or entirely blocked by the blocking agent, followed by reacting the partially blocked polyisocyanate and the active hydrogen compound to prepare a blocked polyisocyanate composition.

The modification reaction of the diisocyanate with the active hydrogen compound can be conducted without depending on the presence or absence of a solvent.

The addition amount of the active hydrogen compound relative to 100 parts by mass of the diisocyanate is preferably 0.05 parts by mass to 10 parts by mass, more preferably 0.1 parts by mass to 9 parts by mass, even more preferably 0.25 parts by mass to 8 parts by mass, and even more preferably 0.3 parts by mass to 7 parts by mass. Alternatively, the addition amount of the constitution unit derived from the active hydrogen compound relative to 100 parts by mass of the constitution unit derived from the diisocyanate is preferably 0.6 parts by mass to 9.5 parts by mass. In the case where the addition amount of the active hydrogen compound is the above-mentioned lower limit or more, the curability at a low temperature of about 80° C., the hardness and the strength when made into a coating film tend to be excellent. In contrast, in the case where the addition amount of the active hydrogen compound is the above-mentioned upper limit or less, the gelation when the blocked polyisocyanate composition is synthesized can be suppressed, and the storage stability of the resultant resin composition can be made to be favorable.

In the case where a solvent is used at the time of the modification reaction of the diisocyanate with the active hydrogen compound, a solvent inert to isocyanate groups may be used.

The polyisocyanate modified with the active hydrogen compound preferably has an isocyanurate group, an allophanate group, a urethane group and/or a urea group.

Although an example of the modification reaction of the diisocyanate with the active hydrogen compound will be described, the modification reaction is not limited to the following example.

First, an isocyanate group of the diisocyanate and an active hydrogen group of the active hydrogen compound are urethanated and/or ureated. At the time, the reaction temperature may be 20° C. to 200° C. The reaction temperature is preferably 50° C. to 150° C., more preferably 50° C. to 120° C., and even more preferably 50° C. to 100° C. In the case where the reaction temperature is 50° C. or more, the reaction tends to readily proceed. In the case where the reaction is 200° C. or less, the coloration of the resultant polyisocyanate composition tends to be suppressed. The reaction time is preferably 0.5 hours to 24 hours, more preferably 0.5 hours to 10 hours, and even more preferably 0.5 hours to 5 hours.

After active hydrogen groups of the active hydrogen compound are partially or entirely reacted with isocyanate groups of the diisocyanate, an isocyanurate-forming reaction or an allophanate-forming reaction is conducted.

Although the urethane-forming reaction may be conducted after the allophanate-forming reaction or the isocyanurate-forming reaction or may be conducted simultaneously with the allophanate-forming reaction or the isocyanurate-forming reaction, it is preferable that isocyanate groups of the diisocyanate and hydroxy groups of the active hydrogen compound be reacted to form urethane bonds, followed by allowing both the isocyanurate-forming reaction and allophanate-forming reaction to proceed simultaneously. These reactions may be allowed to proceed appropriately by selecting an isocyanurate-forming reaction catalyst and reaction conditions.

In the case where the reaction is made to proceed by a catalyst, the isocyanurate-forming or allophanate-forming reaction temperature is 60° C. to 160° C., and preferably 70° C. to 100° C. In the case where the reaction temperature is 60° C. or more, the allophanate-forming reaction tends to readily proceed, and the molar ratio of allophanate groups/(allophanate groups+urethane groups) tends to become high. In the case where the reaction temperature is 160° C. or less, the coloration of the resultant polyisocyanate composition tends to be suppressed.

The isocyanurate-forming or allophanate-forming reaction time is preferably 1 hour to 10 hours, more preferably 1 hour to 7 hours, and more preferably 1 hour to 5 hours. In the case where the reaction time is 1 hour or more, the isocyanurate-forming ratio and the allophanate-forming ratio tends to become high. In the case where the reaction time is 10 hours or less, the coloration tends to be further suppressed.

Although the isocyanurate-forming catalyst or the allophanate-forming catalyst available in the above is not particularly limited, a catalyst having basicity is preferable, for example. Although the catalyst is not limited to the following compounds, examples thereof include: (i) hydroxides of, and salts of organic weak acids such as acetic acid or capric acid of, tetraalkylammoniums such as tetramethylammonium or tetraethylammonium; (ii) hydroxides of, and salts of organic weak acids such as acetic acid or capric acid of, hydroxyalkylammoniums such as trimethylhydroxypropylammonium, trimethylhydroxyethylammonium, triethylhydroxypropylammonium, or triethylhydroxyethylammonium; (iii) salts of alkali metal such as tin, zinc, or lead, with alkylcarboxylic acids such as acetic acid, caproic acid, octylic acid, or myristic acid; (iv) metal alcoholates of sodium or potassium; (v) aminosilyl group-containing compounds such as hexamethyldisilazane; (vi) Mannich bases; (vii) tertiary amines and epoxy compounds used in combination, and (viii) phosphorus-based compounds such as tributylphosphine. Among these, the hydroxides of or the organic weak acid salts of tetraalkylammoniums are preferable. These catalysts may be added collectively or continuously.

The catalyst is deactivated to terminate the reaction. In the case where the catalyst is neutralized to be deactivated, an acidic substance such as phosphoric acid or an acidic phosphoric acid ester is added. Alternatively, the catalyst is deactivated by thermal decomposition or chemical decomposition. Furthermore, the catalyst may be adsorbed to an activated carbon or alumina and removed from the system to be deactivated.

The yield of the polyisocyanate composition ((the mass of the resultant polyisocyanate composition/the total mass of charged raw materials)×100) is preferably 10% by mass to 70% by mass, and more preferably 30% by mass to 60% by mass. The molar ratio of isocyanate groups to allophanate groups and urethane groups can be increased by increasing the yield, whilst the molar ratio of isocyanate groups to allophanate groups and urethane groups can be decreased by decreasing the yield.

After the reaction is terminated, unreacted diisocyanate monomers are removed by thin film evaporation or extraction. The concentration of the unreacted diisocyanate monomers in the resultant polyisocyanate composition is preferably 3% by mass or less, more preferably 1% by mass or less, even more preferably 0.5% by mass or less, and even more preferably 0.3% by mass or less. In the case where the concentration of the unreacted diisocyanate monomers is 3% by mass or less, the curability tends to be further improved.

At least a part of the polyisocyanate modified with the active hydrogen compound may contain a constitution unit derived from a hydrophilic compound, namely may have a hydrophilic group.

Although the blocking reaction of the diisocyanate (or the polyisocyanate modified with the active hydrogen compound) and the blocking agent is not particularly limited, examples thereof include the following two methods.

1) A method in which the diisocyanate (or the polyisocyanate modified with the active hydrogen compound), the malonic acid ester having a tertiary alkyl group, and either the malonic acid ester having a secondary alkyl group or the malonic acid ester having a primary alkyl group are reacted.

2) A method in which the diisocyanate (or the polyisocyanate modified with the active hydrogen compound), and at least one blocking agent selected from the group consisting of the malonic acid ester having a tertiary alkyl group, the malonic acid ester having a secondary alkyl group and the malonic acid ester having a primary alkyl group are reacted, followed by adding an alcohol having a chained alkyl group to the obtained reactant to introduce an alkyl group derived from the alcohol by ester exchange at the terminal ester portion of the reactant.

The blocking reaction of the diisocyanate (or the polyisocyanate modified with the active hydrogen compound) and the blocking agent can be conducted without depending on the presence or absence of a solvent. As the blocking agent, each one of the malonic acid ester having a primary alkyl group, the malonic acid ester having a secondary alkyl group and the malonic acid ester having a tertiary alkyl group may be used, or each of two or more thereof may be used in combination.

The addition amount of the blocking agent relative to the total mol of isocyanate groups may be generally 80% by mol to 200% by mol, and is preferably 90% by mol to 150% by mol.

In the case where the malonic acid ester having a secondary alkyl group and the malonic acid ester having a tertiary alkyl group are used in the blocking agent to be added, the molar ratio of the malonic acid ester having a secondary alkyl group to the malonic acid ester having a tertiary alkyl group (the malonic acid ester having a secondary alkyl/the malonic acid ester having a tertiary alkyl) is preferably more than 5/95 and less than 95/5, more preferably 7/93 to 93/7, even more preferably 10/90 to 93/7, even more preferably 20/80 to 93/7, and particularly preferably 30/70 to 93/7. In the case where the molar ratio is the above-mentioned lower limit or more, the storage stability of the resultant resin composition can be made to be favorable. In the case where the molar ratio is the above-mentioned upper limit or less, the low-temperature curability of the resultant resin film can be made to be favorable.

In the case where a solvent is used at the time of the blocking reaction, a solvent inert to isocyanate groups may be used.

In the case where the solvent is used, the amount of the non-volatile content thereof relative to 100 parts by mass of the blocked polyisocyanate composition may be generally 10 parts by mass to 95 parts by mass, and is preferably 20 parts by mass to 80 parts by mass, and more preferably 30 parts by mass to 75 parts by mass.

In the blocking reaction, an organic metal salt of tin, zinc, or lead, a tertiary amine-based compound or an alkali metal alcoholate of sodium or the like may be used as the catalyst.

The addition amount of the catalyst is varied depending on the temperature at the blocking reaction or the like, the addition amount relative to 100 parts by mass of the polyisocyanate may be generally 0.05 parts by mass to 1.5 parts by mass, and preferably 0.1 parts by mass to 1.0 parts by mass.

The blocking reaction may be conducted generally at −20° C. to 150° C., preferably at 0° C. to 100° C., and more preferably at 10° C. to 80° C. In the case where the temperature at the blocking reaction is the above-mentioned lower limit or more, the reaction rate can be further enhanced. In the case where the temperature is the above-mentioned upper limit or less, the side reaction can be further suppressed.

After the blocking reaction, an acidic compound or the like may be added to conduct neutralization treatment.

As the acidic compound, either an inorganic acid or an organic acid may be used. Examples of the inorganic acid include hydrochloric acid, phosphorous acid, and phosphoric acid. Examples of the organic acid include methanesulfonic acid, p-toluenesulfonic acid, dioctylphthalate, and dibutylphthalate.

In the case where the method 2) is adopted to conduct preparation, an ester exchange reaction is conducted following the blocking reaction.

As the alcohol having a chained alkyl group used in the ester exchange reaction in the method 2), a monoalcohol is preferable, and examples thereof include: primary monoalcohols such as methanol, ethanol, propanol, butanol, hexanol, and 2-ethylhexanol; secondary monoalcohols such as isopropanol, 2-butanol, 2-pentanol, and 2-hexanol; and tertiary monoalcohols such as tert-butanol, 2-methyl-2-butanol, 2-methyl-2-pentanol, 2-methyl-2-hexanol, 2-methyl-2-heptanol, 2-methyl-2-octanol, 3-methyl-3-pentanol, 3-ethyl-3-hexanol, and 3-ethyl-3-octanol.

Furthermore, the chained alkyl group included in the alcohol may be identical to or different from the chained alkyl group of the blocking agent. In the case where the chained alkyl group included in the alcohol is different from the chained alkyl group of the blocking agent, a monoalcohol having a chained alkyl group in which the number of alkyl substituents is different from that of the blocking agent is preferably used. Specifically, in the case where one malonic acid ester having a secondary alkyl group is used alone as the blocking agent, a monoalcohol having a tertiary alkyl group may be used, for example.

In the case where the method 2) is adopted to conduct preparation, it is preferable that the generated alcohol or the residue of added alcohol be removed by distillation under ordinary pressure or reduced pressure during the ester exchange reaction or after the ester exchange reaction.

Among them, it is preferable that the generated alcohol be removed by conducting an operation such as distillation during the ester exchange reaction so as to allow the ester exchange reaction to proceed efficiently. In this case, it is preferable, so as to efficiently remove an alcohol component generated by the exchange reaction, that the boiling point of an alcohol component to be added be higher than the boiling point of the generated alcohol component.

The ester exchange reaction may be generally conducted at 0° C. to 150° C., and preferably at 30° C. to 120° C., and more preferably at 50° C. to 100° C. In the case where the temperature at the ester exchange reaction is the above-mentioned lower limit or more, the reaction rate can be further enhanced. In the case where the temperature is the above-mentioned upper limit or less, the side reaction can be further suppressed.

The amount of the alcohol component in the blocked polyisocyanate composition relative to 100 parts by mass of the solid content in the blocked polyisocyanate composition is preferably 0.05 parts by mass to 41 parts by mass, more preferably 0.1 parts by mass to 30 parts by mass, and even more preferably 0.5 parts by mass to 10 parts by mass. In the case where the amount of the alcohol component is the above-mentioned lower limit or more, the storage stability of the resultant coating material becomes favorable. In the case where the amount is the above-mentioned upper limit or less, the viscosity-increase when formulated in an aqueous coating material can be suppressed.

<<Blocked Polyisocyanate Composition According to the Second Embodiment>>

A blocked polyisocyanate composition according to the second embodiment of the present invention contains a blocked polyisocyanate derived from an active hydrogen compound, a polyisocyanate and a blocking agent containing a malonic acid ester.

An explanation relating to the same constitution as that of the first embodiment may be omitted.

The polyisocyanate has an isocyanurate group, and is preferably derived from at least one diisocyanate selected from the group consisting of aliphatic diisocyanates and alicyclic diisocyanates.

The average number of isocyanate groups of the polyisocyanate is 3.5 or more, preferably 4.0 or more, more preferably 4.5 or more, and even more preferably 4.7 or more. In the case where the average number of isocyanate groups of the polyisocyanate is the above-mentioned lower limit or more, the curability at a low temperature of about 80° C., the hardness and the strength when made into a coating film are excellent. In contrast, the upper limit of the average number of isocyanate groups of the polyisocyanate is not particularly limited, and may be 20, 10, or 8, for example.

The average number of isocyanate groups of the polyisocyanate may be determined using the number-average molecular weight Mn of the polyisocyanate and the content ratio of isocyanate groups (NCO content ratio) by the following equation, for example.

$$\text{Average number of isocyanate groups} = (\text{Mn of polyisocyanate} \times \text{NCO content ratio} \times 0.01)/42$$

The number-average molecular weight Mn of the polyisocyanate is the number-average molecular weight determined by GPC analysis with reference to polystyrene standards, for example. Specifically, the analysis may be conducted using the method described in the below-mentioned examples.

The content ratio of isocyanate groups (NCO content ratio) may be measured by the following method, for example.

2 g to 3 g of the polyisocyanate is precisely weighed in a flask (Wg). Then, 20 mL of toluene is added thereto to dissolve the polyisocyanate. Then, 20 mL of a toluene solution containing 2 N di-n-butylamine is added thereto, and mixed, and then the resultant mixture is left to stand for 15 minutes at room temperature. Then, 70 mL of isopropyl alcohol is added thereto and mixed. Then, the resultant solution is titrated with 1 N hydrochloric acid solution (factor F) using an indicator. Thus, the titration value V2 mL is obtained. The same titration operation is performed without polyisocyanate, and the titration value V1 mL is obtained. Then, the content ratio (% by mass) of isocyanate (NCO) groups of the polyisocyanate is calculated by the following equation.

Content ratio (% by mass) of isocyanate (NCO) groups=(V1−V2)×F×42/(W×1000)×100

Alternatively, the polyisocyanate is preferably derived from the diisocyanate and a polyol B having an average number of functional groups of 2.9 to 8.0. In this case, the average number of isocyanate groups of the resultant polyisocyanate can be further increased. In the polyisocyanate, a urethane group is formed by the reaction of a hydroxy group of the polyol B and an isocyanate group of the diisocyanate.

The average number of functional groups of the polyol B is preferably 2.9 to 8.0, more preferably 3 to 8, even more preferably 3 to 6, even more preferably 3 to 5, and particularly preferably 3 or 4. The average number of functional groups of the polyol B may be calculated by the following equation, for example. In the equation, "Mn" is the number-average molecular weight of the polyol B, the "content ratio of hydroxy groups" is the content ratio (% by mass) of hydroxy groups relative to 100% by mass of the solid content of the polyol B, and "17" is the molecular weight (g/mol) of hydroxy groups.

(Average number of functional groups of the polyol B)={(Mn of polyol B)×(Content ratio of hydroxy groups)×0.01}/17

The number-average molecular weight Mn of the polyol B is preferably 100 to 1,000, more preferably 100 to 900, even more preferably 100 to 800, even more preferably 100 to 700, even more preferably 100 to 500, even more preferably 100 to 400, and particularly preferably 100 to 350.

In the case where the number-average molecular weight Mn of the polyol is within the above-mentioned range, the blocked polyisocyanate composition exhibits further excellent low-temperature curability, hardness and strength, when made into a coating film. The number-average molecular weight Mn of the polyol B is the number-average molecular weight determined by GPC analysis with reference to polystyrene standards, for example.

The amount of a constitution unit derived from the active hydrogen compound relative to 100 parts by mass of a constitution unit derived from the polyisocyanate is preferably 0.05 parts by mass to 10 parts by mass, more preferably 0.1 parts by mass to 9 parts by mass, even more preferably 0.25 parts by mass to 8 parts by mass, and even more preferably 0.3 parts by mass to 7 parts by mass. In the case where the amount of the constitution unit derived from the active hydrogen compound relative to 100 parts by mass of the constitution unit derived from the polyisocyanate is the above-mentioned lower limit or more, the curability at a low temperature of about 80° C., the hardness and the strength when made into a coating film tend to be excellent. In contrast, the amount of the constitution unit derived from the active hydrogen compound relative to 100 parts by mass of the constitution unit derived from the polyisocyanate is the above-mentioned upper limit or less, the gelation when the blocked polyisocyanate composition is synthesized can be suppressed, and the storage stability of the resultant resin composition can be made to be favorable.

The amount of the constitution unit derived from the active hydrogen compound relative to 100 parts by mass of the constitution unit derived from the polyisocyanate may be calculated from the formulation ratio of raw materials, for example. Alternatively, the amount of the constitution unit derived from the active hydrogen compound the relative to 100 parts by mass of the constitution unit derived from the polyisocyanate can be determined by nuclear magnetic resonance (NMR), infrared absorption spectroscopy (IR), gas chromatography (GC), mass spectrometry (MS) or the like, for example.

The use of a malonic acid ester as a blocking agent makes it possible that the blocked polyisocyanate composition according to the present embodiment realizes both properties in which the storage stability of the resultant resin composition is favorable and in which the curability at a low temperature of about 80° C. when made into a coating film is excellent. Furthermore, the partial modification of isocyanate groups of the blocked polyisocyanate with the active hydrogen compound makes it possible to make the storage stability of the resultant resin composition and the curability at a low temperature of about 80° C., the hardness and the strength, when made into a coating film, be excellent.

Each constitution component of the blocked polyisocyanate composition according to the present embodiment will be explained in further detail, below.

<Blocked Polyisocyanate>

The blocked polyisocyanate is a reactant of the active hydrogen compound, the polyisocyanate and the blocking agent. Namely, in the blocked polyisocyanate, at least some of the isocyanate groups of the polyisocyanate are modified with the active hydrogen compound and at least some of the isocyanate groups of the polyisocyanate are blocked with the blocking agent.

[Constitution Unit (I)]

The blocked polyisocyanate preferably contains a constitution unit of the following general formula (I) (hereinafter, may be referred to as constitution unit (I)).

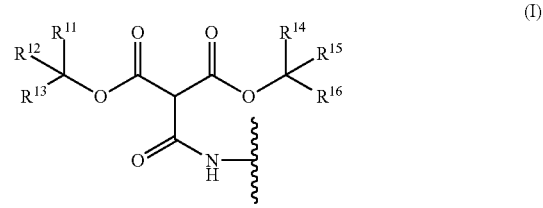

In the general formula (I), $R^{11}$, $R^{12}$ and $R^{13}$ are each independently an alkyl group which may have at least one substituent selected from the group consisting of a hydroxy group and an amino group, the total carbon number of $R^{11}$, $R^{12}$ and $R^{13}$ is 3 to 20, $R^{14}$, $R^{15}$ and $R^{16}$ are each independently a hydrogen atom or an alkyl group which may have at least one substituent selected from the group consisting of a hydroxy group and an amino group and the wavy line indicates a bond with a residue formed by removing an isocyanate group from the polyisocyanate.

The carbon number of the alkyl group as $R^{11}$, $R^{12}$, $R^{13}$, $R^{14}$, $R^{15}$ and $R^{16}$ is preferably 1 to 20, more preferably 1 to 8, even more preferably 1 to 6, and particularly preferably 1 to 4.

Specific examples of an unsubstituted alkyl group include a methyl group, an ethyl group, a propyl group, an isopropyl group, a n-butyl group, a tert-butyl group, a sec-butyl group, an isobutyl group, a n-pentyl group, an isopentyl group, a neopentyl group, a tert-pentyl group, a 1-methylbutyl group, a n-hexyl group, a 2-methylpentyl group, a 3-methylpentyl group, a 2,2-dimethylbutyl group, a 2,3-dimethylbutyl group, a n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, a n-octyl group, an isooctyl group, a 2-ethylhexyl group, a nonyl group, and a decyl group.

In the case where $R^{11}$, $R^{12}$, $R^{13}$, $R^{14}$, $R^{15}$ and $R^{16}$ are alkyl groups each having a substituent, the substituent is a hydroxy group or an amino group.

Examples of the alkyl group having a hydroxy group as a substituent include a hydroxymethyl group, a hydroxyethyl group, and a hydroxypropyl group.

Examples of the alkyl group having an amino group as a substituent include an aminomethyl group, an aminoethyl group, an aminopropyl group, and an aminobutyl group.

Examples of the alkyl group having both a hydroxy group and an amino group as substituents include a hydroxyaminomethyl group, a hydroxyaminoethyl group, and a hydroxyaminopropyl group.

Among them, it is preferable that $R^{11}$, $R^{12}$ and $R^{13}$ be each independently an unsubstituted alkyl group having 1 to 4 carbon atoms, and it is more preferable that $R^{11}$, $R^{12}$ and $R^{13}$ be each independently a methyl group or an ethyl group, from the viewpoint of further improvement in the storage stability when made into an aqueous resin composition and the low-temperature curability when made into a resin film.

The total carbon number of $R^{11}$, $R^{12}$ and $R^{13}$ is 3 to 20, preferably 4 to 20, more preferably 4 to 12, even more preferably 4 to 9, and even more preferably 4 to 6.

In the case where the total carbon number of $R^{11}$, $R^{12}$ and $R^{13}$ is the above-mentioned lower limit or more, the storage stability when made into an aqueous resin composition can be realized. In contrast, in the case where the total carbon number is the above-mentioned upper limit or less, the low-temperature curability can be realized.

$R^{14}$, $R^{15}$ and $R^{16}$ are each independently a hydrogen atom or an alkyl group which may have at least one substituent selected from the group consisting of a hydroxy group and an amino group (preferably an unsubstituted alkyl group having 1 to 4 carbon atoms).

Among them, it is preferable that at least one of $R^{14}$, $R^{15}$ and $R^{16}$ be a hydrogen atom, and it is more preferable that only one of $R^{14}$, $R^{15}$ and $R^{16}$ be a hydrogen atom. In the case where at least one of $R^{14}$, $R^{15}$ and $R^{16}$ is a hydrogen atom, the storage stability when made into an aqueous resin composition can be further improved while maintaining the low-temperature curability. Namely, it is more preferable that a constitution unit of the following general formula (I-1) (hereinafter, may be referred to as constitution unit (I-1)) be contained as the constitution unit (I).

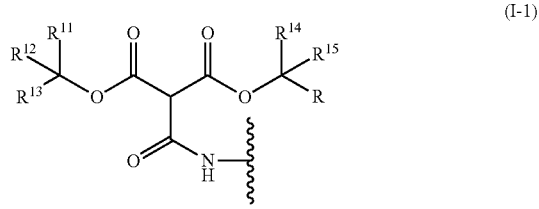

(I-1)

In the general formula (I-1), $R^{11}$, $R^{12}$, $R^{13}$, $R^{14}$ and $R^{15}$ are mentioned in the general formula (I). The wavy line indicates a bond with a residue formed by removing an isocyanate group from the polyisocyanate.

The molar ratio of the constitution unit (I-1) to the constitution unit (I) (constitution unit (I-1)/constitution unit (I)) is more preferably 10% by mol or more, even more preferably 30% by mol or more, even more preferably 50% by mol or more, and most preferably 80% by mol or more.

[Polyisocyanate]

The polyisocyanate used to prepare the blocked polyisocyanate is a reactant obtained by reacting plural monomer compounds each having at least one isocyanate group (—NCO) (hereinafter, may be referred to as "isocyanate monomer").

The isocyanate monomer preferably has 4 to 30 carbon atoms. Specific examples of the isocyanate monomer include the following compounds. One of these isocyanate monomers may be used alone, or at least two thereof may be used in combination.

(1) Aromatic diisocyanates such as diphenylmethane 4,4'-diisocyanate (MDI), 1,5-naphthalene diisocyanate, tolylene diisocyanate (TDI), xylylene diisocyanate, and m-tetramethylxylylene diisocyanate (TMXDI).

(2) Aliphatic diisocyanates such as 1,4-tetramethylene diisocyanate, 1,6-hexamethylene diisocyanate (hereinafter, may be referred to as "HDI"), 2,2,4-trimethyl-1,6-diisocyanatohexane, 2,4,4-trimethyl-1,6-hexamethylene diisocyanate, 2-methylpentane-1,5-diisocyanate (MPDI) and lysine diisocyanate (hereinafter, may be referred to as "LDI").

(3) Alicyclic diisocyanates such as isophorone diisocyanate (hereinafter, may be referred to as "IPDI"), 1,3-bis(diisocyanatemethyl)cyclohexane, 4,4'-dicyclohexylmethane diisocyanate, diisocyanate norbornane, and di(isocyanatemethyl)norbornane.

(4) Triisocyanates such as 4-isocyanatemethyl-1,8-octamethylene diisocyanate (hereinafter, may be referred to as "NTI"), 1,3,6-hexamethylene triisocyanate (hereinafter, may be referred to as "HTI"), bis(2-isocyanatoethyl) 2-isocyanatoglutarate (hereinafter, may be referred to as "GTI"), and lysine triisocyanate (hereinafter, may be abbreviated as "LTI").

As an isocyanate monomer used to prepare the polyisocyanate, at least one diisocyanate selected from the group consisting of aliphatic diisocyanates and alicyclic diisocyanates is preferable from the viewpoint of excellent weather resistance. A diisocyanate monomer other than the above-mentioned aliphatic diisocyanates and alicyclic diisocyanates may be further used. HDI or IPDI is more preferably used as the isocyanate monomer from the viewpoint of ease of industrial availability. HID is more preferably used as the isocyanate monomer from the viewpoint of a decrease in the viscosity of the blocked polyisocyanate component.

As the isocyanate monomer used to prepare the polyisocyanate, although one of the aliphatic diisocyanates and the alicyclic diisocyanates may be used alone or the aliphatic diisocyanates and the alicyclic diisocyanates may be used in combination, it is preferable that the aliphatic diisocyanate and the alicyclic diisocyanate be used in combination, and it is particularly preferable that both HDI and IPDI be used in combination. The use of both the aliphatic diisocyanate and the alicyclic diisocyanate makes it possible to further improve the toughness and the hardness when made into a coating film.

In the polyisocyanate, the mass ratio of the constitution unit derived from the aliphatic diisocyanate to the constitution unit derived from the alicyclic diisocyanate is preferably 50/50 to 95/5, more preferably 60/40 to 92/8, and even more preferably 65/35 to 90/10.

In the case where the mass ratio of the constitution unit derived from the aliphatic diisocyanate to the constitution unit derived from the alicyclic diisocyanate is the above-mentioned lower limit or more, the deterioration of the flexibility when made into a coating film can be effectively suppressed. In contrast, in the case where the mass ratio is the above-mentioned upper limit or less, the hardness when made into a coating film can be further improved.

The mass ratio of the constitution unit derived from the aliphatic diisocyanate to the constitution unit derived from the alicyclic diisocyanate may be calculated by the method described in the first embodiment, for example.

The polyisocyanate preferably has an isocyanurate group, and may have at least one functional group selected from the group consisting of an allophanate group, an uretdione group, an iminooxadiazinedione group, an isocyanurate group, a urethane group and a biuret group in addition to the isocyanurate group.

(Polyol B)

Examples of the polyol B include trimethylolpropane, glycerol, and polycaprolactone polyols derived from a trivalent or more-valent polyvalent alcohol and ε-caprolactone.

Examples of commercially-available products of polycaprolactone polyols include "PLACCEL 303" (having a number-average molecular weight of 300), "PLACCEL 305" (having a number-average molecular weight of 550), "PLACCEL 308" (having a number-average molecular weight of 850), and "PLACCEL 309" (having a number-average molecular weight of 900), which are manufactured by DAICEL ChemTech, Inc.

(Preparation Method of Polyisocyanate)

The preparation method of the polyisocyanate will be explained in detail, below.

The polyisocyanate may be obtained, for example, by conducting simultaneously an allophanate-forming reaction to allow an allophanate group to be formed, a uretdione-forming reaction to allow a uretdione group to be formed, an iminooxadiazinedione-forming reaction to allow an iminooxadiazinedione group to be formed, an isocyanurate-forming reaction to allow an isocyanurate group to be formed, a urethane-forming reaction to allow a urethane group to be formed, and a biuret-forming reaction to allow a biuret group to be formed, in the presence of an excess amount of isocyanate monomers, followed by removing unreacted isocyanate monomers after an end of the reaction. Namely, the polyisocyanate obtained by the reactions is a reactant in which a plurality of the above-mentioned isocyanate monomers are bonded, and which has at least one selected from the group consisting of an allophanate group, a uretdione group, an iminooxadiazinedione group, an isocyanurate group, a urethane group and a biuret group.

Alternatively, the reactions may be conducted separately, followed by mixing the resultant polyisocyanates at specific ratios.

It is preferable that the above-mentioned reactions be conducted simultaneously to obtain a polyisocyanate from the viewpoint of the ease of preparation. It is preferable that the above-mentioned reactions be conducted separately, followed by mixing the resultants, from the viewpoint that the molar ratio of each functional group can be freely adjusted.

(1) Preparation Method of Allophanate Group-Containing Polyisocyanate

An allophanate group-containing polyisocyanate may be obtained by adding alcohol to isocyanate monomers and using an allophanate-forming reaction catalyst.

As the alcohol available to form an allophanate group, an alcohol composed of only carbon, hydrogen and oxygen is preferable.

Although the alcohol is not limited to the following specified alcohol, examples thereof include monoalcohols and dialcohols. One of these alcohols may be used alone or at least two thereof may be used in combination.

Examples of the monoalcohols include methanol, ethanol, propanol, butanol, pentanol, hexanol, heptanol, octanol, and nonanol.

Examples of the dialcohols include ethylene glycol, 1,3-butanediol, neopentyl glycol, and 2-ethylhexanediol.

Among them, the alcohol is preferably a monoalcohol, and more preferably a monoalcohol having a molecular weight or 200 or less.

Although the allophanate-forming reaction catalyst is not limited to the following compounds, examples thereof include alkylcarboxylic acid salts of tin, lead, zinc, bismuth, zirconium, or zirconyl.

Examples of the alkylcarboxylic acid salts of tin (organotin compounds) include tin 2-ethylhexanoate and dibutyltin dilaurate.

Examples of the alkylcarboxylic acid salts of lead (organolead compounds) include lead 2-ethylhexanoate.

Examples of the alkylcarboxylic acid salts of zinc (organozinc compounds) include zinc 2-ethylhexanoate.

Examples of the alkylcarboxylic acid salts of bismuth include bismuth 2-ethylhexanoate.

Examples of the alkylcarboxylic acid salts of zirconium include zirconium 2-ethylhexanoate.

Examples of the alkylcarboxylic acid salts of zirconyl include zirconyl 2-ethylhexanoate. One of these catalysts may be used alone or at least two thereof may be used in combination.

The below-mentioned isocyanurate-forming reaction catalyst may also serve as an allophanate-forming reaction catalyst. In the case where the below-mentioned isocyanurate-forming reaction catalyst is used to allow an allophanate-forming reaction to proceed, an isocyanurate group-containing polyisocyanate (hereinafter, may be referred to as "isocyanurate-type polyisocyanate") may also be generated naturally.

Among them, it is preferable that the below-mentioned isocyanurate-forming reaction catalyst be used as an allophanate-forming reaction catalyst to allow both the allophanate-forming reaction and the isocyanurate-forming reaction to proceed from the viewpoint of the economical productivity.

The lower limit of the used amount of the allophanate-forming reaction catalyst relative to the total mass of charged isocyanate monomers is preferably 10 ppm by mass, more preferably 20 ppm by mass, even more preferably 40 ppm by mass, and particularly preferably 80 ppm by mass.

The upper limit of the used amount of the allophanate-forming reaction catalyst relative to the total mass of charged isocyanate monomers is preferably 1,000 ppm by mass, more preferably 800 ppm by mass, even more preferably 600 ppm by mass, and particularly preferably 500 ppm by mass.

Namely, the used amount of the allophanate-forming reaction catalyst relative to the total mass of charged isocyanate monomers is preferably 10 ppm by mass to 1,000 ppm by mass, more preferably 20 ppm by mass to 800 ppm by mass, even more preferably 40 ppm by mass to 600 ppm by mass, and particularly preferably 80 ppm by mass to 500 ppm by mass.

The lower limit of the allophanate-forming reaction temperature is preferably 40° C., more preferably 60° C., even more preferably 80° C., and particularly preferably 100° C.

The upper limit of the allophanate-forming reaction temperature is preferably 180° C., more preferably 160° C., and even more preferably 140° C.

Namely, the allophanate-forming reaction temperature is preferably 40° C. to 180° C., more preferably 60° C. to 160° C., even more preferably 80° C. to 140° C., and particularly preferably 100° C. to 140° C.

In the case where the allophanate-forming reaction temperature is the above-mentioned lower limit or more, the reaction rate can be further improved. In the case where the allophanate-forming reaction temperature is the above-mentioned upper limit or less, the coloration of the polyisocyanate or the like tends to be suppressed further effectively.

(2) Preparation Method of Uretdione Group-Containing Polyisocyanate

In the case where an uretdione group-containing polyisocyanate is obtained from isocyanate monomers, the isocyanate monomers may be multimerized by using an uretdione-forming reaction catalyst or heating to obtain the uretdione group-containing polyisocyanate, for example.

Although the uretdione-forming reaction catalyst is not particularly limited, examples thereof include: tertiary phosphines such as trialkylphosphines, tris(dialkylamino)phosphines, and cycloalkylphosphines; and Lewis acids.

Examples of the trialkylphosphines include tri-n-butylphosphine, and tri-n-octylphosphine.

Examples of the tris(dialkylamino)phosphines include tris-(dimethylamino)phosphine.

Examples of the cycloalkylphosphines include cyclohexyl-di-n-hexylphosphine.

Examples of the Lewis acids include boron trifluoride and zinc chlorate.

Many of the uretdione-forming reaction catalysts can simultaneously promote the isocyanurate-forming reaction.

In the case where the uretdione-forming reaction catalyst is used, it is preferable that a deactivator against the uretdione-forming reaction catalyst, such as phosphoric acid or methyl paratoluene sulfonate be added to terminate the uretdione-forming reaction when a predetermined yield is obtained.

In the case where a uretdione group-containing polyisocyanate is obtained by heating at least one diisocyanate selected from the group consisting of the aliphatic diisocyanates and the alicyclic diisocyanates without using the uretdione-forming reaction catalyst, the heating temperature is preferably 120° C. or more, and more preferably 150° C. to 170° C. The heating time is preferably 1 hour to 4 hours.

(3) Preparation Method of Iminooxadiazinedione Group-Containing Polyisocyanate

In the case where an iminooxadiazinedione group-containing polyisocyanate is obtained from isocyanate monomers, an iminooxadiazinedione-forming reaction catalyst is generally used.

Examples of the iminooxadiazinedione-forming catalyst include the following compound 1) and 2).

1) (Poly)fluorohydrogens of general formula: M[Fn] or general formula: M[Fn(HF)m] (in the formulae, m and n are integers satisfying the relationship m/n>0, M is n charged cations (mixture) or one or more radicals which are n-valent in total.)
2) Compounds each composed of a compound of general formula: $R^1$—$CR'_2$—$C(O)O$— or general formula: $R^2$=$CR'$—$C(O)O$— and either a quaternary ammonium cation or a quaternary phosphonium cation (in the formulae, $R^1$ and $R^2$ are each independently a linear, branched, or cyclic saturated or unsaturated perfluoroalkyl group having 1 to 30 carbon atoms, a plurality of R' is each independently a hydrogen atom or an alkyl having 1 to 20 carbon atoms or an aryl group which may contain a hetero atom).

Specific examples of the compounds 1) ((poly)fluorohydrogens) include tetramethylammonium fluoride hydrate and tetraethylammonium fluoride.

Specific examples of the compounds 2) include 3,3,3-trifluorocarboxylic acid, 4,4,4,3,3-pentafluorobutanoic acid, 5,5,5,4,4,3,3-heptafluoropentanoic acid, and 3,3-difluoroprop-2-enoic acid.

Among them, as the iminooxadiazinedione-forming reaction catalyst, the compounds 1) are preferable from the viewpoint of the ease of availability, and the compounds 2) are preferable from the viewpoint of the safety.

Although the lower limit of the used amount of the iminooxadiazinedione-forming catalyst is not particularly limited, the lower limit relative to raw material isocyanate monomers such as HDI, indicated by mass ratio, is preferably 5 ppm, more preferably 10 ppm, and even more preferably 20 ppm, from the viewpoint of the reactivity.

The upper limit of the used amount of the iminooxadiazinedione-forming catalyst relative to raw material isocyanate monomers such as HDI, indicated by mass ratio, is preferably 5,000 ppm, more preferably 2,000 ppm, and even more preferably 500 ppm, from the viewpoint of the suppression of coloration and discoloration of the resultant product or the reaction control.

Namely, the used amount of the iminooxadiazinedione-forming catalyst relative to raw material isocyanate monomers such as HDI, indicated by mass ratio, is preferably 5 ppm to 5,000 ppm, more preferably 10 ppm to 2,000 ppm, and even more preferably 20 ppm to 500 ppm.

Although the lower limit of the iminooxadiazinedione-forming reaction temperature is not particularly limited, the lower limit is preferably 40° C., more preferably 50° C., and even more preferably 60° C., from the viewpoint of the reaction rate.

The upper limit of the iminooxadiazinedione-forming reaction temperature is preferably 150° C., more preferably 120° C., and even more preferably 110° C. from the viewpoint of the suppression of the coloration and the discoloration of the reactant product.

Namely, the iminooxadiazinedione-forming reaction temperature is preferably 40° C. to 150° C., more preferably 50° C. to 120° C., and even more preferably 60° C. to 110° C.

The iminooxadiazinedione-forming reaction may be terminated when the predetermined amount of iminooxadiazinedione groups is obtained. The iminooxadiazinedione-forming reaction may be terminated, for example, by adding an acidic compound to a reaction liquid. Examples of the acidic compound include phosphoric acid, acidic phosphoric acid ester, sulfuric acid, hydrochloric acid, and sulfonic acid compounds. Thus, an iminooxadiazinedione-forming reaction catalyst is neutralized or inactivated by thermal decomposition, chemical decomposition or the like. After the reaction is terminated, filtration is conducted, if needed.

(4) Preparation Method of Isocyanurate Group-Containing Polyisocyanate

As a catalyst used to obtain an isocyanurate group-containing polyisocyanate from isocyanate monomers, a generally used isocyanurate-forming reaction catalyst may be used.

Although the isocyanurate-forming reaction catalyst is not particularly limited, a basic catalyst is generally preferable. Specific examples of the isocyanurate-forming reaction catalyst include the following compounds.

1) Hydroxides of tetraalkylammoniums such as tetramethylammonium, tetraethylammonium, or tetrabutylammonium; and organic weak acid salts, such as acetic acid salts, propionic acid salts, octylic acid salts, capric acid salts, myristic acid salts, or benzoic acid salts, of the tetraalkylaammonium.
2) Hydroxides of aryl trialkylammoniums such as benzyltrimethylammonium or trimethylphenylammonium; and organic weak acid salts, such as acetic acid salts, propionic acid salts, octylic acid salts, capric acid salts, myristic acid salts, or benzoic acid salts, of the aryl trialkylammoniums.
3) Hydroxides of hydroxyalkylammoniums such as trimethylhydroxyethylammonium, trimethylhydroxypropylammonium, triethylhydroxyethylammonium, or triethylhydroxypropylammonium; and organic weak acid salts, such as acetic acid salts, propionic acid salts, octylic acid salts, capric acid salts, myristic acid salts, or benzoic acid salts, of the hydroxyalkylammoniums.
4) Metal salts, such as tin salts, zinc salts, or lead salts, of alkylcarboxylic acids such as acetic acid, propionic acid, caproic acid, octylic acid, capric acid, or myristic acid.
5) Metal alcoholate such as sodium alcoholate or potassium alcoholate.
6) Aminosilyl group-containing compounds such as hexamethylene disilazane.
7) Mannich bases.
8) Mixtures of tertiary amines and epoxy compounds.
9) Phosphorus-based compounds such as tributylphosphine.

Among them, the isocyanurate-forming reaction catalyst is preferably a hydroxide of quaternary ammonium or an organic weak acid salt of quaternary ammonium, and more preferably a hydroxide of tetraalkylammonium, an organic weak acid salt of tetraalkylammonium, a hydroxide of aryl trialkylammonium, or an organic weak acid salt of aryl trialkylammonium from the viewpoint of unlikely generating unnecessary side-reactant products.

The upper limit of the used amount of the isocyanurate-forming reaction catalyst relative to the total mass of charged isocyanate monomers is preferably 1,000 ppm by mass, more preferably 500 ppm by mass, and even more preferably 100 ppm by mass.

In contrast, although the lower limit of the used amount of the isocyanurate-forming reaction catalyst is not particularly limited, the lower limit may be 10 ppm by mass, for example.

The isocyanurate-forming reaction temperature is preferably 50° C. to 120° C., and more preferably 60° C. to 90° C. In the case where the isocyanurate-forming reaction temperature is the above-mentioned upper limit or less, the coloration of the polyisocyanate or the like tends to be suppressed further effectively.

The isocyanurate-forming reaction is terminated by adding an acidic compound (such as phosphoric acid or acidic phosphoric acid ester) when the predetermined conversion ratio (ratio of the mass of the polyisocyanate produced by the isocyanurate-forming reaction to the mass of charged isocyanate monomers) is obtained.

In order to obtain a polyisocyanate, it is required to stop the progress of the reaction at an initial stage. However, the isocyanurate-forming reaction rate at the initial stage is so rapid that it is difficult to stop the progress of the reaction at the initial stage, and therefore the reaction conditions, especially the addition amount of the catalyst and the addition method thereof, need to be carefully selected. For example, a method of partitioning and adding a catalyst for a constant time period is recommended as a preferred method.

Therefore, the conversion ratio of the isocyanurate-forming reaction to obtain the polyisocyanate is preferably 10% to 60%, more preferably 15% to 55%, and even more preferably 20% to 50%.

In the case where the conversion ratio of the isocyanurate-forming reaction is the above-mentioned upper limit or less, the viscosity of the blocked polyisocyanate component can be further decreased. In the case where the conversion ratio of the isocyanurate-forming reaction is the above-mentioned lower limit or more, the procedure of terminating the reaction can be conducted further easily.

A monovalent to hexavalent alcohol may be used in addition to the above-mentioned isocyanate monomers to obtain the isocyanurate group-containing polyisocyanate.

Examples of the available monovalent to hexavalent alcohols include non-polymerizable alcohols, and polymerizable alcohols. The term "non-polymerizable alcohol" refers to an alcohol free from any polymerizable groups. In contrast, the term "polymerizable alcohol" refers to an alcohol obtained by polymerizing monomers having a polymerizable group and a hydroxyl group.

Examples of the non-polymerizable alcohol include polyvalent alcohols such as monoalcohols, diols, triols, and tetraols.

Examples of the monoalcohols include methanol, ethanol, n-propanol, isopropanol, n-butanol, isobutanol, sec-butanol, n-pentanol, n-hexanol, n-octanol, n-nonanol, 2-ethylbutanol, 2,2-dimethylhexanol, 2-ethylhexanol, cyclohexanol, methylcyclohexanol, and ethylcyclohexanol.

Examples of the diols include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethyl pentanediol, 2-butyl-2-ethyl-1,3-propanediol, and 2,2-diethyl-1,3-propanediol.

Examples of the triols include glycerine, and trimethylolpropane.

Examples of the tetraols include pentaerythritol.

Although the polymerizable alcohol is not particularly limited, examples thereof include polyester polyols, polyether polyols, acrylic polyols, and polyolefin polyols.

Although the polyester polyol is not particularly limited, examples thereof include reactant products obtained by condensation reaction of one or a mixture of dibasic acids and one or a mixture of polyvalent alcohols.

Although the dibasic acid is not particularly limited, examples thereof include at least one dibasic acid selected from the group consisting of succinic acid, adipic acid, sebacic acid, dimeric acid, maleic anhydride, phthalic anhydride, isophthalic acid, and terephthalic acid.

Although the polyvalent alcohol is not particularly limited, examples thereof include at least one polyvalent alcohol selected from the group consisting of ethylene glycol, propylene glycol, diethylene glycol, neopentyl glycol, trimethylolpropane, and glycerol.

Examples of the polyester polyols include polycaprolactones obtained by subjecting ε-caprolactone to ring-opening polymerization using the above-mentioned polyvalent alcohol.

Although the polyether polyols are not particularly limited, examples thereof include: polyether polyols obtained by adding one or a mixture of alkylene oxides to one or a mixture of polyvalent alcohols using an alkali metal hydroxide or a strong basic catalyst; polyether polyols obtained by reacting an alkylene oxide with a polyamine compound; and polymer polyols obtained by polymerizing acrylamides using the above-mentioned polyethers as mediums.

Examples of the alkali metal include lithium, sodium, and potassium.

Examples of the strong basic catalyst include alkolates, and alkylamines.

Examples of the polyvalent alcohol include those mentioned above for the polyester polyols.

Examples of the alkylene oxide include ethylene oxide, propylene oxide, butylene oxide, cyclohexene oxide, and styrene oxide.

Examples of the polyamine compound include ethylene diamine.

Although the acrylic polyols are not particularly limited, examples thereof include ones obtained by copolymerizing one or a mixture of ethylenically unsaturated bond-containing monomers having a hydroxyl group with one or a mixture of ethylenically unsaturated bond-containing monomers copolymerizable therewith and different therefrom.

Although the ethylenically unsaturated bond-containing monomers having a hydroxyl group are not particularly limited, examples thereof include hydroxyethyl acrylate, hydroxypropyl acrylate, hydroxybutyl acrylate, hydroxyethyl methacrylate, hydroxypropyl methacrylate, and hydroxybutyl methacrylate.

Although the ethylenically unsaturated bond-containing monomers copolymerizable with the ethylenically unsaturated bond-containing monomer having a hydroxyl group and different therefrom are not particularly limited, examples thereof include acrylic acid esters, methacrylic acid esters, unsaturated carboxylic acids, unsaturated amides, vinyl-based monomers, and vinyl-based monomers having a hydrolyzable silyl group.

Examples of the acrylic acid esters include methyl acrylate, ethyl acrylate, propyl acrylate, isopropyl acrylate, n-butyl acrylate, isobutyl acrylate, n-hexyl acrylate, cyclohexyl acrylate, 2-ethylhexyl acrylate, lauryl acrylate, benzyl acrylate, and phenyl acrylate.

Examples of the methacrylic acid esters include methyl methacrylate, ethyl methacrylate, propyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, and phenyl methacrylate.

Examples of the unsaturated carboxylic acids include acrylic acid, methacrylic acid, maleic acid, and itaconic acid.

Examples of the unsaturated amides include acrylamide, methacrylamide, N,N-methylenebisacrylamide, diacetoneacrylamide, diacetonemethacrylamide, maleic acid amide, and maleimide.

Examples of the vinyl-based monomers include glycidyl methacrylate, styrene, vinyltoluene, vinyl acetate, acrylonitrile, and dibutyl fumarate.

Examples of the vinyl-based monomers having a hydrolyzable silyl group include vinyl trimethoxysilane, vinylmethyl dimethoxysilane, and γ-(meth)acryloxypropyl trimethoxysilane.

Examples of the polyolefin polyols include polybutadienes having hydroxylated terminal and hydrogen additives thereof.

(5) Preparation Method of Urethane Group-Containing Polyisocyanate

In the case where a urethane group-containing polyisocyanate is obtained from isocyanate monomers, the urethane group-containing polyisocyanate may be prepared by mixing an excess amount of isocyanate monomers and the polyol B, and, as needed, an alcohol other than the polyol B, followed by adding a urethane-forming reaction catalyst thereto, as needed, for example.

Examples of the alcohol include alcohols which are exemplified as the "monovalent to hexavalent alcohol" excluding the polyol B.

Although the urethane-forming reaction catalyst is not particularly limited, examples thereof include tin-based compounds, zinc-based compounds, and amine-based compounds.

The urethane-forming reaction temperature is preferably 50° C. to 160° C., and more preferably 60° C. to 120° C.

In the case where the urethane-forming reaction temperature is the above-mentioned upper limit or less, the coloration of the polyisocyanate or the like tends to be suppressed further effectively.

The urethane-forming reaction time is preferably 30 minutes to 4 hours, more preferably 1 hour to 3 hours, and even more preferably 1 hour to 2 hours.

The molar ratio of isocyanate groups of isocyanate monomers to hydroxy groups of the polyol B (and, as needed, alcohol other than the polyol B) is preferably 2/1 to 50/1. In the case where the molar ratio is the above-mentioned lower limit or more, the viscosity of the polyisocyanate can be further decreased. In the case where the molar ratio is the above-mentioned upper limit or less, the yield of the urethane group-containing polyisocyanate can be increased.

(6) Preparation Method of Biuret Group-Containing Polyisocyanate

Although a biuret-forming agent to be used to obtain a biuret group-containing polyisocyanate from isocyanate monomers is not particularly limited, examples thereof include water, monovalent tertiary alcohols, formic acid, organic primary monoamines, and organic primary diamines.

The molar amount of isocyanate groups to one mol of the biuret-forming agent is preferably 6 mol or more, more preferably 10 mol or more, and even more preferably 10 mol to 80 mol. In the case where the molar amount of isocyanate groups to one mol of the biuret-forming agent is the above-mentioned lower limit or more, the viscosity of the polyisocyanate is sufficiently decreased. In the case where the molar amount of isocyanate groups to one mol of the biuret-forming agent is the above-mentioned upper limit or less, the low-temperature curability of the resultant resin film is further improved.

A solvent may be used to conduct the biuret-forming reaction. The solvent may be any one which allows isocyanate monomers and a biuret-forming agent such as water to be dissolved therein to form a homogeneous phase under reaction conditions.

Specific examples of the solvent include ethylene glycol-based solvents and phosphoric acid-based solvents.

Examples of the ethylene glycol-based solvents include ethylene glycol monomethyl ether acetate, ethylene glycol monoethyl ether acetate, ethylene glycol mono-n-propyl ether acetate, ethylene glycol monoisopropyl ether acetate, ethylene glycol mono-n-butyl ether acetate, ethylene glycol diacetate, ethylene glycol dimethyl ether, ethylene glycol diethyl ether, ethylene glycol di-n-propyl ether, ethylene glycol diisopropyl ether, ethylene glycol di-n-butyl ether, ethylene glycol methylethyl ether, ethylene glycol methylisopropyl ether, ethylene glycol methyl-n-butyl ether, ethylene glycol ethyl-n-propyl ether, ethylene glycol ethylisopropyl ether, ethylene glycol ethyl-n-butyl ether, ethylene glycol n-propyl-n-butyl ether, ethylene glycol isopropyl-n-butyl ether, diethylene glycol monomethyl ether acetate, diethylene glycol monoethyl ether acetate, diethylene glycol mono-n-propyl ether acetate, diethylene glycol monoisopropyl ether acetate, diethylene glycol mono-n-butyl ether acetate, diethylene glycol diacetate, diethylene glycol dimethyl ether, diethylene glycol diethyl ether, diethylene glycol di-n-propyl ether, diethylene glycol diisopropyl ether, diethylene glycol di-n-butyl ether, diethylene glycol methylethyl ether, diethylene glycol methylisopropyl ether, diethylene glycol methyl-n-propyl ether, diethylene glycol methyl-n-butyl ether, diethylene glycol ethylisopropyl ether, diethylene glycol ethyl-n-propyl ether, diethylene glycol ethyl-n-butyl ether, diethylene glycol n-propyl-n-butyl ether, and diethylene glycol isopropyl-n-butyl ether.

Examples of the phosphoric acid-based solvents include trimethyl phosphate, triethyl phosphate, tripropyl phosphate, and tributyl phosphate.

One of these solvents may be used alone or at least two thereof may be used in combination.

Among these, ethylene glycol monomethyl ether acetate, ethylene glycol monoethyl ether acetate, ethylene glycol diacetate or diethylene glycol dimethyl ether is preferable as the ethylene glycol-based solvent.

Trimethyl phosphate or triethyl phosphate is preferable as the phosphoric acid-based solvent.

The biuret-forming reaction temperature is preferably 70° C. to 200° C., and more preferably 90° C. to 180° C. In the case where the biuret-forming reaction temperature is the above-mentioned upper limit or less, the coloration of the polyisocyanate tends to be further effectively prevented.

The above-mentioned allophanate-forming reaction, uretdione-forming reaction, iminooxadiazinedione-forming reaction, isocyanurate-forming reaction, urethane-forming reaction and biuret-forming reaction may be conducted sequentially or some of the reactions may be conducted in parallel.

Unreacted isocyanate monomers may be removed by thin film evaporation or extraction from a reaction liquid after the reaction is terminated to obtain the polyisocyanate.

In addition, an antioxidant or an ultraviolet absorber may be added to the obtained polyisocyanate, so as to suppress coloration when being stored, for example.

Examples of the antioxidant include hindered phenols such as 2,6-di-tert-butyl-p-cresol. Examples of the ultraviolet absorber include benzotriazole and benzophenone. One of these antioxidants and ultraviolet absorbers may be used alone, or at least two thereof may be used in combination. The addition amount thereof is preferably 10 ppm by mass to 500 ppm by mass relative to the mass of the polyisocyanate.

[Active Hydrogen Compound]

The active hydrogen compound according to the present embodiment is the same as the active hydrogen compound according to the first embodiment.

[Polyol A]

The polyol A is preferable as the active hydrogen compound according to the present embodiment.

In a molecule of the blocked polyisocyanate, a urethane bond is formed by a hydroxy group of the polyol A and an isocyanate group of the polyisocyanate to allow a constitution unit derived from the polyol A to bond with the polyisocyanate. Alternatively, a hydroxy group of the polyol A and an ester group of the blocked polyisocyanate are bonded by an ester exchange reaction.

Examples of such a polyol A include at least one polyol selected from the group consisting of: 1,4-butanediol; 1,6-hexanediol; 3-methyl-1,5-pentanediol; 1,4-cyclohexanedimethanol; glycerol; polycaprolactone polyols derived therefrom with ε-caprolactone; polyether polyols; polycarbonate polyols; and acrylic polyols. Among them, at least one diol selected from the group consisting of 1,4-butanediol, 1,6-hexanediol, 3-methyl-1,5-pentanediol, 1,4-cyclohexanedimethanol, and glycerol; or polycaprolactone diols derived from these diols and ε-caprolactone are preferable, at least one diol selected from the group consisting of 1,4-butanediol, 1,6-hexanediol, 3-methyl-1,5-pentanediol and 1,4-cyclohexanedimethanol; or polycaprolactone diols derived from these diols and ε-caprolactone are more preferable, and 1,4-butanediol or polycaprolactone diols are even more preferable.

Examples of commercially-available polycaprolactone diol products include those mentioned in the first embodiment.

The molar ratio of hydroxy groups contained in the polyol A to the constitution unit (I) (OH/constitution unit (I)) is preferably 0.5/99.5 to 15/85, and more preferably 6/94 to 15/85. In the case where the molar ratio (OH/constitution unit (I)) is within the above-mentioned range, the blocked polyisocyanate composition has a highly-flexible structure, and a cross-linking structure is readily formed when mixed with the main agent, thereby tending to improve the curability at a low temperature, the hardness, the strength and the solvent resistance when made into a coating film.

The amount (mol) of hydroxy groups contained in the polyol A is calculated from formulation amounts of the polyol A and the blocking agent, or is measured by a gas chromatography/mass spectrometry method (GC/MS method), and the amount (mol) of the constitution unit (I) is measured by $^{13}$C-NMR.

[Blocking Agent]

The blocking agent contains a malonic acid ester.

(Malonic Acid Ester Having a Tertiary Alkyl Group)

The blocking agent preferably contains a malonic acid ester having a tertiary alkyl group. One malonic acid ester having a tertiary alkyl group or at least two thereof may be contained in the blocking agent.

Although the malonic acid ester having a tertiary alkyl group is not particularly limited, examples thereof include the same as those mentioned in the first embodiment.

(Malonic Acid Ester Having a Secondary Alkyl Group)

The blocking agent preferably contains a malonic acid ester having a secondary alkyl group. One malonic acid ester having a secondary alkyl group or at least two thereof may be contained in the blocking agent.

Although the malonic acid ester having a secondary alkyl group is not particularly limited, examples thereof include the same as those mentioned in the first embodiment.

Among them, it is preferable that the blocking agent contain diisopropyl malonate as the malonic acid ester having a secondary alkyl group, and di-tert-butyl malonate or (2-methyl-2-butyl)isopropyl malonate as the malonic acid ester having a tertiary alkyl group.

(Other Blocking Agent)

The blocking agent used to prepare the blocked polyisocyanate may further contain another blocking agent in addition to the malonic acid ester having a secondary alkyl group and the malonic acid ester having a tertiary alkyl group within a range in which the storage stability of the resultant resin composition and the low-temperature curability of the resultant resin film are not deteriorated. Examples of another blocking agent include the same compounds as those mentioned in the first embodiment.

The amount of the malonic acid ester having a secondary alkyl group and the malonic acid ester having a tertiary alkyl group relative to the total mol of all blocking agents used to prepare the blocked polyisocyanate is preferably 50% by mol or more, and more preferably 70% by mol or more, even more preferably 90% by mol or more, particularly preferably 95% by mol or more, and most preferably 100% by mol.

In the case where the amount of the malonic acid ester having a secondary alkyl group and the malonic acid ester having a tertiary alkyl group is within the above-mentioned range, the low-temperature curability of the resultant resin film can be further improved.

[Hydrophilic Compound]

At least a part of the blocked polyisocyanate may contain a constitution unit derived from a hydrophilic compound, namely, a hydrophilic group.

A hydrophilic compound is a compound having a hydrophilic group. The hydrophilic compound preferably has at least one active hydrogen group that reacts with at least one isocyanate group of the polyisocyanate relative to one molecule of the hydrophilic compound, in addition to the hydrophilic group. Specific examples of the active hydrogen group include a hydroxyl group, a mercapto group, a carboxylic acid group, an amino group, and a thiol group.

Examples of the hydrophilic compound include nonionic compounds, cationic compounds, and anionic compounds. One of these hydrophilic compounds may be used alone, or at least two thereof may be used in combination. Among them, the hydrophilic compound is preferably a nonionic compound from the viewpoint of ease of availability and resistance to electrical interaction with the formulated components, and is preferably an anionic compound from the viewpoint of suppressibility of the decrease in the hardness of the resultant resin film.

(Nonionic Compound)

Specific examples of the nonionic compound include monoalcohols, and compounds formed by adding an ethylene oxide to a hydroxyl group of an alcohol. Examples of the monoalcohols include methanol, ethanol, and butanol. Examples of the compounds formed by adding an ethylene oxide to a hydroxyl group of an alcohol include ethylene glycol, diethylene glycol, and polyethylene glycol. These nonionic compounds have an active hydrogen group that reacts with an isocyanate group.

Among them, the nonionic compound is preferably a polyethylene glycol monoalkyl ether formed by adding an ethylene oxide to a hydroxyl group of a monoalcohol, from the viewpoint that a small used amount thereof makes it possible to improve the dispersibility in water of the blocked polyisocyanate composition.

The addition number of ethylene oxide of the compounds formed by addition of ethylene oxide is preferably 4 to 30, and more preferably 4 to 20. In the case where the addition number of ethylene oxide is the above-mentioned lower limit or more, the dispersibility in water tends to be further effectively imparted to the blocked polyisocyanate composition. In the case where the addition number of ethylene oxide is the above-mentioned upper limit or less, generation of precipitate in the blocked polyisocyanate composition when stored at a low temperature tends to be further suppressed.

The lower limit of the amount of nonionic hydrophilic groups added to the blocked polyisocyanate (hereinafter, may be referred to as "amount of nonionic hydrophilic groups") relative to the mass of the solid content of the blocked polyisocyanate composition is preferably 0.1% by mass, more preferably 0.15% by mass, even more preferably 0.20% by mass, and particularly preferably 0.25% by mass, from the viewpoint of the dispersion stability in water of the blocked polyisocyanate composition.

The upper limit of the amount of nonionic hydrophilic groups relative to the mass of the solid content of the blocked polyisocyanate composition is preferably 55% by mass, more preferably 50% by mass, even more preferably 48% by mass, and particularly preferably 44% by mass, from the viewpoint of water resistance of the resultant resin film.

Namely, the amount of nonionic hydrophilic groups relative to the mass of the solid content of the blocked polyisocyanate composition is preferably 0.1% by mass to 55% by mass, more preferably 0.15% by mass to 50% by mass, even more preferably 0.20% by mass to 48% by mass, and particularly preferably 0.25% by mass to 44% by mass.

In the case where the amount of nonionic hydrophilic groups is within the above-mentioned range, the blocked polyisocyanate composition tends to be further dispersed in water, and a homogeneous film tends to be formed.

In the case where the amount of nonionic hydrophilic groups added to the blocked polyisocyanate is indicated by the molar ratio, the amount relative to 100% by mol of isocyanate groups of the raw material polyisocyanate is preferably 0.05% by mol to 8% by mol, more preferably 0.10% by mol to 5% by mol, even more preferably 0.15% by mol to 4% by mol, particularly preferably 0.15% by mol to 3% by mol, and most preferably 0.15% by mol to 2% by mol.

(Cationic Compound)

Specific examples of the cationic compound include compounds having both a cationic hydrophilic group and an active hydrogen group. Furthermore, a compound having an active hydrogen group such as a glycidyl group and a compound having a cationic hydrophilic group such as sulfide or phosphine may be combined to be used as hydrophilic compounds. In this case, a compound having an isocyanate group and a compound having an active hydrogen group are reacted in advance to add a functional group such as a glycidyl group, followed by reacting the resultant with a compound such as sulfide or phosphine. A compound having both a cationic hydrophilic group and an active hydrogen group is preferable from the viewpoint of ease of preparation.

Specific examples of the compound having both a cationic hydrophilic group and an active hydrogen group include dimethylethanolamine, diethylethanolamine, diethanolamine, and methyldiethanolamine. A tertiary amino group added using the compound may be quaternized with dimethyl sulfate or diethyl sulfate, for example.

The cationic compound may be reacted with an alicyclic polyisocyanate in the presence of a solvent. In this case, the solvent is preferably free from any active hydrogen groups, and specific examples thereof include ethyl acetate, propylene glycol monomethyl ether acetate and dipropylene glycol dimethyl ether.

The cationic hydrophilic group added to the blocked polyisocyanate is preferably neutralized with a compound having an anionic group. Specific examples of the anionic group include a carboxy group, a sulfonic acid group, a phosphoric acid group, halogen groups, and a sulfuric acid group.

Specific examples of the compound having a carboxyl group include formic acid, acetic acid, propionic acid, butyric acid, and lactic acid.

Specific examples of the compound having a sulfonic acid group include ethane sulfonic acid.

Specific examples of the compound having a phosphoric acid group include phosphoric acid, and acidic phosphoric acid ester.

Specific examples of the compound having a halogen group include hydrochloric acid.

Specific examples of the compound having a sulfuric acid group include sulfuric acid.

Among them, the compound having an anionic group is preferably a compound having a carboxyl group, and more preferably acetic acid, propionic acid or butyric acid.
(Anionic Compound)

Specific examples of the anionic hydrophilic group include a carboxy group, a sulfonic acid group, a phosphoric acid group, halogen groups, and a sulfuric acid group.

Specific examples of the anionic compound include compounds having both an anionic group and an active hydrogen group, and further specific examples thereof include compounds having, as an anionic group, a carboxy group of monohydroxycarboxylic acids or polyhydroxycarboxylic acids.

Examples of the monohydroxycarboxylic acid include 1-hydroxyacetic acid, 3-hydroxypropanic acid, 12-hydroxy-9-octadecanoic acid, hydroxypivalic acid, and lactic acid.

Examples of the compounds having, as an anionic group, a carboxy group of polyhydroxycarboxylic acids include dimethylol acetic acid, 2,2-dimethylol butyric acid, 2,2-dimethylol pentanoic acid, dihydroxysuccinic acid, and dimethylol propionic acid.

Furthermore, compounds having both a sulfonic acid group and an active hydrogen group may be used, and specific examples thereof include isethionic acid.

Among them, the compound having both an anionic group and an active hydrogen group is preferably hydroxylpivalic acid or dimethylol propionic acid.

The anionic hydrophilic group added to the blocked polyisocyanate is preferably neutralized with an amine-based compound which is a basic substance.

Specific examples of the amine-based compound include ammonia, and water-soluble amino compounds.

Specific examples of the water-soluble amino compound include monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, and morpholine. Furthermore, tertiary amines such as triethylamine or dimethylethanolamine may be used. One of the amine-based compounds may be used alone or a combination of at least two thereof may be used.
<Other Constitution Component>

The blocked polyisocyanate composition according to the present embodiment may further include an additive such as a solvent in addition to the blocked polyisocyanate.

Examples of the solvent include the same solvents as those mentioned in the first embodiment.
<Preparation Method of Blocked Polyisocyanate Composition>

Although the blocked polyisocyanate composition is not particularly limited, the blocked polyisocyanate composition may be obtained by reacting the polyisocyanate, the active hydrogen compound and the blocking agent, for example. These compounds may be reacted simultaneously to prepare the blocked polyisocyanate composition. The polyisocyanate and the active hydrogen compound may be reacted to obtain a polyisocyanate modified with the active hydrogen compound, followed by reacting the polyisocyanate modified with the active hydrogen compound and the blocking agent to prepare the blocked polyisocyanate composition. Alternatively, the polyisocyanate and the blocking agent may be reacted to obtain a partially blocked polyisocyanate in which isocyanate groups of the polyisocyanate are partially or entirely blocked by the blocking agent, followed by reacting the partially blocked polyisocyanate and the active hydrogen compound to prepare a blocked polyisocyanate composition.

The modification reaction of the polyisocyanate (or partially blocked polyisocyanate) with the active hydrogen compound can be conducted without depending on the presence or absence of a solvent.

The addition amount of the active hydrogen compound relative to 100 parts by mass of the polyisocyanate is preferably 0.05 parts by mass to 10 parts by mass, more preferably 0.1 parts by mass to 9 parts by mass, even more preferably 0.25 parts by mass to 8 parts by mass, and even more preferably 0.3 parts by mass to 7 parts by mass. In the case where the addition amount of the active hydrogen compound is the above-mentioned lower limit or more, the curability at a low temperature of about 80° C., the hardness and the strength when made into a coating film tend to be excellent. In contrast, in the case where the addition amount of the active hydrogen compound is the above-mentioned upper limit or less, the gelation when the blocked polyisocyanate composition is synthesized can be suppressed, and the storage stability of the resultant resin composition can be made to be favorable.

In the case where a solvent is used at the time of the modification reaction of the polyisocyanate (or partially blocked polyisocyanate) with the active hydrogen compound, a solvent inert to isocyanate groups may be used.

The reaction temperature of the polyisocyanate (or partially blocked polyisocyanate) and the active hydrogen compound is preferably 50° C. to 160° C., and more preferably 60° C. to 120° C.

In the case where the reaction temperature is the above-mentioned lower limit or more, the reactivity tends to be enhanced. In the case where the reaction temperature is the above-mentioned upper limit or less, the coloration of the polyisocyanate or the gelation tends to be suppressed further effectively.

Although the blocking reaction of the polyisocyanate (or the polyisocyanate modified with the active hydrogen compound) and the blocking agent is not particularly limited, examples thereof include the following two methods in a similar manner to that of the blocking reaction of the diisocyanate and the blocking agent in the first embodiment.

1) A method in which the polyisocyanate (or the polyisocyanate modified with the active hydrogen compound), the malonic acid ester having a tertiary alkyl group, and either the malonic acid ester having a secondary alkyl group or the malonic acid ester having a primary alkyl group are reacted.

2) A method in which the polyisocyanate (or the polyisocyanate modified with the active hydrogen compound), and at least one blocking agent selected from the group consisting of the malonic acid ester having a tertiary alkyl group, the malonic acid ester having a secondary alkyl group and the malonic acid ester having a primary alkyl group are reacted, followed by adding an alcohol having a chained alkyl group to the obtained reactant to introduce an alkyl group derived from the alcohol by ester exchange at the terminal ester portion of the reactant.

The blocking reaction of the polyisocyanate (or the polyisocyanate modified with the active hydrogen compound) and the blocking agent can be conducted without depending on the presence or absence of a solvent.

The addition amount of the blocking agent relative to the total mol of isocyanate groups may be generally 80% by mol to 200% by mol, and is preferably 90% by mol to 150% by mol.

In the case where the malonic acid ester having a secondary alkyl group and the malonic acid ester having a tertiary alkyl group are used in the blocking agent to be added, the molar ratio of the malonic acid ester having a secondary alkyl group to the malonic acid ester having a tertiary alkyl group (the malonic acid ester having a secondary alkyl/the malonic acid ester having a tertiary alkyl) is preferably more than 5/95 and less than 95/5, more preferably 7/93 to 93/7, even more preferably 10/90 to 93/7, even more preferably 20/80 to 93/7, and particularly preferably 30/70 to 93/7. In the case where the molar ratio is the above-mentioned lower limit or more, the storage stability of the resultant resin composition can be made to be favorable. In the case where the molar ratio is the above-mentioned upper limit or less, the low-temperature curability of the resultant resin film can be made to be favorable.

In the case where a solvent is used at the time of the blocking reaction, a solvent inert to isocyanate groups may be used.

In the case where the solvent is used, the amount of the solvent (non-volatile content) relative to 100 parts by mass of the blocked polyisocyanate composition may be generally 10 parts by mass to 95 parts by mass, and is preferably 20 parts by mass to 80 parts by mass, and more preferably 30 parts by mass to 75 parts by mass.

In the blocking reaction, an organic metal salt of tin, zinc, or lead, a tertiary amine-based compound or an alkali metal alcoholate of sodium or the like may be used as the catalyst.

The addition amount of the catalyst is varied depending on the temperature at the blocking reaction or the like, the addition amount relative to 100 parts by mass of the polyisocyanate may be generally 0.05 parts by mass to 1.5 parts by mass, and preferably 0.1 parts by mass to 1.0 parts by mass.

The blocking reaction may be conducted generally at −20° C. to 150° C., preferably 0° C. to 100° C., and more preferably 10° C. to 80° C. In the case where the temperature at the blocking reaction is the above-mentioned lower limit or more, the reaction rate can be further enhanced. In the case where the temperature is the above-mentioned upper limit or less, the side reaction can be further suppressed.

After the blocking reaction, a neutralization treatment may be conducted by adding an acidic compound or the like.

As the acidic compound, the same compound as mentioned in the first embodiment may be used.

In the case where the method 2) is adopted to conduct preparation, an ester exchange reaction is conducted following the blocking reaction.

As the alcohol having a chained alkyl group used in the ester exchange reaction in the method 2), the same alcohol as mentioned in the first embodiment may be used.

Furthermore, the chained alkyl group included in the alcohol may be identical to or different from the chained alkyl group of the blocking agent. In the case where the chained alkyl group included in the alcohol is different from the chained alkyl group of the blocking agent, a monoalcohol having a chained alkyl group in which the number of alkyl substituents is different from that of the blocking agent is preferably used. Specifically, in the case where one malonic acid ester having a secondary alkyl group is used alone as the blocking agent, a monoalcohol having a tertiary alkyl group may be used, for example.

In the case where the method 2) is adopted to conduct preparation, it is preferable that the generated alcohol or the residue of added alcohol be removed by distillation under ordinary pressure or reduced pressure during the ester exchange reaction or after the ester exchange reaction.

Among them, it is preferable that the generated alcohol be removed by conducting an operation such as distillation during the ester exchange reaction so as to allow the ester exchange reaction to proceed efficiently. In this case, it is preferable, so as to efficiently remove an alcohol component generated by the exchange reaction, that the boiling point of an alcohol component to be added be higher than the boiling point of the generated alcohol component.

The ester exchange reaction may be generally conducted at 0° C. to 150° C., and preferably at 30° C. to 120° C., and more preferably at 50° C. to 100° C. In the case where the temperature at the ester exchange reaction is the above-mentioned lower limit or more, the reaction rate can be further enhanced. In the case where the temperature is the above-mentioned upper limit or less, the side reaction can be further suppressed.

The amount of the alcohol component in the blocked polyisocyanate composition relative to 100 parts by mass of the solid content in the blocked polyisocyanate composition is preferably 0.05 parts by mass to 41 parts by mass, more preferably 0.1 parts by mass to 30 parts by mass, and even more preferably 0.5 parts by mass to 10 parts by mass. In the case where the amount of the alcohol component is the above-mentioned lower limit or more, the storage stability of the resultant coating material becomes favorable. In the case where the amount is the above-mentioned upper limit or less, the viscosity-increase when formulated in an aqueous coating material can be suppressed.

In the case where the hydrophilic compound is used, the polyisocyanate, the active hydrogen compound, the blocking agent and the hydrophilic compound may be reacted.

The reaction of the polyisocyanate and the active hydrogen compound, the reaction of the polyisocyanate and the hydrophilic compound and the reaction of the polyisocyanate and the blocking agent may be conducted simultaneously, or, one of the reactions may be conducted in advance, followed by conducting the other reactions. Among them, it is preferable that the reaction of the polyisocyanate and the hydrophilic compound be conducted in advance to obtain a polyisocyanate modified with the hydrophilic compound, followed by reacting the resultant polyisocyanate modified with the hydrophilic compound and the active hydrogen compound or the blocking agent simultaneously or sequentially. Any of the reaction of the polyisocyanate modified with the hydrophilic compound and the active hydrogen compound and the reaction of the polyisocyanate modified with the hydrophilic compound and the blocking agent may be conducted in advance.

In the reaction of the polyisocyanate and the hydrophilic compound, an organic metal salt, a tertiary amine-based compound or an alkali metal alcoholate may be used as the catalyst. Examples of metal constituting the organic metal salt include tin, zinc and lead. Examples of alkali metal include sodium.

The reaction temperature of the polyisocyanate and the hydrophilic compound is preferably −20° C. to 150° C., and more preferably 30° C. to 130° C. In the case where the reaction temperature is the above-mentioned lower limit or more, the reactivity tends to be further enhanced. In the case where the reaction temperature is the above-mentioned upper limit or less, the side reaction tends to be suppressed further effectively.

It is preferable that the hydrophilic compound be completely reacted with the polyisocyanate such that no hydrophilic compound remains in an unreacted state. The absence of the unreacted hydrophilic compound tends to further suppress effectively the decrease in the dispersion stability in water of the blocked polyisocyanate composition and the curability at a low temperature when made into a resin film.

The reaction of the polyisocyanate modified with the hydrophilic compound and the active hydrogen compound and the reaction of the polyisocyanate modified with the hydrophilic compound and the blocking agent may be conducted by the method mentioned above to conduct the modification reaction with the active hydrogen compound or the blocking reaction.

<Characteristics of Blocked Polyisocyanate Composition>
[Weight-Average Molecular Weight Mw]

The weight-average molecular weight Mw of the blocked polyisocyanate composition according to the present embodiment is preferably $3.0 \times 10^3$ or more, more preferably $3.0 \times 10^3$ to $2.0 \times 10^5$, even more preferably $4.0 \times 10^3$ to $1.5 \times 10^5$, and most preferably $4.0 \times 10^3$ to $7.0 \times 10^4$. In the case where the weight-average molecular weight Mw is within the above-mentioned range, the viscosity of the blocked polyisocyanate composition can be maintained favorably. The weight-average molecular weight Mw may be measured, for example, by gel permeation chromatography (hereinafter, may be abbreviated as "GPC").

<<Blocked Polyisocyanate Composition According to the Third Embodiment>>

A blocked polyisocyanate composition according to the third embodiment of the present invention contains a blocked polyisocyanate derived from a polyisocyanate and at least one blocking agent, and the blocked polyisocyanate contains a constitution unit (I). In the present embodiment, an explanation of the same constitution as the first embodiment or the second embodiment may be omitted.

[Blocked Polyisocyanate]
[Constitution Unit (I)]

A constitution unit (I) of the following general formula (I) is contained in a molecule of the blocked polyisocyanate contained in the blocked polyisocyanate composition according to the present embodiment.

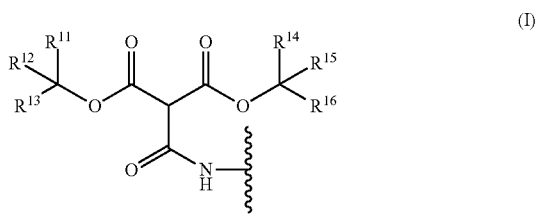

(I)

In the general formula (I), $R^{11}$, $R^{12}$ and $R^{13}$ are each independently an alkyl group which may have at least one substituent selected from the group consisting of a hydroxy group and an amino group, the total carbon number of $R^{11}$, $R^{12}$ and $R^{13}$ is 4 to 20, $R^{14}$, $R^{15}$ and $R^{16}$ are each independently a hydrogen atom or an alkyl group which may have at least one substituent selected from the group consisting of a hydroxy group and an amino group, and a wavy line indicates a bond with a residue formed by removing an isocyanate group from the polyisocyanate.

The carbon number of the alkyl group as $R^{11}$, $R^{12}$, $R^{13}$, $R^{14}$, $R^{15}$ and $R^{16}$ is preferably 1 to 20, more preferably 1 to 8, even more preferably 1 to 6, and particularly preferably 1 to 4.

Specific examples of an unsubstituted alkyl group include the same groups as mentioned in the second embodiment.

Examples of the alkyl group having a hydroxy group as a substituent, the alkyl group having an amino group as a substituent, and the alkyl group having both a hydroxy group and an amino group as substituents include the same groups as mentioned in the second embodiment.

Among them, it is preferable that $R^{11}$, $R^{12}$ and $R^{13}$ be each independently an unsubstituted alkyl group having 1 to 4 carbon atoms, it is more preferable that $R^{11}$, $R^{12}$ and $R^{13}$ be each independently a methyl group or an ethyl group, and it is preferable that at least one thereof be an ethyl group, from the viewpoint of further improvement in the storage stability when made into an aqueous resin composition and the low-temperature curability when made into a resin film.

The total carbon number of $R^{11}$, $R^{12}$ and $R^{13}$ is 4 to 20, more preferably 4 to 12, even more preferably 4 to 9, and even more preferably 4 to 6.

In the case where the total carbon number of $R^{11}$, $R^{12}$ and $R^{13}$ is the above-mentioned lower limit or more, the storage stability when made into an aqueous resin composition can be realized. In contrast, in the case where the total carbon number is the above-mentioned upper limit or less, the low-temperature curability can be realized. Furthermore, the total carbon number of $R^{11}$, $R^{12}$ and $R^{13}$ is more preferably 4 from the viewpoint of the solvent resistance when made into a coating film.

$R^{14}$, $R^{15}$ and $R^{16}$ are each independently a hydrogen atom or an alkyl group which may have at least one substituent selected from the group consisting of a hydroxy group and an amino group (preferably an unsubstituted alkyl group having 1 to 4 carbon atoms).

Among them, at least one of $R^{14}$, $R^{15}$ and $R^{16}$ is preferably a hydrogen atom, and only one of $R^{14}$, $R^{15}$ and $R^{16}$ is more preferably a hydrogen atom. In the case where at least one of $R^{14}$, $R^{15}$ and $R^{16}$ is a hydrogen atom, the storage stability when made into an aqueous resin composition can be further improved while maintaining the low-temperature curability. Namely, the constitution unit of the following general formula (I-1) (hereinafter, may be referred to as constitution unit (I-1)) is more preferably contained as the constitution unit (I).

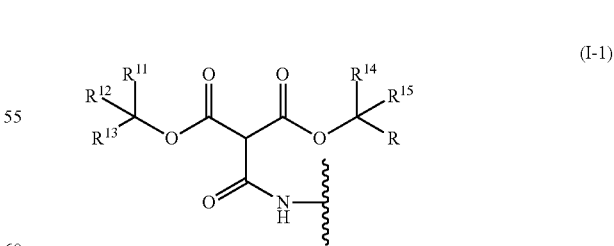

(I-1)

In the general formula (I-1), $R^{11}$, $R^{12}$, $R^{13}$, $R^{14}$ and $R^{15}$ are mentioned in the general formula (I). The wavy line indicates a bond with a residue formed by removing an isocyanate group from the polyisocyanate.

The molar ratio of the constitution unit (I-1) to the constitution unit (I) (constitution unit (I-1)/constitution unit (I)) is more preferably 10% by mol or more, even more preferably 30% by mol or more, even more preferably 50% by mol or more, even more preferably 80% by mol or more, and even more preferably 90% by mol or more.

[Constitution Unit (II)]

It is preferable that a constitution unit (I) of the following general formula (II) (hereinafter, may be referred to as constitution unit (II)) be further contained in a molecule of the blocked polyisocyanate contained in the blocked polyisocyanate composition according to the present embodiment.

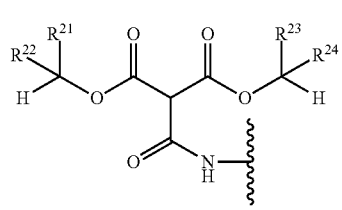

In the general formula (II), $R^{21}$, $R^{22}$, $R^{23}$ and $R^{24}$ are each independently a hydrogen atom or an alkyl group which may have at least one substituent selected from the group consisting of a hydroxy group and an amino group, and the wavy line indicates a bond with a residue formed by removing an isocyanate group from the polyisocyanate.

Examples of the alkyl group which may have at least one substituent selected from the group consisting of a hydroxy group and an amino group as $R^{21}$, $R^{22}$, $R^{23}$ and $R^{24}$ include the same groups as mentioned above as "$R^{11}$, $R^{12}$, $R^{13}$, $R^{14}$, $R^{15}$ and $R^{16}$".

Among them, as $R^{21}$, $R^{22}$, $R^{23}$ and $R^{24}$, a hydrogen atom or an unsubstituted alkyl group having 1 to 4 carbon atoms is preferable, and a hydrogen atom, a methyl group or an ethyl group is more preferable from the viewpoint of excellent storage stability when made into an aqueous resin composition, and a methyl group or an ethyl group is even more preferable from the viewpoint of excellent low-temperature curability.

In the case where all of $R^{21}$, $R^{22}$, $R^{23}$ and $R^{24}$ are methyl groups, both ester portions in the malonic acid ester of the constitution unit (II) are isopropyl groups. In the case where one of $R^{21}$ and $R^{22}$ is a hydrogen atom and the other is a methyl group, and one of $R^{23}$ and $R^{24}$ is a hydrogen atom and the other is a methyl group, both ester portions in the malonic acid ester of the constitution unit (II) are ethyl groups. Among them, it is particularly preferable that all of $R^{21}$, $R^{22}$, $R^{23}$ and $R^{24}$ be methyl groups, namely, both ester portions in malonic acid ester of the constitution unit (II) be isopropyl groups.

The molar ratio of the constitution unit of the general formula (II) to the constitution unit of the general formula (I) (constitution unit (II)/constitution unit (I)) is preferably 4/96 to 96/4, more preferably 5/95 to 95/5, even more preferably 7/93 to 93/7, even more preferably 10/90 to 90/10, even more preferably 20/80 to 85/15, even more preferably 30/70 to 85/15, even more preferably 35/65 to 85/15, and even more preferably 50/50 to 70/30. In the case where the molar ratio is the above-mentioned lower limit or more, the storage stability of the resultant resin composition can be further improved. In contrast, in the case where the molar ratio is the above-mentioned upper limit or less, the low-temperature curability of the resultant resin film can be further improved.

The molar ratio of the constitution unit (II) to the constitution unit (I) may be calculated by subjecting the blocked polyisocyanate composition to $^1$H-NMR and $^{13}$C-NMR measurement to measure the constitution ratio of the constitution unit (II) to the constitution unit (I), for example.

Although it is known that a blocked polyisocyanate, in which all of $R^{11}$, $R^{12}$ and $R^{13}$ in the general formula (I) are methyl, namely, at least one ester group at the diester portion is a tert-butyl group, exhibits excellent curability with a polyvalent hydroxy compound at a low temperature of approximately 85° C., the blocked polyisocyanate tends to exhibits high reactivity against water in an aqueous resin composition, thereby causing the viscosity-increase or the gelation when formulated in an aqueous resin composition and stored as the aqueous resin composition further containing a polyvalent hydroxy compound, a curing agent, and water.

In contrast, since the total carbon number of $R^{11}$, $R^{12}$ and $R^{13}$ in the constitution unit (I) is 4 to 20, the blocked polyisocyanate composition according to the present embodiment makes it possible to exhibit favorable storage stability even when formulated in an aqueous resin composition, by effectively suppressing the viscosity-increase or the gelation when stored as a mixture liquid with a polyvalent hydroxy compound, a curing agent, and water. In addition, a resin film having excellent curability at a low temperature of approximately 85° C. can be obtained.

The blocked polyisocyanate contained in the blocked polyisocyanate composition according to the present embodiment may be a blocked polyisocyanate in which in a molecule thereof at least some of the isocyanate groups are blocked with a malonic acid ester having a secondary alkyl group or a malonic acid ester having a primary alkyl group, and a malonic acid ester having a tertiary alkyl group. Alternatively, the blocked polyisocyanate may be a mixture of a blocked polyisocyanate in which at least some of the isocyanate groups in a polyisocyanate are blocked with a malonic acid ester having a secondary alkyl group or a blocked polyisocyanate in which at least some of the isocyanate groups in a polyisocyanate are blocked with a malonic acid ester having a primary alkyl group, and a blocked polyisocyanate in which at least some of the isocyanate groups in a polyisocyanate are blocked with a malonic acid ester having a tertiary alkyl group.

[Other Functional Group]

The blocked polyisocyanate may have at least one functional group selected from the group consisting of an allophanate group, an uretdione group, an iminooxadiazinedione group, an isocyanurate group, a urethane group and a biuret group. Among them, the blocked polyisocyanate preferably has an isocyanurate group from the viewpoint of excellent weather resistance.

The blocked polyisocyanate contained in the blocked polyisocyanate composition according to the present embodiment is obtained from a polyisocyanate obtained using the same isocyanate by the same method as the second embodiment and at least one blocking agent.

[Polyisocyanate]

(Isocyanate)

As an isocyanate monomer used to prepare the polyisocyanate, at least one diisocyanate selected from the group consisting of aliphatic diisocyanates and alicyclic diisocyanates is preferably used from the viewpoint of excellent weather resistance in a similar manner to the second embodiment. HDI or IPDI is more preferably used from the viewpoint of ease of industrial availability. HDI is more preferably used from the viewpoint of an ability to decrease the viscosity of the blocked polyisocyanate component.

Although any one of aliphatic diisocyanates and alicyclic diisocyanates may be used alone or a combination thereof may be used as an isocyanate monomer to prepare the polyisocyanate, a combination of an aliphatic diisocyanate and an alicyclic diisocyanate is preferable, and HID and IPDI are particularly preferably used. The use of the aliphatic diisocyanate and the alicyclic diisocyanate makes it possible to further improve the toughness and the hardness when made into a coating film.

In the polyisocyanate, the mass ratio of the constitution unit derived from the aliphatic diisocyanate to the constitution unit derived from the alicyclic diisocyanate (the constitution unit derived from the aliphatic diisocyanate/the constitution unit derived from the alicyclic diisocyanate) is preferably 50/50 to 95/5, more preferably 55/45 to 93/7, even more preferably 60/40 to 91/9, and even more preferably, 65/35 to 90/10 from the viewpoint of the improvement in the hardness and the strength of the resultant coating film.

In the case where the mass ratio of the constitution unit derived from the aliphatic diisocyanate to the constitution unit derived from the alicyclic diisocyanate is the above-mentioned lower limit or more, the flexibility when made into a coating film can be further effectively prevented from deteriorating. In contrast, in the case where the mass ratio is the above-mentioned upper limit or less, the hardness when made into a coating film can be further improved.

(Polyol)

It is preferable that the polyisocyanate be obtained from the above-mentioned diisocyanate and a polyol (preferably polyol B) having an average number of functional groups of 3.0 to 8.0. Thus, the average number of isocyanate groups of the polyisocyanate can be further increased. In the polyisocyanate, a urethane group is formed by reaction of a hydroxy group of the polyol and an isocyanate group of the diisocyanate monomer.

The average number of functional groups of the polyol is preferably 3.0 to 8.0, more preferably 3 to 6, even more preferably 3 to 5, and particularly preferably 3 or 4. The average number of functional groups of the polyol refers to the number of hydroxy groups present in one molecule of the polyol.

The number-average molecular weight of the polyol is preferably 100 to 1,000, more preferably 100 to 900, even more preferably 100 to 600, even more preferably 100 to 570, even more preferably 100 to 500, even more preferably 100 to 400, particularly preferably 100 to 350, and most preferably 100 to 250 from the viewpoint of the improvement in the hardness and the strength of the resultant coating film.

In the case where the number-average molecular weight of the polyol is within the above-mentioned range, the blocked polyisocyanate composition exhibits further excellent low-temperature curability, and particularly further excellent hardness and strength, when made into a coating film. The number-average molecular weight Mn of the polyol is the number-average molecular weight determined by GPC analysis with reference to polystyrene standards, for example.

Examples of such a polyol include trimethylolpropane, glycerol, and polycaprolactone polyols derived from a trivalent or more-valent polyvalent alcohol and ε-caprolactone.

Examples of commercially-available products of polycaprolactone polyols include the same products as those in the second embodiment.

(Preparation of Polyisocyanate)

The polyisocyanate may be prepared in a similar manner to the second embodiment.

An antioxidant or an ultraviolet absorber may be added to the resultant polyisocyanate so as to suppress the coloration when stored, for example. As the antioxidant or the ultraviolet absorber, one of the same compounds as those in the second embodiment alone or at least two thereof may be used in combination. The addition amount thereof relative to the mass of the polyisocyanate is preferably 10 ppm by mass to 500 ppm by mass.

(Average Number of Isocyanate Groups of Polyisocyanate)

The average number of isocyanate groups of the polyisocyanate is preferably 2 or more from the viewpoint of an increase in the low-temperature curability of the resultant resin film, and is more preferably 3 to 20, even more preferably 3.2 to 10, particularly preferably 3.5 to 8, and most preferably 4.2 to 6 from the viewpoint of realization of both the low-temperature curability of the resultant resin film and the compatibility with the polyvalent hydroxy compound.

The average number of isocyanate groups of the polyisocyanate may be determined by the method described in the second embodiment.

[Blocking Agent]

The blocking agent used to prepare the blocked polyisocyanate preferably contains a malonic acid ester having a secondary alkyl group or a malonic acid ester having a primary alkyl group, and a malonic acid ester having a tertiary alkyl group, and more preferably contains a malonic acid ester having a secondary alkyl group and the malonic acid ester having a tertiary alkyl group. The blocking agent may contain each one of the malonic acid ester having a secondary alkyl group, the malonic acid ester having a primary alkyl group, and the malonic acid ester having a tertiary alkyl group or each of two or more thereof in combination.

Although the malonic acid ester having a primary alkyl group, the malonic acid ester having a secondary alkyl group, and the malonic acid ester having a tertiary alkyl group are not particularly limited, the same compounds as those mentioned in the first embodiment may be used.

(Other Blocking Agent)

The blocking agent used to prepare the blocked polyisocyanate may contain another blocking agent in addition to the malonic acid ester having a secondary alkyl group and the malonic acid ester having a tertiary alkyl group within a range in which the storage stability of the resultant resin composition and the low-temperature curability of the resultant resin film are not deteriorated. Examples of another blocking agent include the same compounds as those mentioned in the first embodiment.

(Amount of Malonic Acid Ester Having a Secondary Alkyl Group and Malonic Acid Ester Having a Tertiary Alkyl Group)

The amount of the malonic acid ester having a secondary alkyl group and the malonic acid ester having a tertiary alkyl group relative to the total mol of all blocking agents used to prepare the blocked polyisocyanate is preferably 50% by mol or more, more preferably 70% by mol or more, even more preferably 90% by mol or more, particularly preferably 95% by mol or more, and most preferably 100% by mol.

In the case where the amount of the malonic acid ester having a secondary alkyl group and the malonic acid ester having a tertiary alkyl group is within the above-mentioned range, the low-temperature curability of the resultant resin film can be further improved.

[Nonionic Compound]

Some of the isocyanate groups of the blocked polyisocyanate contained in the blocked polyisocyanate composition according to the present embodiment may be modified with a nonionic compound. Namely, a constitution unit derived from the nonionic compound may be introduced in some of the isocyanate groups of the blocked polyisocyanate.

Examples of the nonionic compound include the same compounds as those mentioned in the second embodiment.

The lower limit of the amount of the constitution unit derived from the nonionic compound added to the blocked polyisocyanate (hereinafter, may be referred to as the "amount of the nonionic compound") relative to the mass of the solid content of the blocked polyisocyanate composition is preferably 0.1% by mass, more preferably 0.15% by mass, even more preferably 0.2% by mass, and particularly preferably 0.25% by mass, from the viewpoint of the dispersion stability in water of the blocked polyisocyanate composition.

The upper limit of the amount of the nonionic compound relative to the mass of the solid content of the blocked polyisocyanate composition is preferably 55% by mass, more preferably 50% by mass, even more preferably 48% by mass, and particularly preferably 44% by mass, from the viewpoint of water resistance of the resultant resin film.

Namely, the amount of the nonionic compound relative to the mass of the solid content of the blocked polyisocyanate composition is preferably 0.1% by mass to 55% by mass, more preferably 0.15% by mass to 50% by mass, even more preferably 0.20% by mass to 48% by mass, and particularly preferably 0.25% by mass to 44% by mass.

In the case where the amount of the nonionic compound is within the above-mentioned range, the blocked polyisocyanate composition tends to be further dispersed in water, and a homogeneous film tends to be formed.

In the case where the amount of the nonionic compound added to the blocked polyisocyanate is indicated by the molar ratio, the amount relative to 100% by mol of isocyanate groups of the raw material polyisocyanate is preferably 0.05% by mol to 15% by mol, more preferably 0.10% by mol to 12% by mol, even more preferably 0.10% by mol to 9% by mol, even more preferably 0.10% by mol to 6% by mol, and most preferably 0.15% by mol to 4% by mol, from the viewpoint of suppressibility of the decrease in the hardness and the strength of the resultant coating film.

[Other Hydrophilic Compound]

At least a part of the blocked polyisocyanate may further contain a constitution unit derived from a hydrophilic compound other than the nonionic compound, namely, a hydrophilic group other than nonionic hydrophilic groups.

Another hydrophilic compound is a compound having a hydrophilic group other than nonionic hydrophilic groups. Another hydrophilic compound preferably has at least one active hydrogen group that reacts with at least one isocyanate group of the polyisocyanate relative to one molecule of another hydrophilic compound, in addition to the hydrophilic group other than nonionic hydrophilic groups. Specific examples of the active hydrogen group include a hydroxyl group, a mercapto group, a carboxylic acid group, an amino group, and a thiol group.

Examples of another hydrophilic compound include cationic compounds and anionic compounds. One of these hydrophilic compounds may be used alone or at least two thereof may be used in combination. Among them, as another hydrophilic compound, an anionic compound is preferable from the viewpoint of the suppressibility of the decrease in the hardness and the strength of the resultant resin film and the improvement of emulsifiability.

Examples of the cationic compounds and the anionic compounds include the same compounds as mentioned in the second embodiment.

<Other Constitution Component>

The blocked polyisocyanate composition according to the present embodiment may further include an additive such as a solvent in addition to the blocked polyisocyanate. Examples of the solvent include the same solvents as mentioned in the first embodiment.

<Preparation Method of Blocked Polyisocyanate Composition>

Although the preparation method of the blocked polyisocyanate composition according to the present embodiment is not particularly limited, examples thereof include the following two methods in a similar manner to that of the blocking reaction of the polyisocyanate and the blocking agent in the second embodiment.

1) A method in which the polyisocyanate, the malonic acid ester having a tertiary alkyl group, and either the malonic acid ester having a secondary alkyl group or the malonic acid ester having a primary alkyl group are reacted.

2) A method in which the polyisocyanate and at least one blocking agent selected from the group consisting of the malonic acid ester having a tertiary alkyl group, the malonic acid ester having a secondary alkyl group and the malonic acid ester having a primary alkyl group are reacted, followed by adding an alcohol having a chained alkyl group to the obtained reactant to introduce an alkyl group derived from the alcohol by ester exchange at the terminal ester portion of the reactant.

Among the above-mentioned two methods, the method 2) is preferable from the viewpoint of the ease of preparation and ease of control of the molar ratio of constitution unit (II)/constitution unit (I).

The blocking reaction of the polyisocyanate and the blocking agent can be conducted without depending on the presence or absence of a solvent to obtain the blocked polyisocyanate.

As the blocking agent, each one of the malonic acid ester having a primary alkyl group, the malonic acid ester having a secondary alkyl group and the malonic acid ester having a tertiary alkyl group may be used or each of two or more thereof may be used in combination.

The addition amount of the blocking agent relative to the total mol of isocyanate groups may be generally 80% by mol to 200% by mol, and is preferably 90% by mol to 150% by mol.

In the blocking agent to be added, the molar ratio of the constitution unit derived from the malonic acid ester having a secondary alkyl group to the constitution unit derived from the malonic acid ester having a tertiary alkyl group (the malonic acid ester having a secondary alkyl group/the malonic acid ester having a tertiary alkyl group) and the molar ratio of the constitution unit derived from the malonic acid ester having a primary alkyl group to the constitution unit derived from the malonic acid ester having a tertiary alkyl group (the malonic acid ester having a primary alkyl group/the malonic acid ester having a tertiary alkyl group) is preferably and respectively 4/96 to 96/4, more preferably 5/95 to 95/5, even more preferably 7/93 to 93/7, even more preferably 10/90 to 90/10, even more preferably 20/80 to 85/15, even more preferably 30/70 to 85/15, and particularly preferably 35/65 to 85/15. In the case where the molar ratio is the above-mentioned lower limit or more, the storage stability when made into an aqueous resin composition can be made to be favorable. In the case where the molar ratio is the above-mentioned upper limit or less, the low-temperature curability of the resultant resin film can be made to be favorable.

In the case where a solvent is used, a solvent inert to isocyanate groups may be used.

In the case where the solvent is used, the amount of the non-volatile content derived from the polyisocyanate and the blocking agent relative to 100 parts by mass of the blocked polyisocyanate composition is the same as described in the second embodiment.

In the blocking reaction, an organic metal salt of tin, zinc, or lead, a tertiary amine-based compound or an alkali metal alcoholate of sodium or the like may be used as the catalyst.

The addition amount of the catalyst and the temperature at the blocking reaction are the same as described in the second embodiment.

After the blocking reaction, an acidic compound or the like may be added to conduct neutralization treatment. Examples of the acidic compound include the same compounds as those mentioned in the first or second embodiment.

In the case in which a hydrophilic compound containing a nonionic compound is used, the polyisocyanate, the blocking agent and the hydrophilic compound are reacted for preparation.

The reaction of the polyisocyanate and the hydrophilic compound containing a nonionic compound and the reaction of the polyisocyanate and the blocking agent may be conducted simultaneously, or, one of the reactions may be conducted in advance, followed by conducting the other reaction. Among them, it is preferable that the reaction of the polyisocyanate and the hydrophilic compound be conducted in advance to obtain a polyisocyanate modified with the hydrophilic compound, followed by reacting the resultant polyisocyanate modified with the hydrophilic compound and the blocking agent.

The reaction of the polyisocyanate and the hydrophilic compound may be conducted in a similar manner to the second embodiment.

The reaction of the polyisocyanate modified with the hydrophilic compound and the blocking agent may be conducted in a similar manner to the above-mentioned blocking reaction of the polyisocyanate and the blocking agent.

In the case where the method 2) is adopted to conduct preparation, an ester exchange reaction is conducted following the blocking reaction.

As an alcohol having a chained alkyl group used in the ester exchange reaction in the method 2), the same alcohol as mentioned in the first embodiment may be used.

Furthermore, the chained alkyl group included in the alcohol may be identical to or different from the chained alkyl group of the blocking agent. In the case where the chained alkyl group included in the alcohol is different from the chained alkyl group of the blocking agent, a monoalcohol having a chained alkyl group in which the number of alkyl substituents is different from that of the blocking agent is preferably used. Specifically, in the case where one malonic acid ester having a secondary alkyl group is used alone as the blocking agent, a monoalcohol having a tertiary alkyl group may be used, for example.

In the case where the method 2) is adopted to conduct preparation, it is preferable that the generated alcohol or the residue of added alcohol be removed by distillation under ordinary pressure or reduced pressure during the ester exchange reaction or after the ester exchange reaction.

Among them, it is preferable that the generated alcohol be removed by conducting an operation such as distillation during the ester exchange reaction so as to allow the ester exchange reaction to proceed efficiently. In this case, it is preferable, so as to efficiently remove an alcohol component generated by the exchange reaction, that the boiling point of an alcohol component to be added be higher than the boiling point of the generated alcohol component.

The ester exchange reaction may be generally conducted at 0° C. to 150° C., and preferably at 30° C. to 120° C., and more preferably at 50° C. to 100° C. In the case where the temperature at the ester exchange reaction is the above-mentioned lower limit or more, the reaction rate can be further enhanced. In the case where the temperature is the above-mentioned upper limit or less, the side reaction can be further suppressed.

The molar ratio of the constitution unit (II) to the constitution unit (I) can be controlled by adjusting the molar ratio of alcohol added to blocked isocyanate groups, the ester exchange reaction temperature and the ester exchange reaction time or distilling away the generated alcohol.

The amount of the alcohol component in the blocked polyisocyanate composition relative to 100 parts by mass of the solid content in the blocked polyisocyanate composition is preferably 0.05 parts by mass to 41 parts by mass, more preferably 0.1 parts by mass to 30 parts by mass, and even more preferably 0.5 parts by mass to 10 parts by mass. In the case where the amount of the alcohol component is the above-mentioned lower limit or more, the storage stability of the resultant coating material becomes favorable. In the case where the amount is the above-mentioned upper limit or less, the viscosity-increase when formulated in an aqueous coating material can be suppressed.

<Characteristics of Blocked Polyisocyanate Composition>
[Weight-Average Molecular Weight Mw]

The weight-average molecular weight Mw of the blocked polyisocyanate composition according to the present embodiment is the same as mentioned in the second embodiment.

<<Resin Composition>>

A resin composition of the present embodiment contains the blocked polyisocyanate composition according to the first, second or third embodiment and a polyvalent hydroxy compound. The resin composition according to the present embodiment may be referred to as a one-liquid type resin composition containing a curing agent component and the main agent component.

The resin composition according to the present embodiment has a favorable storage stability and exhibits excellent curability at a low temperature of about 80° C., hardness and strength when made into a coating film.

Since the resin composition according to the present embodiment exhibits excellent storage stability when made into an aqueous resin composition, the resin composition is particularly preferably used as an aqueous resin composition.

Constitution components of the resin composition according to the present embodiment will be explained below specifically.

<Polyvalent Hydroxy Compound>

In the present specification, the term "polyvalent hydroxy compound" means a compound having at least two hydroxy groups in one molecule thereof, and is also referred to as "polyol".

Specific examples of the polyvalent hydroxy compound include aliphatic hydrocarbon polyols, polyether polyols, polyester polyols, epoxy resins, fluorine-containing polyols, and acrylic polyols.

Among them, the polyvalent hydroxy compound is preferably a polyester polyol, a fluorine-containing polyol, or an acrylic polyol.

[Aliphatic Hydrocarbon Polyols]

Examples of the aliphatic hydrocarbon polyols include polybutadienes having hydroxylated terminal and hydrogen additives thereof.

[Polyether Polyols]

Examples of the polyether polyols include polyether polyols obtained by any of the following methods (1) to (3).
(1) Polyether polyols or polytetramethylene glycols obtained by adding one or a mixture of alkylene oxides to one or a mixture of polyvalent alcohols.
(2) Polyether polyols obtained by reacting an alkylene oxide with a polyfunctional compound.
(3) Polymer polyols obtained by polymerizing acrylamides using the polyether polyols obtained by the method (1) or (2) as mediums.

Examples of the polyvalent alcohols include glycerol and propylene glycol.

Examples of the alkylene oxides include ethylene oxide and propylene oxide.

Examples of the polyfunctional compound include ethylene diamine, and ethanolamine.

[Polyester Polyols]

Examples of the polyester polyols include the following polyester polyols (1) and (2).
(1) Polyester polyol resins obtained by subjecting one or a mixture of at least two dibasic acids and one or a mixture of at least two polyvalent alcohols to condensation reaction.
(2) Polycaprolactones obtained by subjecting s-caprolactone to ring-opening polymerization using a polyvalent alcohol.

Examples of the dibasic acids include carboxylic acids such as succinic acid, adipic acid, dimeric acid, maleic anhydride, phthalic anhydride, isophthalic acid, terephthalic acid, and 1,4-cyclohexanedicarboxylic acid.

Examples of the polyvalent alcohol include ethylene glycol, propylene glycol, diethylene glycol, 1,4-butanediol, neopentyl glycol, 1,6-hexanediol, trimethyl pentanediol, cyclohexanediol, trimethylolpropane, glycerol, pentaerythritol, 2-methylol propanediol, and ethoxylated trimethylolpropane.

[Epoxy Resins]

Examples of the epoxy resins include: epoxy resins such as novolac-type epoxy resins, β-methylepichloro-type epoxy resins, cyclic oxirane-type epoxy resins, glycidyl ether-type epoxy resins, glycol ether-type epoxy resins, epoxy-type aliphatic unsaturated compounds, epoxidated fatty acid esters, ester-type polyvalent carboxylic acids, aminoglycidyl-type epoxy resins, halogenated epoxy resins, and resorcine-type epoxy resins; and resins obtained by modifying the epoxy resins with an amino compound, a polyamide compound, or the like.

[Fluorine-Containing Polyols]

Examples of the fluorine-containing polyols include: fluoroolefins disclosed in Reference Document 1 (Japanese Unexamined Patent Application Publication No. Sho 57-34107) and Reference Document 2 (Japanese Unexamined Patent Application Publication No. Sho 61-275311); and copolymers of cyclohexylvinyl ethers, hydroxyalkylvinyl ethers, vinyl monocarboxylates, or the like.

[Acrylic Polyols]

The acrylic polyol may be obtained, for example, by polymerizing polymerizable monomers having at least one active hydrogen in one molecule thereof, or copolymerizing polymerizable monomers having at least one active hydrogen in one molecule thereof with other monomers copolymerizable with the polymerizable monomers, as needed.

Examples of the polymerizable monomers having at least one active hydrogen in one molecule thereof include the following (i) to (iii). One of these may be used alone, or a combination of at least two thereof may be used.
(i) Acrylic acid esters having an active hydrogen, such as 2-hydroxyethyl acrylate, 2-hydroxypropyl acrylate, and 2-hydroxybutyl acrylate.
(ii) Methacrylic acid esters having an active hydrogen, such as 2-hydroxyethyl methacrylate, 2-hydroxypropyl methacrylate, and 2-hydroxybutyl methacrylate.
(iii) (Meth)acrylic acid esters having a polyvalent active hydrogen, such as acrylic acid monoesters or methacrylic acid monoesters of glycerol, and acrylic acid monoesters or methacrylic acid monoesters of trimethylolpropane.

Examples of the other monomers copolymerizable with the polymerizable monomers include the following (i) to (v). One of these may be used alone or a combination of at least two thereof may be used.
(i) Acrylic acid esters such as methyl acrylate, ethyl acrylate, isopropyl acrylate, n-butyl acrylate, and 2-ethylhexyl acrylate.
(ii) Methacrylic acid esters such as methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate.
(iii) Unsaturated carboxylic acids such as acrylic acid, methacrylic acid, maleic acid, and itaconic acid.
(iv) Unsaturated amides such as acrylamide, N-methylolacrylamide, and diacetoneacrylamide.
(v) Styrene, vinyltoluene, vinyl acetate, and acrylonitrile.

Additional examples of the acrylic polyols include acrylic polyols obtained by copolymerizing polymerizable ultraviolet-stable monomers disclosed in Reference Document 3 (Japanese Unexamined Patent Application Publication No. Hei 1-261409) or Reference Document 4 (Japanese Unexamined Patent Application Publication No. Hei 3-006273).

Specific examples of the polymerizable ultraviolet-stable monomers include 4-(meth)acryloyloxy-2,2,6,6-tetramethylpiperidine, 4-(meth)acryloylamino-2,2,6,6-tetramethylpiperidine, 1-crotonoyl-4-crotonoyloxy-2,2,6,6-tetramethylpiperidine, and 2-hydroxy-4-(3-methacryloxy-2-hydroxypropoxy)benzophenone.

For example, the above-mentioned monomer components are subjected to solution polymerization in the presence of a radical polymerization initiator, such as a conventionally-known peroxide or azo compound, followed by diluting the resultant with an organic solvent or the like, as needed, to obtain an acrylic polyol.

A water-based acrylic polyol is obtained by subjecting an olefinic unsaturated compound to solution polymerization, followed by conducting a method of allowing the resultant to convert to an aqueous phase or a conventionally-known method, such as emulsion polymerization. In this case, an acidic moiety of a monomer containing a carboxylic acid such as an acrylic acid or a methacrylic acid or a monomer containing a sulfonic acid may be neutralized with an amine or ammonia to impart water-solubility or dispersibility in water.

[Hydroxy Group Value and Acid Value of Polyvalent Hydroxy Compound]

The hydroxy group value of the polyvalent hydroxy compound contained in the resin composition according to the present embodiment is preferably 5 mg KOH/g to 300 mg KOH/g, more preferably 10 mg KOH/g to 280 mg KOH/g, and even more preferably 30 mg KOH/g to 250 mg KOH/g. In the case where the hydroxy group value of the polyvalent hydroxy compound is within the above-mentioned range, a resin film having further excellent physical properties such as tensile strength can be obtained. Specifically, in the case where the hydroxy group value of the polyvalent hydroxy compound is the above-mentioned lower limit or more, the cross-linking density of urethane due to the reaction with the polyisocyanate is further increased, thereby making it easier to fulfill a function of urethane bonds. In contrast, in the case where the hydroxy group value of the polyvalent hydroxy compound is the above-mentioned upper limit or less, the cross-linking density is not excessively increased, and thus mechanical physical properties of the resin film become further favorable. The hydroxy group value of the polyvalent hydroxy compound is measured by potentiometer titration and calculated as a value relative to the solid content in the polyvalent hydroxy compound.

[Glass Transition Temperature Tg of Polyvalent Hydroxy Compound]

The glass transition temperature Tg of the polyvalent hydroxy compound contained in the resin composition according to the present embodiment is preferably 0° C. to 100° C., more preferably 0° C. to 90° C., even more preferably 0° C. to 80° C., and particularly preferably 5° C. to 70° C. In the case where the glass transition temperature of the polyvalent hydroxy compound is within the above-mentioned range, a resin film having excellent tensile strength can be obtained. The glass transition temperature of the polyvalent hydroxy compound can be determined by the method mentioned in examples shown below.

[Weight-Average Molecular Weight Mw of Polyvalent Hydroxy Compound]

The weight-average molecular weight Mw of the polyvalent hydroxy compound is preferably $5.0 \times 10^3$ to $2.0 \times 10^5$, more preferably $5.0 \times 10^3$ to $1.5 \times 10^5$, and even more preferably $5.0 \times 10^3$ to $1.0 \times 10^5$. In the case where the weight-average molecular weight Mw of the polyvalent hydroxy compound is within the above-mentioned range, a resin film having excellent physical properties such as tensile strength can be obtained. The weight-average molecular weight Mw of the polyvalent hydroxy compound may be measured, for example, by the method mentioned in examples below specifically.

[NCO/OH]

Although the mole equivalent ratio (NCO/OH) of isocyanate groups in the blocked polyisocyanate composition relative to hydroxyl groups in the polyvalent hydroxy compound contained in the resin composition according to the present embodiment is determined depending on required physical properties of the resin film, the mole equivalent ratio is generally 0.01 to 22.5.

[Amount of Blocked Polyisocyanate Composition]

In the resin composition according to the present embodiment, the amount of the blocked polyisocyanate may be an amount which allows the mole equivalent ratio of isocyanate groups in the blocked polyisocyanate to hydroxyl groups in the polyvalent hydroxy compound to be within the above-mentioned range, and, for example, the amount relative to 100 parts by mass of the polyvalent hydroxy compound is preferably 1 part by mass to 200 parts by mass, more preferably 5 parts by mass to 180 parts by mass, and even more preferably 10 parts by mass to 150 parts by mass. In the case where the amount of the blocked polyisocyanate is within the above-mentioned range, a resin film having excellent physical properties such as tensile strength can be obtained. The amount of the blocked polyisocyanate may be, for example, calculated from formulation amounts, or calculated after identification and quantification by a nuclear magnetic resonance (NMR) method and a gas chromatography/mass spectrometry method (GC/MS method).

<Other Additive>

The resin composition according to the present embodiment may further contain another additive.

Examples of another additive include curing agents that can react with a crosslinking functional group in the polyvalent hydroxy compound, curing catalysts, solvents, pigments (such as extender pigments, coloration pigments, and metallic pigments), ultraviolet absorbers, light stabilizers, radical stabilizers, yellowing-inhibitors that suppress coloration at a baking step, paint surface-adjusting agents, flow-adjusting sing agents, defoaming agents, thickening agents, and film-forming aids.

Examples of the curing agents include melamine resins, urea resins, epoxy group-containing compounds or resins, carboxyl group-containing compounds or resins, acid anhydrides, alkoxysilane group-containing compounds or resins, and hydrazide compounds.

The curing catalyst may be a basic compound, or a Lewis acid compound.

Examples of the basic compound include metal hydroxides, metal alkoxides, metal carboxylates, metal acetylacetinates, hydroxides of onium salts, onium carboxylates, halides of onium salts, metallic salts of active methylene-based compounds, onium salts of active methylene-based compounds, aminosilanes, amines, and phosphines. Preferable examples of the onium salts include ammonium salts, phosphonium salts and sulfonium salts.

Examples of the Lewis acid compound include organic tin compounds, organic zinc compounds, organic titanium compounds, and organic zirconium compounds.

Examples of the solvent include the same solvents as mentioned for the blocked polyisocyanate composition.

As the pigment (such as an extender pigment, coloration pigment, metallic pigment), the ultraviolet absorber, the light stabilizer, the radical stabilizer, the yellowing-inhibitor that suppresses coloration at a baking step, the paint surface-adjusting agent, the flow adjusting-agent, the pigment-dispersing agent, the defoaming agent, the thickening agent or the film-forming aid, a conventionally-known one may be appropriately selected to be used.

<Preparation Method of Resin Composition>

Although the resin composition according to the present embodiment may be used as a solvent-based composition or a water-based composition, the resin composition is preferably used as a water-based resin composition.

In the case where a water-based resin composition (aqueous resin composition) is prepared, an additive, such as a curing agent that can react with a crosslinking functional group in the polyvalent hydroxy compound, a curing catalyst, a solvent, a pigment (such as an extender pigment, coloration pigment, or metallic pigment), an ultraviolet absorber, a light stabilizer, a radical stabilizer, a yellowing-inhibitor that suppresses coloration at a baking step, a paint surface-adjusting agent, a flow-adjusting agent, a pigment-dispersing agent, a defoaming agent, a thickening agent, or a film-forming aid is added to the polyvalent hydroxy compound or an aqueous dispersion or an aqueous solution thereof, as needed. Then, the above-mentioned blocked polyisocyanate composition or an aqueous dispersion thereof is added to the resultant as a curing agent, followed by further adding water or a solvent thereto, as needed, to adjust the viscosity of the resultant. Then, the resultant is vigorously stirred using a stirrer to obtain a water-based resin composition (aqueous resin composition).

In the case where a solvent-based resin composition is prepared, an additive, such as a curing agent that can react with a crosslinking functional group in the polyvalent hydroxy compound, a curing catalyst, a solvent, a pigment (such as an extender pigment, coloration pigment, or metallic pigment), an ultraviolet absorber, a light stabilizer, a radical stabilizer, a yellowing-inhibitor that suppresses coloration at a baking step, a paint surface-adjusting agent, a flow-adjusting agent, a pigment-dispersing agent, a defoaming agent, a thickening agent, or a film-forming aid is added to the polyvalent hydroxy compound or a solvent dilution thereof, as needed. Then, the above-mentioned blocked polyisocyanate composition is added to the resultant as a curing agent, followed by further adding a solvent thereto, as needed, to adjust the viscosity of the resultant. Then, the resultant is stirred by hand or using a stirrer such as mazelar to obtain a solvent-based resin composition.

<<Resin Film>>

A resin film according to the present embodiment is formed by curing the resin composition. The resin film according to the present embodiment has excellent curability at a low temperature of about 80° C., hardness and strength.

The resin film according to the present embodiment is obtained by coating the above-mentioned resin composition on a substrate by using a conventionally-known coating method, such as roll coating, curtain flow coating, spray coating, bell coating, or electrostatic coating, followed by heating to cure the resultant.

The heating temperature is preferably approximately 70° C. to 120° C., more preferably approximately 70° C. to 110° C., and even more preferably approximately 75° C. to 100° C., from the viewpoint of energy conservation and heat resistance of the substrate.

The heating time is preferably approximately 1 minute to 60 minutes, and more preferably approximately 2 minutes to 40 minutes from the viewpoint of energy conservation and heat resistance of the substrate.

The substrate is not particularly limited, and examples thereof include: outer plates of automotive bodies such as passenger cars, trucks, motorcycles, or buses; automotive parts such as bumpers; outer plates of home electric appliances such as cellular phones, or audio appliances; and various films. Among them, the outer plates of the automotive bodies or automotive parts are preferred.

The material of the substrate is not particularly limited, and examples thereof include: metal materials such as iron, aluminum, brass, copper, tin plate, stainless steel, galvanized steel, steel coated with zinc alloy (such as Zn—Al, Zn—Ni, and Zn—Fe); resins such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin; various plastic materials such as various FRP; inorganic materials such as glass, cement, and concrete; and fibrous materials such as wood, paper, and cloth. Among them, metal materials or plastic materials are preferred.

The substrate may be formed by subjecting the surface of the above-mentioned metal material or the metal surface of an automotive body formed from the above-mentioned metal material to surface treatment such as phosphoric acid salt treatment, chromate treatment, or composite oxide treatment, and a coating film may be further formed thereon, as needed. The substrate having the coating film may be formed, for example, by conducting the surface treatment, as needed, and then forming an undercoating thereon, and examples thereof include automotive bodies in which an undercoating of an electrodeposition coating material is formed. The substrate may be formed by subjecting the surface of the above-mentioned plastic material or the plastic surface of an automotive part formed from the above-mentioned metal material to the desired surface treatment. The substrate may also be a combination of a plastic material and a metal material.

The gel fraction of the resin film according to the present embodiment is preferably 82% by mass or more, more preferably 83% by mass or more, even more preferably 84% by mass or more, even more preferably 85% by mass or more, and even more preferably 86% by mass or more, when the resin film is formed by heating the resin composition at 80° C. for 30 minutes to be cured at a thickness of 40 μm, stored at 23° C. for 1 week, and then immersed in acetone at 23° C. for 24 hours, as shown in the below-mentioned examples. In the case where the gel fraction is the above-mentioned lower limit or more, the low-temperature curability is further improved. In contrast, although the upper limit of the gel fraction is not particularly limited, the upper limit may be 100% by mass, for examples. The method as described in examples below may be specifically used to measure the gel fraction, for example.

The Koenig hardness of the resin film according to the present embodiment at 23° C. is preferably 40 times or more, more preferably 45 times or more, even more preferably 50 times or more, even more preferably 55 times or more, and even more preferably 60 times or more, when the resin film is formed by coating the resin composition on a glass and heating at 80° C. for 30 minutes to be cured at a thickness of 40 μm, as shown in the below-mentioned examples. In the case where the Koenig hardness is the above-mentioned lower limit or more, the hardness of the resin film is made to be favorable. In contrast, the upper limit of the Koenig hardness is not particularly limited, and the upper limit may be 160 times, for example. The method as described in examples below may be specifically used to measure the Koenig hardness, for example.

The maximum tensile stress of the resin film according to the present embodiment at 23° C. is preferably 10.0 MPa or more, more preferably 15 MPa or more, even more preferably 20 MPa or more and particularly preferably 25 MPa or more, when the resin film is formed by heating the resin composition at 80° C. for 30 minutes to be cured in a film thickness of 40 μm, as shown in examples mentioned below. In the case where the maximum tensile stress at 23° C. is the above-mentioned lower limit or more, the strength of the resin film is made to be further favorable. In contrast, although the upper limit of the maximum tensile stress at 23° C. is not particularly limited, the upper limit may be, for example, 100 MPa. The method as described in examples below may be specifically used to measure the maximum tensile stress, for example.

The resin film according to the present embodiment has excellent low-temperature curability, and therefore is preferably used as a coating film of a product in various fields in which energy conservation is required or a material having low heat resistance.

<<Layered Body>>

A layered body according to the present embodiment includes at least two layers of the resin films, constitutions of which are different from each other. Each layer thickness of the resin film is 1 µm to 50 µm. The presence of the resin film mentioned above in the layered body according to the present embodiment makes the low-temperature curability be excellent.

The layered body according to the present embodiment may contain at least two layers of the above-mentioned resin film, the constitutions of which are identical to each other.

The layered body according to the present embodiment is formed by laminating various coating films including the above-mentioned resin film on an adherend.

Examples of the adherend include glass, various metals, porous members, various coated members, sealant curing material, rubbers, leathers, fibers, non-woven fabrics, resin films and plates, ultraviolet curable acrylic resin layers, and layers formed of inks.

Examples of the metals include aluminum, iron, zinc steel plate, copper, and stainless steel.

Examples of the porous members include wood, paper, mortar, and stone.

Examples of the coated members include fluorine-coated member, urethane-coated member, and acrylic urethane-coated member.

Examples of the sealant curing material include silicone-based materials, modified silicone-based materials, and urethane-based materials. Examples of the rubbers include natural rubber, and synthesized rubbers.

Examples of the leathers include natural leathers and artificial leathers.

Examples of the fibers include plant-based fibers, animal-based fibers, carbon fiber, and glass fiber.

Examples of resins that are raw materials to obtain the resin films or plates include polyvinyl chloride, polyester, acryl, polycarbonate, triacetylcellulose, and polyolefin.

Examples of the inks include printing inks and UV inks.

The layered body according to the present embodiment is obtained by coating layers of the above-mentioned resin compositions, constitutions of which are different from each other, on an adherend by using a conventionally-known coating method, such as roll coating, curtain flow coating, spray coating, bell coating, or electrostatic coating, followed by curing each layer by heating, or by coating all layers of the above-mentioned resin compositions, followed by curing all layers by heating at once.

The layered body according to the present embodiment may further include other layers formed from conventionally-known components such as a primer layer, an adhesive layer, or a decoration layer, in addition to the above-mentioned resin film.

EXAMPLES

Hereinafter, although the present embodiment will be described further specifically based on examples and comparative examples, the present embodiment is not limited to the following examples.

<Test Items>

Physical properties of blocked polyisocyanate compositions obtained in examples and comparative examples were measured and evaluated by the following methods.

[Physical Property 1]
(Content Ratio of Isocyanate (NCO) Groups)

A polyisocyanate before being blocked with a blocking agent was used as a measurement sample to measure the NCO content ratio of the polyisocyanate.

First, 2 g to 3 g of the measurement sample was precisely weighed in a flask (W g). Then, 20 mL of toluene was added thereto, and the measurement sample was dissolved. Then, 20 mL of a toluene solution containing 2 N di-n-butylamine was added thereto, and mixed, and then the resultant mixture was left to stand for 15 minutes at room temperature. Then, 70 mL of isopropyl alcohol was added thereto and mixed. Then, the resultant solution was titrated with 1 N hydrochloric acid solution (factor F) using an indicator. The titration value V2 mL was obtained. The same titration operation was performed without the polyisocyanate sample, and the titration value V1 mL was obtained. Then, the content ratio (% by mass) of isocyanate (NCO) groups of the polyisocyanate was calculated by the following equation.

Content ratio (% by mass) of isocyanate (NCO) groups=$(V1-V2) \times F \times 42/(W \times 1000) \times 100$

[Physical Property 2]
(Number-Average Molecular Weight and Weight-Average Molecular Weight)

The number-average molecular weight and the weight-average molecular weight are the number-average molecular weight and the weight-average molecular weight determined by gel permeation chromatography (GPC) analysis using the following device with reference to polystyrene standards.

A polyisocyanate before being blocked with a blocking agent was used as a measurement sample to determine the number-average molecular weight of the polyisocyanate.

A blocked polyisocyanate composition or a polyvalent hydroxy compound was directly used as a measurement sample of the weight-average molecular weight. Measurement conditions are shown below.

(Measurement Conditions)
Device: HLC-802A (manufactured by Tosoh Corporation)
Column: G1000HXL×1 column, G2000HXL×1 column, G3000HXL×1 column (all of these were manufactured by Tosoh Corporation.)
Carrier: Tetrahydrofuran
Detection method: Differential refractometer

[Physical Property 3]
(Average Number of Isocyanate Groups)

The average number of isocyanate groups of the polyisocyanate (average NCO number) was determined in accordance with the following equation. In the equation, "Mn" is the number-average molecular weight of a polyisocyanate before being blocked with a blocking agent and the value determined in the above-mentioned "physical property 2" was used. The term "NCO content ratio" means the content ratio of isocyanate groups in a polyisocyanate measured before being blocked with a blocking agent, and the value determined in the above-mentioned "physical property 1" was used.

Average number of isocyanate groups=$(Mn \times NCO$ content ratio$\times 0.01)/42$

[Physical Property 4]
(Amount of Solid Content in Blocked Polyisocyanate Composition)

The amount of solid content in the blocked polyisocyanate composition was determined as described below.

The weight of an aluminum plate having a bottom diameter of 38 mm was precisely measured. Then, approximately 1 g of a blocked polyisocyanate composition prepared in an example or comparative example was placed on the aluminum plate, and the weight thereof (W1) was precisely measured. Then, the thickness of the blocked polyisocyanate composition was adjusted to be uniform. Then, the blocked polyisocyanate composition placed on the aluminum plate was maintained at 105° C. in an oven for 1 hour. Then, when the temperature of the aluminum plate decreased to room temperature, the weight (W2) of the blocked polyisocyanate composition remaining on the aluminum plate was measured. Then, the amount of solid content (% by mass) in the blocked polyisocyanate composition was calculated in accordance with the following equation.

Amount (% by mass) of solid content in blocked polyisocyanate composition=$W2/W1 \times 100$

[Physical Property 5]
(Hydroxy Group Value)

The hydroxy group value of the polyvalent hydroxy compound was measured by potentiometer titration and calculated. The hydroxy group value is a value relative to the solid content in the polyvalent hydroxy compound.

[Physical Property 6]
(Glass Transition Temperature Tg)

An organic solvent and the moisture content in a polyvalent hydroxy compound solution were evaporated under reduced pressure, and then the resultant was subjected to vacuum drying, followed by measuring the glass transition temperature of the resultant using a differential scanning calory (DSC) measurement device at a temperature increase rate of 5° C./minute.

[Physical Property 7]
(Molar Ratio of Hydroxy Groups Contained in Polyol A to Constitution Unit (I) (OH/Constitution Unit (I))

The molar ratio of the amount (mol) of hydroxy groups contained in polyol A in the blocked polyisocyanate composition relative to that of the constitution unit (I) was calculated from formulation amounts of the polyol A and a blocking agent.

The amount (mol) of hydroxy groups contained in polyol A was determined by a gas chromatography/mass spectrometry method (GC/MS method), and the amount (mol) of the constitution unit (I) was determined by $^{13}$C-NMR, to determine the molar ratio thereof.

(Measurement Conditions)
(Amount (Mol) of Hydroxy Groups Contained in Polyol A)

5-Times mol of 2-ethylhexanol relative to the molar amount of effective isocyanate groups in a blocked polyisocyanate composition was added to the blocked polyisocyanate composition, followed by heating the mixture at 120° C. for 5 hours. The heated reaction liquid was subjected to gas chromatography/mass spectrometry (GC/MS) to measure the generated polyol A component, and then the amount (mol) of hydroxy groups contained in polyol A in the blocked polyisocyanate composition was calculated.

Device: "Agilent 7890, 5977" manufactured by Agilent Technologies, Inc.
    Column: "HP-5MS" (L 30 m, I.D 0.250 mm, Film 0.25 μm) manufactured by Agilent Technologies, Inc.
    Carrier gas: Helium
    Detection device: MSD
    Ionization: EI
    Inlet temperature: 320° C.
    Transfer temperature: 320° C.
    Oven temperature: 40° C. (maintained for 5 minutes)→ (temperature elevated at 20° C./minute)→320° C. (maintained for 10 minutes)
    Split ratio: 1/1000
    Mass range: m/z 10 to 800
    Injection volume: 0.5 μL (Amount (Mol) of Constitution Unit (I))

The amount of the constitution unit (I) in the blocked polyisocyanate composition was determined by $^{13}$C-NMR.

Device: "JEOL-ECZ500 (SC) (trade name) manufactured by JEOL Ltd.
    Solvent: Deuterated chloroform
    Cumulated number: 5120
    Sample concentration: 50 wt/vol %
    Chemical shift standard: Deuterated chloroform was set at 77.0 ppm.

[Physical Property 8] Molar Ratio of Constitution Unit (I-1) to Constitution Unit (I)

The molar ratio of constitution unit (I-1) to constitution unit (I) in a blocked polyisocyanate composition (constitution unit (I-1)/constitution unit (I)) was determined by the following method.

Specifically, the total molar amount of the constitution unit (I) (including the constitution unit (I-1)) and the molar amount of the constitution unit (I-1) were determined by a $^{13}$C-NMR analysis using "JEOL-ECZ500 (SC) (trade name) manufactured by JEOL Ltd, and then the molar ratio was determined.

(Measurement Conditions)
    Device: "JEOL-ECZ500 (SC) (trade name) manufactured by JEOL Ltd.
    Solvent: Deuterated chloroform
    Cumulated number: 5120
    Sample concentration: 50 wt/vol %
    Chemical shift standard: Deuterated chloroform was set at 77.0 ppm.

[Physical Property 9]
(Molar Ratio of Constitution Unit (II)/Constitution Unit (I))

The molar ratio of the constitution unit (II) to the constitution unit (I) (constitution unit (II)/constitution unit (I)) was determined by evaporating the solvent and other components at 50° C. or lower using an evaporator to dry the blocked polyisocyanate composition under reduced pressure, followed by measuring the constitution ratio of the constitution unit (II) to the constitution unit (I) by $^{13}$C-NMR to determine the molar ratio of the constitution unit (II) to the constitution unit (I).

(Measurement Conditions)
    Device: "JEOL-ECZ500 (SC) (trade name) manufactured by JEOL Ltd.
    Solvent: Deuterated chloroform
    Cumulated number: 5120
    Sample concentration: 50 wt/vol %
    Chemical shift standard: Deuterated chloroform was set at 77.0 ppm.

[Physical Property 10]
(Amount of Monoalcohol in Blocked Polyisocyanate)

The amount (% by mass) of monoalcohol in the blocked polyisocyanate was quantified by a gas chromatography analysis.

Device: GC-2014 manufactured by Shimadzu Corporation.
    Column: Agilent J&W DB-1 (L 30 m, I.D 0.25 mm, Film 1.00 μm)
    Carrier: Helium
    Detection device: FID
    Inlet temperature: 100° C.
    Detection device temperature: 220° C.

Oven temperature: 40° C. (maintained for 5 minutes)→(temperature elevated at 10° C./minute)→150° C. (maintained for 5 minutes)

Injection volume: 0.3 µL

[Preparation 1-1 of Resin Composition]

A polyvalent hydroxy compound OHP1 and each blocked isocyanate composition were formulated such that the molar ratio of isocyanate groups to hydroxy groups (isocyanate groups/hydroxy groups) was 1, followed by further adding 2-propanol to the mixture to adjust the solid content to 35% by mass, thereby obtaining a resin composition.

[Preparation 1-2 of Resin Composition]

A polyvalent hydroxy compound OHP1 and each blocked isocyanate composition were formulated such that the molar ratio of isocyanate groups to hydroxy groups (isocyanate groups/hydroxy groups) was 1, followed by further adding butyl acetate to the mixture to adjust the solid content to 35% by mass, thereby obtaining a resin composition.

[Evaluation 1-1]

(Storage Stability)

The viscosity of each resin composition obtained in the "Preparation 1-1 of resin composition" at an initial stage, and the viscosity thereof after storage at 40° C. for 10 days were measured (viscometer: RE-85R manufactured by TOKI SANGYO CO., LTD.). The ratio of the viscosity after storage relative to the viscosity at an initial stage was calculated. The storage stability was evaluated in accordance with the following criteria based on the calculated ratio of the viscosity after storage relative to the viscosity at the initial stage. The storage stability was evaluated in accordance with the following criteria.

(Evaluation Criteria)

A: Ratio of viscosity after storage to viscosity at an initial stage was 2.0 or less.
B: Ratio of viscosity after storage to viscosity at an initial stage exceeded 2.0 and 3.0 or less.
C: Gelated

[Evaluation 1-2]

(Low-Temperature Curability: Gel Fraction)

Each resin composition obtained by the "Preparation 1-2 of resin composition" was coated on a polypropylene (PP) plate such that a dried film thickness became 40 µm, dried at 80° C. for 30 minutes by heating to form a resin film. The resultant resin film was stored at ordinary temperature (23° C.) for 1 week to measure the gel fraction. The gel fraction was determined as a percentage (% by mass) by dividing the mass of the undissolved portion when the resin film was immersed in acetone at 23° C. for 24 hours by the mass of the resin film before being immersed. In the case where the gel fraction was 82% by mass or more, the resultant resin film was evaluated as favorable.

[Evaluation 1-3]

(Koenig Hardness)

The resin composition obtained in the "Preparation 1-2 of resin composition" was coated on a glass plate such that the dried film thickness became 40 m, followed by heating to dry at 80° C. for 30 minutes to obtain a resin film. The Koenig hardness (times) of the resultant resin film was measured using a Koenig hardness meter (Pendulum Hardness tester manufactured by BYK Gardner) at 23° C. In the case where the Koenig hardness was 40 times or more, the resultant was evaluated as favorable.

[Evaluation 1-4]

(Strength: Maximum Tensile Stress)

Each resin composition obtained by the "Preparation 1-2 of resin composition" was coated on a polypropylene (PP) plate such that the dried coating film thickness became 40 m, followed by heating and drying at 80° C. for 30 minutes to obtain a resin film. The resultant resin film was cut into a size of a width of 10 mm and a length of 40 mm, and then set such that the distance between chucks became 20 mm, followed by conducting a tensile test at 23° C. at a speed of 20 mm/minute. The maximum point stress was measured as the maximum tensile stress. In the case where the maximum tensile stress was 10.0 MPa or more, the resultant resin film was evaluated as favorable.

[Evaluation 1-5]

(Solvent Resistance (Xylene Rubbing Test))

Each resultant aqueous resin composition was coated on a glass plate such that the dried coating film thickness became 40 µm, and then heated to dry at 85° C. for 30 minutes to obtain each resin film. Then, the resultant resin film was stored at ordinary temperature (23° C.) for one day, and then rubbed with a cotton swab immersed in xylene in a reciprocating motion repeatedly 20 times over a distance of 3 cm, followed by observing the state of the resultant resin film. The solvent resistance was evaluated from the state of the resultant resin film in accordance with the following evaluation criteria. In the case where the evaluation result was B or better, the resultant resin film was evaluated as favorable.

A: Almost no deterioration was confirmed.
B: Streaks were confirmed partially in the rubbed portion.
C: Streaks were confirmed in the rubbed portion, and film-thinning phenomena were confirmed.
D: There were places in which the resin film was dissolved completely in the rubbed portion.

Synthesis of Polyisocyanate

Synthesis Example 1-1

(Synthesis of Polyisocyanate P1-1)

100 parts by mass of HDI and 5.3 parts by mass of polyester polyol (polycaprolactone triol) ("PLACCEL 303" (trade name) manufactured by DAICEL ChemTech, Inc., and having an average number of functional groups of 3, and a number-average molecular weight of 300) derived from a trivalent alcohol and ε-caprolactone were charged into a four-necked flask equipped with a thermometer, a stirrer blade and a reflux cooling tube in a nitrogen gas flow, and then the mixture was stirred while maintaining the temperature in the reactor at 89° C. for 1 hour to allow a urethane-forming reaction to proceed. Then, the temperature in the reactor was maintained at 63° C., and tetramethylammonium caprylate, which is an isocyanurate-forming catalyst, was added to the resultant, followed by adding a phosphoric acid when the yield reached 52% by mass to terminate the reaction. The reaction liquid was subjected to filtration, and then unreacted HDI was removed therefrom using a thin film evaporator to obtain an isocyanurate-type polyisocyanate (hereinafter, may be referred to as "polyisocyanate P1-1").

The NCO content ratio of the resultant polyisocyanate P1-1 was 18.6% by mass, the number-average molecular weight thereof was 1220, and the average number of isocyanate groups was 5.4. The resultant polyisocyanate P1-1 was subjected to $^1$H-NMR analysis to confirm the presence of an isocyanurate group.

Synthesis Example 1-2

(Synthesis of Polyisocyanate P1-2)

81 parts by mass of HDI, 19 parts by mass of IPDI, and 3.35 parts by mass of trimethylolpropane (having an average number of functional groups of 3, and a molecular weight of 134), which is a trivalent alcohol, were charged into a four-necked flask equipped with a thermometer, a stirrer blade and a reflux cooling tube in a nitrogen gas flow, and then the mixture was stirred while maintaining the temperature in the reactor at 88° C. for 1 hour to allow a urethane-forming reaction to proceed. Then, the temperature in the reactor was maintained at 78° C., and 0.012 parts by mass of tetramethylammonium caprylate, which is an isocyanurate-forming catalyst, was added to the resultant, followed by adding a phosphoric acid when the yield reached 44% by mass to terminate the reaction. The reaction liquid was subjected to filtration, and then unreacted HDI and IPDI were removed therefrom using a thin film evaporator to obtain an isocyanurate-type polyisocyanate (hereinafter, may be referred to as "polyisocyanate P1-2"). The NCO content ratio of the resultant polyisocyanate P1-2 was 19.0% by mass, the number-average molecular weight thereof was 1170, and the average number of isocyanate groups was 5.3. The resultant polyisocyanate P1-2 was subjected to $^1$H-NMR analysis to confirm the presence of an isocyanurate group.

Synthesis Example 1-3

(Synthesis of Polyisocyanate P1-3)

70 parts by mass of HDI, 30 parts by mass of IPDI, and 2.9 parts by mass of trimethylolpropane (having an average number of functional groups of 3, and a molecular weight of 134), which is a trivalent alcohol, were charged into a four-necked flask equipped with a thermometer, a stirrer blade and a reflux cooling tube in a nitrogen gas flow, and then the mixture was stirred while maintaining the temperature in the reactor at 88° C. for 1 hour to allow a urethane-forming reaction to proceed. Then, the temperature in the reactor was maintained at 78° C., and 0.012 parts by mass of tetramethylammonium caprylate, which is an isocyanurate-forming catalyst, was added to the resultant, followed by adding a phosphoric acid when the yield reached 44% by mass to terminate the reaction. The reaction liquid was subjected to filtration, and then unreacted HDI and IPDI were removed therefrom using a thin film evaporator to obtain an isocyanurate-type polyisocyanate (hereinafter, may be referred to as "polyisocyanate P1-3"). The NCO content ratio of the resultant polyisocyanate P1-3 was 18.9% by mass, the number-average molecular weight thereof was 1130, and the average number of isocyanate groups was 5.1. The resultant polyisocyanate P1-3 was subjected to $^1$H-NMR analysis to confirm the presence of an isocyanurate group.

Synthesis Example 1-4

(Synthesis of Polyisocyanate P1-4)

100 parts by mass of HDI was charged into a four-necked flask equipped with a thermometer, a stirrer blade and a reflux cooling tube in a nitrogen gas flow, and 0.095 parts by mass of trimethylbenzylammonium hydroxide was added thereto while stirring and maintaining the temperature in the reactor at 60° C. 4.5 hours later, the reaction was terminated by adding 0.02 parts by mass of a phosphoric acid to the resultant when the conversion ratio reached 40% by mass. The reaction liquid was subjected to filtration, and then unreacted HDI was removed therefrom using a thin film evaporator to obtain an isocyanurate-type polyisocyanate (hereinafter, may be referred to as "polyisocyanate P1-4"). The NCO content ratio of the resultant polyisocyanate P1-4 was 22.0% by mass, the number-average molecular weight thereof was 655, and the average number of isocyanate groups was 3.43. The resultant polyisocyanate P1-4 was subjected to $^1$H-NMR analysis to confirm the presence of an isocyanurate group.

Synthesis Example 1-5

(Synthesis of Polyisocyanate P1-5)

600 parts by mass of HDI and 10.8 parts by mass of 1,3-butanediol, which is a divalent alcohol, were charged into a four-necked flask equipped with a thermometer, a stirrer blade and a reflux cooling tube in a nitrogen gas flow, followed by maintaining the temperature in the reactor at 90° C. for 1 hour while stirring the mixture to allow a urethane-forming reaction to proceed. Then, 0.03 parts by mass of tetetramethylammonium caprylate was added to the resultant as an isocyanurate-forming catalyst while maintaining the temperature in the reactor at 80° C., the refractive index of the reaction liquid was measured, and a phosphoric acid was added thereto to terminate the reaction when the yield reached 55%. The reaction liquid was subjected to filtration, and then unreacted HDI was removed therefrom using a thin film evaporator to obtain an isocyanurate-type polyisocyanate (hereinafter, may be referred to as "polyisocyanate P1-5"). The NCO content ratio of the resultant polyisocyanate P1-5 was 19.3% by mass, the number-average molecular weight thereof was 970, and the average number of isocyanate groups was 4.4. The resultant polyisocyanate P1-5 was subjected to $^1$H-NMR analysis to confirm the presence of an isocyanurate group.

Preparation of Blocked Polyisocyanate Composition

Example 1-1

(Preparation of Blocked Polyisocyanate Composition BL-a1-1)

100 parts by mass of the polyisocyanate P1-1 obtained in Synthesis Example 1-1, 0.59 parts by mass (0.50% by mol, relative to 100% by mol of isocyanate groups) of polycaprolactone diol (hereinafter, may be referred to as "C1") ("PLACCEL 205UT" (trade name) manufactured by DAICEL ChemTech, Inc., and having a number-average molecular weight of 530, and an average number of functional groups of 2), 0.008 parts by mass of 2-ethylhexyl acid phosphate ("JP-508T" (trade name) manufactured by JOHOKU CHEMICAL CO., LTD.), and 54.2% by mass of dipropylene glycol dimethyl ether (DPDM) were mixed in a four-necked flask equipped with a thermometer, a stirrer blade and a reflux cooling tube in a nitrogen gas flow, to allow the reaction to proceed at 80° C. for 3 hours. The reaction liquid was cooled to 40° C., and then 50% by mol of diisopropyl malonate (hereinafter, may be referred to as "B1") relative to 100% by mol of isocyanate groups and 50% by mol of di-tert-butyl malonate (hereinafter, may be referred to as "B2") relative to 100% by mol of isocyanate groups were added thereto followed by further adding dipropylene glycol dimethyl ether (DPDM) thereto to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more. The disappearance of the peak of isocyanate groups was confirmed by infrared spectroscopy (IR) to obtain a blocked polyisocyanate composition BL-a1-1. The solid content of the resultant blocked polyisocyanate composition BL-a1-1 was 60.0% by mass, and the weight-average molecular weight thereof was $2.1 \times 10^4$.

[Examples 1-2 to 1-14, 1-17 to 1-21, 1-23, and 1-26 and Comparative Examples 1-1 and 1-2]
(Preparation of Blocked Polyisocyanate Compositions BL-a1-2 to BL-a1-14, BL-a1-17 to BL-a1-21, BL-a1-23, BL-a1-26, BL-b1-1 and BL-b1-2)

Each blocked polyisocyanate composition was prepared by the same method as that of Example 1-1, except that the kind of the polyisocyanate, polyol and blocking agent, and the formulation amount thereof were changed to those shown in Tables 1 to 6.

Example 1-15

(Preparation of Blocked Polyisocyanate Composition BL-a1-15)
100 parts by mass of the polyisocyanate P1-1 obtained in Synthesis Example 1-1, 50% by mol of diisopropyl malonate (B1) relative to 100% by mol of isocyanate groups and 50% by mol of di-tert-butyl malonate (B2) relative to 100% by mol of isocyanate groups were charged in a four-necked flask equipped with a thermometer, a stirrer blade and a reflux cooling tube in a nitrogen gas flow, followed by adding dipropylene glycol dimethyl ether (DPDM) thereto to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more. Then, 0.59 parts by mass of polycaprolactone diol (C1) ("PLACCEL 205UT" (trade name) manufactured by DAICEL ChemTech, Inc., and having a number-average molecular weight of 530, and an average number of functional groups of 2) was added to the resultant, followed by adjusting an outer bath such that the solution temperature was 80° C. to allow the reaction to proceed for 2 hours, thereby obtaining a blocked polyisocyanate composition BL-a1-15. The solid content of the resultant blocked polyisocyanate composition BL-a1-15 was 60.1% by mass, and the weight-average molecular weight thereof was $1.8 \times 10^4$.

Example 1-16

(Preparation of Blocked Polyisocyanate Composition BL-a1-16)
100 parts by mass of the polyisocyanate P1-2 obtained in Synthesis Example 1-2, 0.59 parts by mass (0.50% by mol relative to 100% by mol of isocyanate groups) of polycaprolactone diol (C1) ("PLACCEL 205UT" (trade name) manufactured by DAICEL ChemTech, Inc., and having a number-average molecular weight of 530, and an average number of functional groups of 2), 0.5% by mol of methoxypolyethylene glycol (MPG-081, having 15 ethylene oxide repeating units, and manufactured by NIPPON NYUKAZAI CO., LTD.) relative to 100% by mol of isocyanate groups of the polyisocyanate P1-2, 0.008 parts by mass of 2-ethylhexyl acid phosphate ("JP-508T" (trade name) manufactured by JOHOKU CHEMICAL CO., LTD.) and 54.2 parts by mass of dipropylene glycol dimethyl ether (DPDM) were mixed in a four-necked flask equipped with a thermometer, a stirrer blade and a reflux cooling tube in a nitrogen gas flow, to allow the reaction to proceed at 80° C. for 4 hours. The reaction liquid was cooled to 40° C., and 70% by mol of diisopropyl malonate (B1) relative to 100% by mol of isocyanate groups, and 30% by mol of di-tert-butyl malonate (B2) relative to 100% by mol of isocyanate groups were charged therein, followed by further adding dipropylene glycol dimethyl ether (DPDM) thereto to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more. The disappearance of the peak of isocyanate groups was confirmed by infrared spectroscopy (IR) to obtain a blocked polyisocyanate composition BL-a1-16. The solid content of the resultant blocked polyisocyanate composition BL-a1-16 was 60.0% by mass, and the weight-average molecular weight thereof was $2.0 \times 10^4$.

Example 1-22

(Preparation of Blocked Polyisocyanate Composition BL-a1-22)
100 parts by mass of the polyisocyanate P1-1 obtained in Synthesis Example 1-1, 5.9 parts by mass (0.50% by mol relative to 100% by mol of isocyanate groups) of polycaprolactone diol (C1) ("PLACCEL 205UT" (trade name) manufactured by DAICEL ChemTech, Inc., and having a number-average molecular weight of 530, and an average number of functional groups of 2), 0.008 parts by mass of 2-ethylhexyl acid phosphate ("JP-508T" (trade name) manufactured by JOHOKU CHEMICAL CO., LTD.), and 57.0 parts by mass of dipropylene glycol dimethyl ether (DPDM) were mixed in a four-necked flask equipped with a thermometer, a stirrer blade and a reflux cooling tube in a nitrogen gas flow to allow the reaction to proceed at 80° C. for 3 hours. The reaction liquid was cooled to 40° C., and diisopropyl malonate (B1) equimolar to isocyanate groups was charged thereinto, followed by further adding dipropylene glycol dimethyl ether (DPDM) to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more, thereby obtaining an intermediate of a blocked polyisocyanate composition. Then, 200% by mol of tert-butanol relative to blocked isocyanate groups was added to the resultant to allow the reaction to proceed at 80° C. for 3 hours while removing generated isopropyl alcohol by conducting distillation under ordinary pressure. Then, isopropanol and tert-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a1-22. The solid content of the resultant blocked polyisocyanate composition BL-a1-22 was 60.0% by mass, and the weight-average molecular weight thereof was $9.0 \times 10^3$.

Example 1-24

(Preparation of Blocked Polyisocyanate Composition BL-a1-24)

100 parts by mass of the polyisocyanate P1-1 obtained in Synthesis Example 1-1, 5.9 parts by mass (0.50% by mol relative to 100% by mol of isocyanate groups) of polycaprolactone diol (C1) ("PLACCEL 205UT" (trade name) manufactured by DAICEL ChemTech, Inc., and having a number-average molecular weight of 530, and an average number of functional groups of 2), 0.008 parts by mass of 2-ethylhexyl acid phosphate ("JP-508T" (trade name) manufactured by JOHOKU CHEMICAL CO., LTD.), and 57.0 parts by mass of dipropylene glycol dimethyl ether (DPDM) were mixed into a four-necked flask equipped with a thermometer, a stirrer blade and a reflux cooling tube in a nitrogen gas flow, to allow the reaction to proceed at 80° C. for 3 hours. The reaction liquid was cooled to 40° C., and diisopropyl malonate (B1) equimolar to isocyanate groups was charged thereinto, followed by further adding dipropylene glycol dimethyl ether (DPDM) to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more, thereby obtaining an intermediate of a blocked polyisocyanate composition. Then, 200% by mol of 2-methyl-2-butanol relative to blocked isocyanate groups was added to the resultant to allow the reaction to proceed at 110° C. for 5 hours while removing generated isopropyl alcohol by conducting distillation under ordinary pressure. Then, isopropanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a1-24. The solid content of the resultant blocked polyisocyanate composition BL-a1-24 was 60.0% by mass, and the weight-average molecular weight thereof was $9.0\times10^3$.

Example 1-25

(Preparation of Blocked Polyisocyanate Composition BL-a1-25)

100 parts by mass of the polyisocyanate P1-1 obtained in Synthesis Example 1-1 and diisopropyl malonate (B1) equimolar to isocyanate groups were charged into a four-necked flask equipped with a thermometer, a stirrer blade and a reflux cooling tube in a nitrogen gas flow, followed by adding dipropylene glycol dimethyl ether (DPDM) thereto to adjust the solid content to 60% by mass. Then, 1.1 parts by mass of a methanol solution containing sodium methylate (28% by mass relative to the total mass of the solution) was added dropwise while conducting stirring, followed by adjusting an outer bath such that the solution temperature was 47° C. to allow the blocking reaction to proceed at 47° C. for 6 hours or more. Then, 5.9 parts by mass of polycaprolactone diol (C1) ("PLACCEL 205UT" (trade name) manufactured by DAICEL ChemTech, Inc., and having a number-average molecular weight of 530, and an average number of functional groups of 2) was added to the resultant, followed by adjusting an outer bath such that the solution temperature was 80° C. to allow the reaction to proceed for 2 hours. Then, 200% by mol of 2-methyl-2-butanol relative to blocked isocyanate groups was added to the resultant to allow the reaction to proceed at 110° C. for 5 hours while removing generated isopropyl alcohol by conducting distillation under ordinary pressure. Then, isopropanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a1-25. The solid content of the resultant blocked polyisocyanate composition BL-a1-25 was 60.0% by mass, and the weight-average molecular weight thereof was $9.0\times10^3$.

Preparation of Polyvalent Hydroxy Compound

Preparation Example 1

(Preparation of Polyvalent Hydroxy Compound OHP1)

29 parts by mass of propylene glycol monomethyl ether was charged into a four-necked flask equipped with a stirrer, a thermometer, a cooling tube, and a nitrogen gas inlet, and the temperature was increased to 110° C. in a nitrogen gas flow. When the temperature reached 110° C., the supply of nitrogen gas was stopped, and then a mixture composed of 22.3 parts by mass of 2-hydroxyethyl methacrylate, 8.0 parts by mass of methyl methacrylate, 26.1 parts by mass of butyl acrylate, 42.3 parts by mass of styrene, 1.3 parts by mass of acrylic acid, and 1.9 parts by mass of 2,2'-azobis(isobutyronitrile) was added dropwise over 5.5 hours. Then, the resultant was stirred at 115° C. for 3 hours while flowing nitrogen gas, and then cooled to 30° C., followed by removing the solvent by an evaporator. Then, butyl acetate was added to the resultant to obtain a solution of a polyvalent hydroxy compound OHPT, which was an acrylic polyol-based resin having a solid content of 60% by mass. The weight-average molecular weight Mw of the polyvalent hydroxy compound OHP1 was $2.73\times10^4$, the hydroxy group value thereof was 139 mgKOH/g, and the glass transition temperature Tg was 29.8° C.

In the following Tables 1 to 6, abbreviations show the following compounds.

(Polyol A)

C1: Polycaprolactone diol ("PLACCEL 205UT" (trade name) manufactured by DAICEL ChemTech, Inc., and having a number-average molecular weight of 530, and an average number of functional groups of 2).

C2: Polycaprolactone diol ("PLACCEL 220CPT" (trade name) manufactured by DAICEL ChemTech, Inc., and having a number-average molecular weight of 2000, and an average number of functional groups of 2).

C3: Polycaprolactone diol ("PLACCEL 240CP" (trade name) manufactured by DAICEL ChemTech, Inc., and having a number-average molecular weight of 4000 and an average number of functional groups of 2).

C4: 1,4-Butane diol (having a molecular weight of 90.12, and two hydroxy groups).

C5: 1,3-Butanediol (having a molecular weight of 90.12, and two hydroxy groups).

(Blocking Agent)

B1: Diisopropyl malonate

B2: Di-tert-butyl malonate

B3: Di(2-methyl-2-butyl) malonate

TABLE 1

| | | | Example 1-1 BL-a1-1 | Example 1-2 BL-a1-2 | Example 1-3 BL-a1-3 | Example 1-4 BL-a1-4 | Example 1-5 BL-a1-5 |
|---|---|---|---|---|---|---|---|
| Blocked polyisocyanate composition | | | | | | | |
| Constitution | Polyisocyanate | Type | P1-1 | P1-1 | P1-1 | P1-1 | P1-1 |
| | | Formulation amount (parts by mass) | 100 | 100 | 100 | 100 | 100 |
| | Polyol A | Type | C1 | C1 | C1 | C1 | C2 |
| | | Formulation amount (parts by mass) | 0.59 | 1.18 | 3.54 | 5.9 | 2.19 |
| | Blocking agent | Type | B1 B2 — | B1 B2 — | B1 B2 — | B1 B2 — | B1 B2 — |
| | | Molar ratio (B1)/(B2) | 50/50 | 50/50 | 50/50 | 50/50 | 50/50 |
| | | Molar ratio (B1)/(B3) | — | — | — | — | — |
| | Constitution unit (I) | Total carbon number of $R^{11}$, $R^{12}$, and $R^{13}$ | 3 | 3 | 3 | 3 | 3 |
| | | Molar ratio (Constitution unit (I-1)/ Constitution unit (I)) | 0% | 0% | 0% | 0% | 0% |
| | Amount of alcohol | % by mass | 0% | 0% | 0% | 0% | 0% |

TABLE 2

| | | | Example 1-6 BL-a1-6 | Example 1-7 BL-a1-7 | Example 1-8 BL-a1-8 | Example 1-9 BL-a1-9 | Example 1-10 BL-a1-10 |
|---|---|---|---|---|---|---|---|
| Blocked polyisocyanate composition | | | | | | | |
| Constitution | Polyisocyanate | Type | P1-1 | P1-1 | P1-1 | P1-1 | P1-1 |
| | | Formulation amount (parts by mass) | 100 | 100 | 100 | 100 | 100 |
| | Polyol A | Type | C2 | C3 | C4 | C4 | C1 |
| | | Formulation amount (parts by mass) | 4.39 | 4.42 | 0.3 | 0.2 | 0.59 |
| | Blocking agent | Type | B1 B2 — | B1 B2 — | B1 B2 — | B1 B2 — | B1 B2 — |
| | | Molar ratio (B1)/(B2) | 50/50 | 50/50 | 50/50 | 50/50 | 70/30 |
| | | Molar ratio (B1)/(B3) | — | — | — | — | — |
| | Constitution unit (I) | Total carbon number of $R^{11}$, $R^{12}$, and $R^{13}$ | 3 | 3 | 3 | 3 | 3 |
| | | Molar ratio (Constitution unit (I-1)/ Constitution unit (I)) | 0% | 0% | 0% | 0% | 0% |
| | Amount of alcohol | % by mass | 0% | 0% | 0% | 0% | 0% |

TABLE 3

| | | | Example 1-11 BL-a1-11 | Example 1-12 BL-a1-12 | Example 1-13 BL-a1-13 | Example 1-14 BL-a1-14 | Example 1-15 BL-a1-15 |
|---|---|---|---|---|---|---|---|
| Blocked polyisocyanate composition | | | | | | | |
| Constitution | Polyisocyanate | Type | P1-1 | P1-1 | P1-2 | P1-3 | P1-1 |
| | | Formulation amount (parts by mass) | 100 | 100 | 100 | 100 | 100 |
| | Polyol A | Type | C1 | C1 | C1 | C1 | C1 |
| | | Formulation amount (parts by mass) | 1.18 | 1.18 | 1.21 | 1.2 | 0.59 |
| | Blocking agent | Type | B1 B2 — | B1 B2 — | B1 B2 — | B1 B2 — | B1 B2 — |
| | | Molar ratio (B1)/(B2) | 70/30 | 70/30 | 92/8 | 70/30 | 50/50 |
| | | Molar ratio (B1)/(B3) | — | — | — | — | — |
| | Constitution unit (I) | Total carbon number of $R^{11}$, $R^{12}$, and $R^{13}$ | 3 | 3 | 3 | 3 | 3 |
| | | Molar ratio (Constitution unit (I-1)/ Constitution unit (I)) | 0% | 0% | 0% | 0% | 0% |
| | Amount of alcohol | % by mass | 0% | 0% | 0% | 0% | 0% |

TABLE 4

| | | | Example 1-16 BL-a1-16 | Example 1-17 BL-a1-17 | Example 1-18 BL-a1-18 | Example 1-19 BL-a1-19 | Example 1-20 BL-a1-20 |
|---|---|---|---|---|---|---|---|
| Blocked polyisocyanate composition | | | | | | | |
| Constitution | Polyisocyanate | Type | P1-2 | P1-1 | P1-1 | P1-1 | P1-1 |
| | | Formulation amount (parts by mass) | 100 | 100 | 100 | 100 | 100 |

TABLE 4-continued

| Blocked polyisocyanate composition | | Example 1-16 BL-a1-16 | Example 1-17 BL-a1-17 | Example 1-18 BL-a1-18 | Example 1-19 BL-a1-19 | Example 1-20 BL-a1-20 |
|---|---|---|---|---|---|---|
| Polyol A | Type | C1 | C1 | C1 | C1 | C1 |
| | Formulation amount (parts by mass) | 0.59 | 5.9 | 5.9 | 9.5 | 0.59 |
| Blocking agent | Type | B1 B2 — | B1 B2 — | B1 B2 — | B1 B2 — | B1 B2 — |
| | Molar ratio (B1)/(B2) | 70/30 | 20/80 | 40/60 | 50/50 | 97.2/2.8 |
| | Molar ratio (B1)/(B3) | — | — | — | — | — |
| Constitution unit (I) | Total carbon number of $R^{11}$, $R^{12}$, and $R^{13}$ | 3 | 3 | 3 | 3 | 3 |
| Molar ratio (Constitution unit (I-1)/ Constitution unit (I)) | | 0% | 0% | 0% | 0% | 0% |
| Amount of alcohol | % by mass | 0% | 0% | 0% | 0% | 0% |

TABLE 5

| Blocked polyisocyanate composition | | | Example 1-21 BL-a1-21 | Example 1-22 BL-a1-22 | Example 1-23 BL-a1-23 | Example 1-24 BL-a1-24 | Example 1-25 BL-a1-25 |
|---|---|---|---|---|---|---|---|
| Constitution | Polyisocyanate | Type | P1-1 | P1-1 | P1-1 | P1-1 | P1-1 |
| | | Formulation amount (parts by mass) | 100 | 100 | 100 | 100 | 100 |
| | Polyol A | Type | C1 | C1 | C1 | C1 | C1 |
| | | Formulation amount (parts by mass) | 0.59 | 5.9 | 5.9 | 5.9 | 5.9 |
| | Blocking agent | Type | B1 B2 — | B1 — — | B1 — B3 | B1 — — | B1 — — |
| | | Molar ratio (B1)/(B2) | 98.6/1.4 | 100/0 | — | 100/0 | 100/0 |
| | | Molar ratio (B1)/(B3) | — | — | 40/60 | — | — |
| Constitution unit (I) | | Total carbon number of $R^{11}$, $R^{12}$, and $R^{13}$ | 3 | 3 | 4 | 4 | 4 |
| Molar ratio (Constitution unit (I-1)/ Constitution unit (I)) | | | 0% | 80% | 0% | 80% | 80% |
| Amount of alcohol | | % by mass | 0% | 3% | 0% | 3% | 3% |

TABLE 6

| | | | Example 1-26 | Comparative Example 1-1 | Comparative Example 1-2 |
|---|---|---|---|---|---|
| Blocked polyisocyanate composition | | | BL-a1-26 | BL-b1-1 | BL-b1-2 |
| Constitution | Polyisocyanate | Type | P1-5 | P1-1 | P1-4 |
| | | Formulation amount (parts by mass) | 100 | 100 | 100 |
| | Polyol A | Type | C5 | Unmodified | Unmodified |
| | | Formulation amount (parts by mass) | 3.25 | — | — |
| | Blocking agent | Type | B1 B2 — | — B2 — | — B2 — |
| | | Molar ratio (B1)/(B2) | 40/60 | 0/100 | 0/100 |
| | | Molar ratio (B1)/(B3) | — | — | — |
| Constitution unit (I) | | Total carbon number of $R^{11}$, $R^{12}$, and $R^{13}$ | 3 | 3 | 3 |
| Molar ratio (Constitution unit (I-1)/ Constitution unit (I)) | | | 0% | 0% | 0% |
| Amount of alcohol | | % by mass | 0% | 0% | 0% |

TABLE 7

| | | Example 1-1 | Example 1-2 | Example 1-3 | Example 1-4 | Example 1-5 |
|---|---|---|---|---|---|---|
| Physical properties | Average NCO number of polyisocyanate | 5.4 | 5.4 | 5.4 | 5.4 | 5.4 |
| | Number-average molecular weight of polyol A | 530 | 530 | 530 | 530 | 2000 |
| | Average number of functional groups of polyol A | 2 | 2 | 2 | 2 | 2 |
| | Molar ratio (OH/Constitution unit (I)) | 1.0/99.0 | 2.0/98.0 | 5.9/94.1 | 9.6/90.4 | 1.0/99.0 |
| | Solid content (% by mass) | 60 | 60 | 60 | 60 | 60 |
| | Weight-average molecular weight | $1.8 \times 10^4$ | $2.0 \times 10^4$ | $2.5 \times 10^4$ | $3.0 \times 10^4$ | $2.4 \times 10^4$ |
| Evaluation | Storage stability | A | A | A | A | A |
| | Low-temperature curability (gel fraction: % by mass) | 89.3 | 89.2 | 88.9 | 88.5 | 89.6 |
| | Solvent resistance | B | B | B | A | B |
| | Koenig hardness (times) | 68 | 67 | 65 | 63 | 67 |
| | Maximum tensile stress (MPa) | 28.5 | 28.3 | 27.5 | 25.5 | 28.8 |

TABLE 8

| | | Example 1-6 | Example 1-7 | Example 1-8 | Example 1-9 | Example 1-10 |
|---|---|---|---|---|---|---|
| Physical properties | Average NCO number of polyisocyanate | 5.4 | 5.4 | 5.4 | 5.4 | 5.4 |
| | Number-average molecular weight of polyol A | 2000 | 4000 | 90 | 90 | 530 |
| | Average number of functional groups of polyol A | 2 | 2 | 2 | 2 | 2 |
| | Molar ratio (OH/Constitution unit (I)) | 2.0/98.0 | 1.0/99.0 | 3.0/97.0 | 2.0/98.0 | 1.7/98.3 |
| | Solid content (% by mass) | 60 | 60 | 60 | 60 | 60 |
| | Weight-average molecular weight | $2.6 \times 10^4$ | $2.5 \times 10^4$ | $1.9 \times 10^4$ | $1.8 \times 10^4$ | $2.2 \times 10^4$ |
| Evaluation | Storage stability | A | A | A | A | A |
| | Low-temperature curability (gel fraction: % by mass) | 89.7 | 89.5 | 88.3 | 88.4 | 89.1 |
| | Solvent resistance | B | B | B | B | B |
| | Koenig hardness (times) | 66 | 66 | 67 | 68 | 67 |
| | Maximum tensile stress (MPa) | 28.6 | 27.6 | 26.8 | 27 | 28.2 |

TABLE 9

| | | Example 1-11 | Example 1-12 | Example 1-13 | Example 1-14 | Example 1-15 |
|---|---|---|---|---|---|---|
| Physical properties | Average NCO number of polyisocyanate | 5.4 | 5.4 | 5.3 | 5.1 | 5.4 |
| | Number-average molecular weight of polyol A | 530 | 530 | 530 | 530 | 530 |
| | Average number of functional groups of polyol A | 2 | 2 | 2 | 2 | 2 |
| | Molar ratio (OH/Constitution unit (I)) | 3.3/96.7 | 11.3/88.7 | 3.3/96.7 | 3.3/96.7 | 1.0/99.0 |
| | Solid content (% by mass) | 60 | 60 | 60 | 60 | 60 |
| | Weight-average molecular weight | $2.3 \times 10^4$ | $2.5 \times 10^4$ | $1.9 \times 10^4$ | $1.8 \times 10^4$ | $1.7 \times 10^4$ |

TABLE 9-continued

| | | Example 1-11 | Example 1-12 | Example 1-13 | Example 1-14 | Example 1-15 |
|---|---|---|---|---|---|---|
| Evaluation | Storage stability | A | A | A | A | A |
| | Low-temperature curability (gel fraction: % by mass) | 89.2 | 87.4 | 89 | 88.6 | 88.9 |
| | Solvent resistance | B | B | B | B | B |
| | Koenig hardness (times) | 67 | 65 | 86 | 88 | 68 |
| | Maximum tensile stress (MPa) | 27.8 | 26.3 | 31.6 | 30.5 | 27.8 |

TABLE 10

| | | Example 1-16 | Example 1-17 | Example 1-18 | Example 1-19 | Example 1-20 |
|---|---|---|---|---|---|---|
| Physical properties | Average NCO number of polyisocyanate | 5.3 | 5.4 | 5.4 | 5.4 | 5.4 |
| | Number-average molecular weight of polyol A | 530 | 530 | 530 | 530 | 530 |
| | Average number of functional groups of polyol A | 2 | 2 | 2 | 2 | 2 |
| | Molar ratio (OH/Constitution unit (I)) | 1.7/98.3 | 6.2/93.8 | 8.1/91.9 | 15/85.0 | 15.3/84.7 |
| | Solid content (% by mass) | 60 | 60 | 60 | 60 | 60 |
| | Weight-average molecular weight | 2.0 × 10$^4$ | 3.0 × 10$^4$ | 3.0 × 10$^4$ | 3.5 × 10$^4$ | 1.8 × 10$^4$ |
| Evaluation | Storage stability | A | A | A | A | A |
| | Low-temperature curability (gel fraction: % by mass) | 89.2 | 88.9 | 87.1 | 89.1 | 75.2 |
| | Solvent resistance | B | A | A | B | c |
| | Koenig hardness (times) | 91 | 72 | 65 | 57 | 21 |
| | Maximum tensile stress (MPa) | 31.8 | 29.3 | 27.7 | 16.2 | 7.3 |

TABLE 11

| | | Example 1-21 | Example 1-22 | Example 1-23 | Example 1-24 | Example 1-25 |
|---|---|---|---|---|---|---|
| Physical properties | Average NCO number of polyisocyanate | 5.4 | 5.4 | 5.4 | 5.4 | 5.4 |
| | Number-average molecular weight of polyol A | 530 | 530 | 530 | 530 | 530 |
| | Average number of functional groups of polyol A | 2 | 2 | 2 | 2 | 2 |
| | Molar ratio (OH/Constitution unit (I)) | 26.5/73.5 | 8.9/91.1 | 8.1/91.9 | 8.9/91.1 | 8.9/91.1 |
| | Solid content (% by mass) | 60 | 60 | 60 | 60 | 60 |
| | Weight-average molecular weight | 1.8 × 10$^4$ | 9.0 × 10$^3$ | 3.0 × 10$^4$ | 9.0 × 10$^3$ | 9.0 × 10$^3$ |
| Evaluation | Storage stability | A | A | A | A | A |
| | Low-temperature curability (gel fraction: % by mass) | 74.3 | 91.1 | 92.1 | 91.9 | 91.8 |
| | Solvent resistance | C | A | A | A | A |
| | Koenig hardness (times) | 19 | 73 | 75 | 80 | 81 |
| | Maximum tensile stress (MPa) | 6.2 | 32.1 | 35.5 | 37.2 | 36.5 |

TABLE 12

|  |  | Example 1-26 | Comparative Example 1-1 | Comparative Example 1-2 |
|---|---|---|---|---|
| Physical properties | Average NCO number of polyisocyanate | 4.4 | 5.4 | 3.43 |
|  | Number-average molecular weight of polyol A | 90 | — | — |
|  | Average number of functional groups of polyol A | 2 | — | 2 |
|  | Molar ratio (OH/Constitution unit (I)) | 23/77 | 0/100 | 0/100 |
|  | Solid content (% by mass) | 60 | 60 | 60 |
|  | Weight-average molecular weight | $1.2 \times 10^4$ | $8.5 \times 10^3$ | $2.4 \times 10^3$ |
| Evaluation | Storage stability |  | A | A |
|  | Low-temperature curability (gel fraction: % by mass) | 85.4 | 80.9 | 62.3 |
|  | Solvent resistance | C | D | D |
|  | Koenig hardness (times) | 45 | 33 | 4 |
|  | Maximum tensile stress (MPa) | 24.3 | 9.7 | 2.1 |

As shown in the tables, the blocked polyisocyanate compositions BL-a1-1 to BL-a1-16 (Examples 1-1 to 1-16) exhibited favorable storage stability of the resultant resin composition, and excellent curability at a low temperature of about 80° C., hardness and strength of the resultant coating film.

When the blocked polyisocyanate compositions BL-a1-1 to BL-a1-4 (Examples 1-1 to 1-4) in which the formulation amount of the polyol A was different from each other were compared, there was a tendency that the decrease in the formulation amount of the polyol A improved the curability at a low temperature of about 80° C., the hardness and the strength when made into a coating film.

When the blocked polyisocyanate compositions BL-a1-2, BL-a1-11 and BL-a1-12 (Examples 1-2, 1-11 and 1-12) in which the molar ratio of the blocking agent B1 to the blocking agent B2 was different from each other were compared, there was a tendency that the molar ratio B1/B2 of 70/30 or less made the curability at a low temperature of about 80° C. and the hardness of the resultant coating film more excellent, and the molar ratio B1/B2 of 50/50 made the strength of the resultant coating film particularly excellent.

When the blocked polyisocyanate compositions BL-a1-11, BL-a1-13 and BL-a1-14 (Examples 1-11, 1-13 and 1-14) in which the type of the polyisocyanate used was different from each other were compared, there was a tendency that a decrease in the average number of isocyanate groups of the polyisocyanate improved the hardness when made into a coating film, whilst an increase in the average number of isocyanate groups of the polyisocyanate improved the curability at a low temperature of about 80° C.

Although the blocked polyisocyanate compositions BL-b1-1 and BL-b1-2 (Comparative Examples 1-1 and 1-2) obtained without conducting modification with the polyol A exhibited a favorable storage stability of the resultant resin composition, the curability at a low temperature of about 80° C., the hardness, the strength and the solvent resistance when made into a coating film were deteriorated.

[Preparation of Aqueous Resin Composition]

An acrylic polyol ("Setaqua (registered trademarks) 6515" (trade name) manufactured by Nuplex, OH (% by mol) (on solids)=3.3, Acid value (mg KOH/g)=9.9, solid content: 45% by mass) as an aqueous main agent and each blocked polyisocyanate composition were mixed such that the molar ratio of isocyanate groups to hydroxy groups (isocyanate group/hydroxy group) was 0.80. Ion-exchanged water was added to the mixture, followed by adding a minute amount of dimethylaminoethanol thereto to adjust pH to approximately 8.0 to 8.5 and the solid content to 45% by mass. Then, the resultant solution was stirred using a homodisper at 1,000 rpm for 15 minutes, and then defoamed to obtain each aqueous resin composition.

[Evaluation 2-1]

(Low-Temperature Curability)

Each resultant resin composition was coated on a polypropylene (PP) plate such that a dried film thickness became 40 μm, then dried at 85° C. for 30 minutes by heating to form a resin film. The resultant resin film was stored at ordinary temperature (23° C.) for 1 week to measure the gel fraction. The gel fraction was determined as a percentage (% by mass) by dividing the mass of the undissolved portion when the resin film was immersed in acetone at 23° C. for 24 hours by the mass of the resin film before being immersed. The low-temperature curability was evaluated based on the resultant gel fraction in accordance with the following evaluation criteria. In the case where the evaluation result was C or better, the low-temperature curability was evaluated as favorable.

(Evaluation Criteria)

A: Gel fraction at an initial stage was 85% by mass or more.
B: Gel fraction at an initial stage was 82% by mass to less than 85% by mass.
C: Gel fraction at an initial stage was 78% by mass to less than 82% by mass.
D: Gel fraction at an initial stage was 70% by mass to less than 78% by mass.
E: Gel fraction at an initial stage was less than 70% by mass.

[Evaluation 2-2]

(Storage Stability)

20 g of each resultant aqueous resin composition was stored at 40° C. for 3 days, to measure the gel fraction before storage (gel fraction at an initial stage) and the gel fraction after storage. The gel fraction was determined by the method described in "Evaluation 2-1". The gel fraction retention rate was calculated by the following equation.

Gel fraction retention rate (%)=(Gel fraction after storage)/(Gel fraction at an initial stage)×100

The storage stability was evaluated based on the resultant gel fraction retention rate in accordance with the following evaluation criteria. In the case where the evaluation result was D or better, the storage stability was evaluated as favorable.
(Evaluation Criteria)
A: Gel fraction retention rate was 90% or more.
B: Gel fraction retention rate was 80% to less than 90%.
C: Gel fraction retention rate was 73% to less than 80%.
D: Gel fraction retention rate was 67% to less than 73%.
E: Gel fraction retention rate was 60% to less than 67%.
F: Gel fraction retention rate was less than 60%.
[Evaluation 2-3]
(Koenig Hardness)

Each resin film was formed on a glass plate by the same method as described in the "Evaluation 2-1". The Koenig hardness (times) of the resultant resin film was measured using a Koenig hardness meter (Pendulum Hardness tester manufactured by BYK Gardner) at 23° C. The Koenig hardness was evaluated based on the measured Koenig hardness value in accordance with the following evaluation criteria. In the case where the evaluation result was B or better, the Koenig hardness was evaluated as favorable.
(Evaluation Criteria)
A: 30 Times or more.
B: 25 Times to 29 times.
C: 20 Times to 24 times.
D: 19 Times or less.
[Evaluation 2-4]
(Solvent Resistance (Ethanol Rubbing Test))

Each resultant aqueous resin composition was coated on a glass plate such that the dried coating film thickness became 40 μm, and then heated to dry at 85° C. for 30 minutes to obtain each resin film. Then, the resultant resin film was stored at ordinary temperature (23° C.) for one day, and then rubbed with a cotton swab immersed in xylene in a reciprocating motion repeatedly 20 times over a distance of 3 cm, followed by observing the state of the resultant resin film. The solvent resistance was evaluated based on the state of the resultant resin film in accordance with the following evaluation criteria. In the case where the evaluation result was B or better, the solvent resistance was evaluated
(Evaluation Criteria)
A: Almost no deterioration was confirmed.
B: Streaks were confirmed partially in the rubbed portion.
C: Streaks were confirmed in the rubbed portion, and film-thinning phenomena were confirmed.
D: There were places in which the resin film was dissolved completely in the rubbed portion.

Synthesis of Polyisocyanate

Synthesis Example 2-1

(Synthesis of Polyisocyanate P2-1)

100 parts by mass of HDI and 5.2 parts by mass of polyester polyol derived from trivalent alcohol and ε-caprolactone ("PLACCEL 303" (trade name) manufactured by DAICEL ChemTech, Inc., and having an average number of functional groups of 3, and a number-average molecular weight of 300) were charged into a four-necked flask equipped with a thermometer, a stirrer blade and a reflux cooling tube in a nitrogen gas flow, and then the mixture was stirred while maintaining the temperature in the reactor at 88° C. for 1 hour to allow a urethane-forming reaction to proceed. Then, the temperature in the reactor was maintained at 62° C., and tetramethylammonium caprylate, which is an isocyanurate-forming catalyst, was added to the resultant, followed by adding a phosphoric acid when the yield reached 51% by mass to terminate the reaction. The reaction liquid was subjected to filtration, and then unreacted HDI was removed therefrom using a thin film evaporator to obtain an isocyanurate-type polyisocyanate (hereinafter, may be referred to as "polyisocyanate P2-1"). The NCO content ratio of the resultant polyisocyanate P2-1 was 18.8% by mass, the number-average molecular weight thereof was 1180, and the average number of isocyanate groups was 5.3. The resultant polyisocyanate P2-1 was subjected to $^1$H-NMR analysis to confirm the presence of an isocyanurate group.

Synthesis Example 2-2

(Synthesis of Polyisocyanate P2-1)

100 parts by mass of HDI was charged into a four-necked flask equipped with a thermometer, a stirrer blade and a reflux cooling tube in a nitrogen gas flow, the temperature in the reactor was maintained at 60° C., and tetramethylammonium caprylate, which is an isocyanurate-forming catalyst, was added thereto, followed by adding a phosphoric acid when the yield reached 38% by mass to terminate the reaction. The reaction liquid was subjected to filtration, and then unreacted HDI was removed therefrom using a thin film evaporator to obtain an isocyanurate-type polyisocyanate (hereinafter, may be referred to as "polyisocyanate P2-2"). The NCO content ratio of the resultant polyisocyanate P2-2 was 22.2% by mass, the number-average molecular weight thereof was 650, and the average number of isocyanate groups was 3.4. The resultant polyisocyanate P2-2 was subjected to $^1$H-NMR analysis to confirm the presence of an isocyanurate group.

Synthesis Example 2-3

(Synthesis of Polyisocyanate P2-3)

100 parts by mass of polyisocyanate P2-1, 13 parts by mass of dipropylene glycol dimethyl ether (DPDM), 15 parts by mass (5% by mol relative to 100% by mol of isocyanate groups of the polyisocyanate P1-2) of methoxypolyethylene glycol (MPG-081, having 15 ethylene oxide repeating units, and manufactured by NIPPON NYUKAZAI CO., LTD.), 0.08 parts by mass of 2-ethylhexyl acid phosphate (JP-508T manufactured by JOHOKU CHEMICAL CO., LTD.) and dipropylene glycol dimethyl ether (DPDM) were mixed in a four-necked flask equipped with a thermometer, a stirrer blade and a reflux cooling tube in a nitrogen gas flow, and the mixture was stirred at 120° C. for 2 hours to obtain a polyisocyanate P2-3. The NCO content ratio of the resultant polyisocyanate P2-3 was 14.0% by mass, and the average number of isocyanate groups was 5.0.

Synthesis Example 2-4

(Synthesis of Polyisocyanate P2-4)

100 parts by mass of polyisocyanate P2-2, 13 parts by mass of dipropylene glycol dimethyl ether (DPDM), 18 parts by mass (5% by mol relative to 100% by mol of isocyanate groups of the polyisocyanate P2-2) of methoxypolyethylene glycol (MPG-081, having 15 ethylene oxide repeating units, and manufactured by NIPPON NYUKAZAI CO., LTD.), 0.08 parts by mass of 2-ethylhexyl acid phosphate (JP-508T manufactured by JOHOKU CHEMICAL CO., LTD.), and dipropylene glycol dimethyl ether (DPDM) were mixed in a four-necked flask equipped with a thermometer, a stirrer blade and a reflux cooling tube in a nitrogen gas flow, and the mixture was stirred at 120° C. for 2 hours to obtain a polyisocyanate P2-4. The NCO content ratio of the resultant polyisocyanate P2-4 was 16.2% by mass, and the average number of isocyanate groups was 3.2.

Preparation of Blocked Polyisocyanate Composition

Example 2-1

(Preparation of Blocked Polyisocyanate Composition BL-a2-1)

100 parts by mass of the polyisocyanate P2-3 obtained in the Synthesis Example 2-3, 43.9 parts by mass (70% by mol relative to 100% by mol of NCO groups) of diisopropyl malonate, and 23.0 parts by mass (30% by mol relative to 100% by mol of NCO groups) of (2-methyl-2-pentyl)isopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-1 having a solid content of 60% by mass.

Example 2-2

(Preparation of Blocked Polyisocyanate Composition BL-a2-2)

100 parts by mass of the polyisocyanate P2-3 obtained in the Synthesis Example 2-3, 43.9 parts by mass (70% by mol relative to 100% by mol of NCO groups) of diisopropyl malonate, and 21.6 parts by mass (30% by mol relative to 100% by mol of NCO groups) of (2-methyl-2-butyl)isopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-2 having a solid content of 60% by mass.

Example 2-3

(Preparation of Blocked Polyisocyanate Composition BL-a2-3)

100 parts by mass of the polyisocyanate P2-3 obtained in the Synthesis Example 2-3, and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 30 parts by mass (100% by mol relative to blocked isocyanate groups) of 2-methyl-2-butanol was added to the resultant to allow the reaction to proceed at 80° C. for 3 hours while removing generated isopropyl alcohol by conducting distillation under ordinary pressure. Then, isopropanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-3.

Example 2-4

(Preparation of Blocked Polyisocyanate Composition BL-a2-4)

100 parts by mass of the polyisocyanate P2-3 obtained in the Synthesis Example 2-3, and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 15 parts by mass (50% by mol relative to blocked isocyanate groups) of 2-methyl-2-butanol was added to the resultant to allow the reaction to proceed at 80° C. for 3 hours while removing generated isopropyl alcohol by conducting distillation under ordinary pressure. Then, isopropanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-4.

Example 2-5

(Preparation of Blocked Polyisocyanate Composition BL-a2-5)

100 parts by mass of the polyisocyanate P2-3 obtained in the Synthesis Example 2-3, 31.3 parts by mass (50% by mol relative to 100% by mol of NCO groups) of diisopropyl malonate and 34.0 parts by mass (50% by mol relative to 100% by mol of NCO groups) of (2-methyl-2-butyl)isopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-5 having a solid content of 60% by mass.

Example 2-6

(Preparation of Blocked Polyisocyanate Composition BL-a2-6)

100 parts by mass of the polyisocyanate P2-3 obtained in the Synthesis Example 2-3, 60.2 parts by mass (96% by mol relative to 100% by mol of NCO groups) of diisopropyl malonate and 2.9 parts by mass (4% by mol relative to 100% by mol of NCO groups) of (2-methyl-2-butyl)isopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-6 having a solid content of 60% by mass.

Example 2-7

(Preparation of Blocked Polyisocyanate Composition BL-a2-7)

100 parts by mass of the polyisocyanate P2-3 obtained in the Synthesis Example 2-3 and 54.4 parts by mass (102% by mol relative to 100% by mol of NCO groups) of diethyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 30 parts by mass (100% by mol relative to blocked isocyanate groups) of 2-methyl-2-butanol was added to the resultant to allow the reaction to proceed at 80° C. for 5 hours while removing generated ethanol by conducting distillation under ordinary pressure. Then, ethanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-7.

Example 2-8

(Preparation of Blocked Polyisocyanate Composition BL-a2-8)

100 parts by mass of the polyisocyanate P2-3 obtained in the Synthesis Example 2-3 and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 34.8 parts by mass (100% by mol relative to blocked isocyanate groups) of 3-methyl-3-pentanol was added to the resultant to allow the reaction to proceed at 80° C. for 3 hours while removing generated isopropyl alcohol by conducting distillation under ordinary pressure. Then, isopropanol, and 3-methyl-3-pentanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-8.

Example 2-9

(Preparation of Blocked Polyisocyanate Composition BL-a2-9)

100 parts by mass of the polyisocyanate P2-4 obtained in the Synthesis Example 2-4 and 73.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 40.2 parts by mass (100% by mol relative to blocked isocyanate groups) of 3-methyl-3-pentanol was added to the resultant to allow the reaction to proceed at 80° C. for 3 hours while removing generated isopropyl alcohol by conducting distillation under ordinary pressure. Then, isopropanol, and 3-methyl-3-pentanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-9.

Example 2-10

(Preparation of Blocked Polyisocyanate Composition BL-a2-10)

100 parts by mass of the polyisocyanate P2-3 obtained in the Synthesis Example 2-3 and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 43.3 parts by mass (100% by mol relative to blocked isocyanate groups) of 3-ethyl-3-hexanol was added to the resultant to allow the reaction to proceed at 80° C. for 3 hours while removing generated isopropyl alcohol by conducting distillation under ordinary pressure. Then, isopropanol and 3-ethyl-3-hexanol were distilled away at 60° C. under reduced pressure (30 kPa), and finally dipropylene glycol dimethyl ether (DPDM) was added to the resultant to adjust the solid content to 60% by mass, thereby obtaining a blocked polyisocyanate composition BL-a2-10.

Example 2-11

(Preparation of Blocked Polyisocyanate Composition BL-a2-11)

100 parts by mass of the polyisocyanate P2-3 obtained in the Synthesis Example 2-3, 12.5 parts by mass (20% by mol relative to 100% by mol of NCO groups) of diisopropyl malonate and 57.5 parts by mass (80% by mol relative to 100% by mol of NCO groups) of (2-methyl-2-butyl)isopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-11 having a solid content of 60% by mass.

Example 2-12

(Preparation of Blocked Polyisocyanate Composition BL-a2-12)

100 parts by mass of the polyisocyanate P2-3 obtained in the Synthesis Example 2-3 and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 75 parts by mass (250% by mol relative to blocked isocyanate groups) of 2-methyl-2-butanol was added to the resultant to allow the reaction to proceed at 80° C. for 3 hours while removing generated isopropyl alcohol by conducting distillation under ordinary pressure. Then, isopropanol and 2-methyl-2-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-a2-12.

Example 2-13

(Preparation of Blocked Polyisocyanate Composition BL-a2-13)

100 parts by mass of the polyisocyanate P2-3 obtained in the Synthesis Example 2-3, 43.9 parts by mass (70% by mol relative to 100% by mol of NCO groups) of diisopropyl malonate and 24.4 parts by mass (30% by mol relative to 100% by mol of NCO groups) of di(2-methyl-2-butyl) malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-a2-13 having a solid content of 60% by mass.

Comparative Example 2-1

Preparation of Blocked Polyisocyanate Composition BL-b2-1

100 parts by mass of the polyisocyanate P2-3 obtained in the Synthesis Example 2-3, 43.9 parts by mass (70% by mol relative to 100% by mol of NCO groups) of diisopropyl malonate and 50.5 parts by mass (30% by mol relative to 100% by mol of NCO groups) of di-tert-butyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-b2-1 having a solid content of 60% by mass.

Comparative Example 2-2

(Preparation of Blocked Polyisocyanate Composition BL-b2-2)

100 parts by mass of the polyisocyanate P2-3 obtained in the Synthesis Example 2-3 and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-b2-2 having a solid content of 60% by mass.

Comparative Example 2-3

(Preparation of Blocked Polyisocyanate Composition BL-b2-3)

100 parts by mass of the polyisocyanate P2-3 obtained in the Synthesis Example 2-3 and 54.3 parts by mass (102% by mol relative to 100% by mol of NCO groups) of diethyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-b2-3 having a solid content of 60% by mass.

Comparative Example 2-4

(Preparation of Blocked Polyisocyanate Composition BL-b2-4)

100 parts by mass of the polyisocyanate P2-3 obtained in the Synthesis Example 2-3 and 63.9 parts by mass (102% by mol relative to 100% by mol of NCO groups) of diisopropyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining an intermediate of a blocked polyisocyanate composition, the solid content of the intermediate being 60% by mass. Then, 49.3 parts by mass (150% by mol relative to blocked isocyanate groups) was added to the resultant to allow the reaction to proceed at 80° C. for 5 hours under reflux. Then, isopropanol and tert-butanol were distilled away at 60° C. under reduced pressure (50 kPa), and finally dipropylene glycol dimethyl ether (DPDM) was added to the resultant to adjust the solid content to 60% by mass, thereby obtaining a blocked polyisocyanate composition BL-b2-4.

Comparative Example 2-5

(Preparation of Blocked Polyisocyanate Composition BL-b2-5)

100 parts by mass of the polyisocyanate P2-3 obtained in the Synthesis Example 2-3 and 73.4 parts by mass (102% by mol relative to 100% by mol of NCO groups) of di-tert-butyl malonate were charged into a four-necked flask equipped with a thermometer, a stirrer blade and a reflux cooling tube in a nitrogen gas flow, followed by further adding dipropylene glycol dimethyl ether (DPDM) thereto to adjust the solid content to 60% by mass. Then, 1.0 part by mass of a methanol solution containing sodium methylate (28% by mass relative to the total mass of the solution) was added dropwise while conducting stirring, followed by adjusting an outer bath such that the solution temperature was 55° C. to allow the blocking reaction to proceed at 55° C. for 5 hours, thereby obtaining a blocked polyisocyanate composition BL-b2-5 having a solid content of 60% by mass.

Measurement results and evaluation results obtained by the above-mentioned methods relating to physical properties of the blocked polyisocyanate compositions obtained in Examples and Comparative Examples are shown in the following tables.

TABLE 13

|  |  |  | Example 2-1 | Example 2-2 | Example 2-3 | Example 2-4 | Example 2-5 |
|---|---|---|---|---|---|---|---|
|  | Blocked polyisocyanate composition |  | BL-a2-1 | BL-a2-2 | BL-a2-3 | BL-a2-4 | BL-a2-5 |
| Constitution | Polyisocyanate |  | P2-3 | P2-3 | P2-3 | P2-3 | P2-3 |
|  | Constitution unit (I) | $R^{11}$ | Propyl group | Ethyl group | Ethyl group | Ethyl group | Ethyl group |
|  |  | $R^{12}$ | Methyl group | Methyl group | Methyl group | Methyl group | Methyl group |
|  |  | $R^{13}$ | Methyl group | Methyl group | Methyl group | Methyl group | Methyl group |
|  |  | $R^{14}$ | H | H | H | H | H |
|  |  | $R^{15}$ | Methyl group | Methyl group | Methyl group | Methyl group | Methyl group |
|  |  | $R^{16}$ | Methyl group | Methyl group | Methyl group | Methyl group | Methyl group |
|  | Constitution unit (II) | $R^{21}$ | Methyl group | Methyl group | Methyl group | Methyl group | Methyl group |
|  |  | $R^{22}$ | Methyl group | Methyl group | Methyl group | Methyl group | Methyl group |
|  |  | $R^{23}$ | Methyl group | Methyl group | Methyl group | Methyl group | Methyl group |
|  |  | $R^{24}$ | Methyl group | Methyl group | Methyl group | Methyl group | Methyl group |
|  | Molar ratio (Constitution unit (II)/Constitution unit (I)) |  | 70/30 | 70/30 | 80/20 | 90/10 | 50/50 |
|  | Molar ratio (Constitution unit (I-1)/Constitution unit (I)) |  | 100% | 100% | 95% | 98% | 100% |
|  | Amount of alcohol (% by mass) |  | 0% | 0% | 3% | 0.1% | 0% |

TABLE 14

| Blocked polyisocyanate composition | | | Example 2-6 BL-a2-6 | Example 2-7 BL-a2-7 | Example 2-8 BL-a2-8 | Example 2-9 BL-a2-9 | Example 2-10 BL-a2-10 |
|---|---|---|---|---|---|---|---|
| Constitution | Polyisocyanate | | P2-3 | P2-3 | P2-3 | P2-4 | P2-3 |
| | Constitution unit (I) | $R^{11}$ | Ethyl group | Ethyl group | Ethyl group | Ethyl group | Propyl group |
| | | $R^{12}$ | Methyl group | Methyl group | Ethyl group | Ethyl group | Ethyl group |
| | | $R^{13}$ | Methyl group | Methyl group | Methyl group | Methyl group | Ethyl group |
| | | $R^{14}$ | H | H | H | H | H |
| | | $R^{15}$ | Methyl group | H | Methyl group | Methyl group | Methyl group |
| | | $R^{16}$ | Methyl group | Methyl group | Methyl group | Methyl group | Methyl group |
| | Constitution unit (II) | $R^{21}$ | Methyl group | H | Methyl group | Methyl group | Methyl group |
| | | $R^{22}$ | Methyl group | Methyl group | Methyl group | Methyl group | Methyl group |

TABLE 14-continued

| Blocked polyisocyanate composition | | Example 2-6 BL-a2-6 | Example 2-7 BL-a2-7 | Example 2-8 BL-a2-8 | Example 2-9 BL-a2-9 | Example 2-10 BL-a2-10 |
|---|---|---|---|---|---|---|
| | $R^{23}$ | Methyl group | H | Methyl group | Methyl group | Methyl group |
| | $R^{24}$ | Methyl group | Methyl group | Methyl group | Methyl group | Methyl group |
| Molar ratio (Constitution unit (II)/ Constitution unit (I)) | | 96/4 | 80/20 | 80/20 | 80/20 | 80/20 |
| Molar ratio (Constitution unit (I-1)/ Constitution unit (I)) | | 100% | 96% | 95% | 95% | 95% |
| Amount of alcohol (% by mass) | | 0% | 3% | 15% | 15% | 15% |

TABLE 15

| | | | Example 2-11 | Example 2-12 | Example 2-13 |
|---|---|---|---|---|---|
| Blocked polyisocyanate composition | | | BL-a2-11 | BL-a2-12 | BL-a2-13 |
| Constitution | Polyisocyanate | | P2-3 | P2-3 | P2-3 |
| | Constitution unit (I) | $R^{11}$ | Ethyl group | Ethyl group | Ethyl group |
| | | $R^{12}$ | Methyl group | Methyl group | Methyl group |
| | | $R^{13}$ | Methyl group | Methyl group | Methyl group |
| | | $R^{14}$ | H | H | Ethyl group |
| | | $R^{15}$ | Methyl group | Methyl group | Methyl group |
| | | $R^{16}$ | Methyl group | Methyl group | Methyl group |
| | Constitution unit (II) | $R^{21}$ | Methyl group | Methyl group | Methyl group |
| | | $R^{22}$ | Methyl group | Methyl group | Methyl group |
| | | $R^{23}$ | Methyl group | Methyl group | Methyl group |
| | | $R^{24}$ | Methyl group | Methyl group | Methyl group |
| Molar ratio (Constitution unit (II)/ Constitution unit (I)) | | | 20/80 | 35/65 | 70/30 |
| Molar ratio (Constitution unit (I-1)/ Constitution unit (I)) | | | 100% | 85% | 0% |
| Amount of alcohol (% by mass) | | | 0% | 12% | 0% |

TABLE 16

| | | | C. Example 2-1 BL-b2-1 | C. Example 2-2 BL-b2-2 | C. Example 2-3 BL-b2-3 | C. Example 2-4 BL-b2-4 | C. Example 2-5 BL-b2-5 |
|---|---|---|---|---|---|---|---|
| Blocked polyisocyanate composition | | | | | | | |
| Constitution | Polyisocyanate | | P2-3 | P2-3 | P2-3 | P2-3 | P2-3 |
| | Constitution unit (I) | $R^{11}$ | Methyl group | — | — | Methyl group | Methyl group |
| | | $R^{12}$ | Methyl group | — | — | Methyl group | Methyl group |
| | | $R^{13}$ | Methyl group | — | — | Methyl group | Methyl group |
| | | $R^{14}$ | Methyl group | — | — | H | Methyl group |
| | | $R^{15}$ | Methyl group | — | — | Methyl group | Methyl group |
| | | $R^{16}$ | Methyl group | — | — | Methyl group | Methyl group |
| | | $R^{21}$ | Methyl group | Methyl group | H | Methyl group | — |
| | | $R^{22}$ | Methyl group | Methyl group | Methyl group | Methyl group | — |
| | | $R^{23}$ | Methyl group | Methyl group | H | Methyl group | — |
| | | $R^{24}$ | Methyl group | Methyl group | Methyl group | Methyl group | — |
| | Molar ratio (Constitution unit (II)/Constitution unit (I)) | | 70/30 | 100/0 | 100/0 | 70/30 | 0/00 |
| | Molar ratio (Constitution unit (I-1)/Constitution unit (I)) | | 0% | | | 93% | 0% |
| | Amount of alcohol (% by mass) | | 0% | 0% | 0% | 8% | 0% |

C. Example: Comparative Example

TABLE 17

| | | Example 2-1 | Example 2-2 | Example 2-3 | Example 2-4 | Example 2-5 |
|---|---|---|---|---|---|---|
| Physical properties | Average NCO number | 5.0 | 5.0 | 5.0 | 5.0 | 5.0 |
| | Solid content (% by mass) | 60 | 60 | 60 | 60 | 60 |
| Evaluation | Low-temperature curability | A | A | B | C | A |
| | Koenig hardness | A | A | A | B | A |
| | Storage stability | B | B | A | A | C |
| | Solvent resistance | A | A | A | A | A |

TABLE 18

| | | Example 2-6 | Example 2-7 | Example 2-8 | Example 2-9 | Example 2-10 |
|---|---|---|---|---|---|---|
| Physical properties | Average NCO number | 5.0 | 5.0 | 5.0 | 3.2 | 5.0 |
| | Solid content (% by mass) | 60 | 60 | 60 | 60 | 60 |
| Evaluation | Low-temperature curability | C | C | B | C | C |
| | Koenig hardness | B | B | A | B | B |
| | Storage stability | A | A | A | A | A |
| | Solvent resistance | A | A | A | B | B |

TABLE 19

| | | Example 2-11 | Example 2-12 | Example 2-13 |
|---|---|---|---|---|
| Physical properties | Average NCO number | 5.0 | 5.0 | 5.0 |
| | Solid content (% by mass) | 60 | 60 | 60 |
| Evaluation | Low-temperature curability | A | A | A |
| | Koenig hardness | A | A | A |
| | Storage stability | D | C | D |
| | Solvent resistance | A | A | A |

TABLE 20

|  |  | C. Example 2-1 | C. Example 2-2 | C. Example 2-3 | C. Example 2-4 | C. Example 2-5 |
|---|---|---|---|---|---|---|
| Physical properties | Average NCO number | 5.0 | 5.0 | 5.0 | 5.0 | 5.0 |
|  | Solid content (% by mass) | 60 | 60 | 60 | 60 | 60 |
| Evaluation | Low-temperature curability | A | D | E | A | A |
|  | Koenig hardness | A | C | D | B | A |
|  | Storage stability | E | A | A | E | F |
|  | Solvent resistance | A | C | D | A | A |

C. Example: Comparative Example

As shown in Tables 13 to 20, the blocked polyisocyanate compositions BL-a2-1 to BL-a2-10 (Examples 2-1 to 2-10) in which the total carbon number of $R^{11}$, $R^{12}$ and $R^{13}$ in the constitution unit (I) was 4 or more exhibited favorable storage stability of the resultant resin compositions and favorable solvent resistance of the resultant resin films, particularly.

When the blocked polyisocyanate compositions BL-a2-2 to BL-a2-6 (Examples 2-2 to 2-6) in which the molar ratios of the constitution unit (II)/the constitution unit (I) were different from each other were compared, there was a tendency that a decrease in the molar ratio of the constitution unit (II)/the constitution unit (I) improved the low-temperature curability and the Koenig hardness of the resultant resin film. In contrast, there was a tendency that an increase in the molar ratio of the constitution unit (II)/the constitution unit (I) improved the storage stability.

When the blocked polyisocyanate compositions BL-a2-3 and BL-a2-10 (Examples 2-3 and 2-10) in which alkyl groups as $R^{11}$, $R^{12}$ and $R^{13}$ in the constitution unit (I) were different from each other were compared, the blocked polyisocyanate composition BL-a2-3 in which the total carbon number of $R^{11}$, $R^{12}$ and $R^{13}$ was 4 tended to exhibit more excellent low-temperature curability, Koenig hardness and solvent resistance of the resultant resin film.

When the blocked polyisocyanate compositions BL-a2-3 and BL-a2-7 (Examples 2-3 and 2-7) in which the type of the blocking agent causing the constitution unit (II) was different from each other were compared, the blocked polyisocyanate composition BL-a2-3 in which diisopropyl malonate was used tended to exhibit more excellent low-temperature curability and Koenig hardness of the resultant resin film than the blocked polyisocyanate composition BL-a2-7 in which diethyl malonate was used.

When the blocked polyisocyanate compositions BL-a2-8 and BL-a2-9 (Examples 2-8 and 2-9) in which the type of the polyisocyanate used in the blocking reaction was different from each other were compared, the blocked polyisocyanate composition BL-a2-8 in which a polyisocyanate having a larger average number of isocyanate groups was used tended to exhibit more excellent low-temperature curability and Koenig hardness of the resultant resin film.

In contrast, although the blocked polyisocyanate composition BL-b2-1 (Comparative Example 2-1), the blocked polyisocyanate composition BL-b2-4 (Comparative Example 2-4) and the blocked polyisocyanate composition BL-b2-5 (Comparative Example 2-5) in which the total carbon number of $R^{11}$, $R^{12}$ and $R^{13}$ in the constitution unit (I) was 3 exhibited favorable low-temperature curability, Koenig hardness and solvent resistance of the resultant resin film, the storage stability when made into an aqueous resin composition was deteriorated.

Although the blocked polyisocyanate composition BL-b2-2 (Comparative Example 2-2) and the blocked polyisocyanate BL-b2-3 (Comparative Example 2-3) in which no constitution unit (I) was contained exhibited favorable storage stability when made into an aqueous resin composition, the low-temperature curability, the Koenig hardness, and the solvent resistance of the resultant resin film were deteriorated.

INDUSTRIAL APPLICABILITY

The blocked polyisocyanate composition according to the present embodiment makes it possible to provide a blocked polyisocyanate composition which exhibits favorable storage stability of the resultant resin composition as well as excellent curability at a low temperature of about 80° C., hardness and strength when made into a coating film.

The invention claimed is:

1. A blocked polyisocyanate composition comprising a blocked polyisocyanate derived from an active hydrogen compound, a polyisocyanate and a blocking agent comprising a malonic acid ester, wherein the active hydrogen compound has both a number-average molecular weight of 60 to 5,000 and an average number of functional groups of 1.6 to 2.4, and an amount of a constitution unit derived from the active hydrogen compound relative to 100 parts by mass of a constitution unit derived from the polyisocyanate is 0.05 parts by mass to 10 parts by mass.

2. The blocked polyisocyanate composition according to claim 1, wherein the active hydrogen compound is a polyol A.

3. The blocked polyisocyanate composition according to claim 2, wherein the polyol A is at least one polyol selected from the group consisting of 1,4-butanediol, 1,6-hexanediol, 3-methyl-1,5-pentanediol, 1,4-cyclohexanedimethanol, glycerol, and polycaprolactone polyols derived therefrom with ε-caprolactone.

4. The blocked polyisocyanate composition according to claim 1, wherein the polyisocyanate has an average number of isocyanate groups of 3.5 or more, has an isocyanurate group, and, is a polyisocyanate derived from at least one diisocyanate selected from the group consisting of aliphatic diisocyanates and alicyclic diisocyanates.

5. The blocked polyisocyanate composition according to claim 1, wherein the polyisocyanate is derived from a diisocyanate and a polyol B having an average number of functional groups of 2.9 to 8.0.

6. The blocked polyisocyanate composition according to claim 1,
   wherein the blocked polyisocyanate comprises a constitution unit of general formula (I):

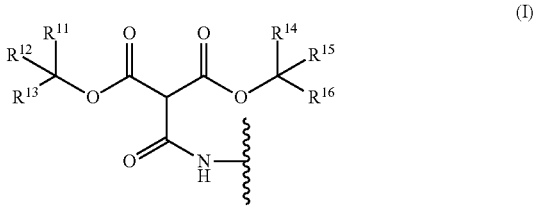

(I)

in the general formula (I), $R^{11}$, $R^{12}$ and $R^{13}$ are each independently an alkyl group which may have at least one substituent selected from the group consisting of a hydroxy group and an amino group, a total carbon number of $R^{11}$, $R^{12}$ and $R^{13}$ is 3 to 20, $R^{14}$, $R^{15}$ and $R^{16}$ are each independently a hydrogen atom or an alkyl group which may have at least one substituent selected from the group consisting of a hydroxy group and an amino group, and a wavy line indicates a bond.

7. The blocked polyisocyanate composition according to claim 6,
   wherein in the general formula (I), the total carbon number of $R^{11}$, $R^{12}$ and $R^{13}$ is 4 to 20.

8. The blocked polyisocyanate composition according to claim 6, comprising a constitution unit (I-1) in which, in the general formula (I), the total carbon number of $R^{11}$, $R^{12}$ and $R^{13}$ is 4 to 20 and $R^{16}$ is a hydrogen atom, as the constitution unit of general formula (I).

9. The blocked polyisocyanate composition according to claim 6, comprising a constitution unit in which, in the general formula (I), $R^{11}$, $R^{12}$ and $R^{13}$ are each independently an unsubstituted alkyl group and $R^{14}$, $R^{15}$ and $R^{16}$ are each independently a hydrogen atom or an unsubstituted alkyl group, as the constitution unit of the general formula (I).

10. The blocked polyisocyanate composition according to claim 6,
    wherein the active hydrogen compound is a polyol A, and a molar ratio of hydroxy groups contained in the polyol A to the constitution unit of the general formula (I) is 0.5/99.5 to 15/85.

11. The blocked polyisocyanate composition according to claim 1,
    wherein the blocked polyisocyanate partially comprises a constitution unit derived from a hydrophilic compound.

12. The blocked polyisocyanate composition according to claim 11,
    wherein the hydrophilic compound comprises at least one compound selected from the group consisting of nonionic compounds and anionic compounds.

13. The blocked polyisocyanate composition according to claim 1,
    wherein the blocking agent comprises a malonic acid ester having a secondary alkyl group.

14. A resin composition comprising:
    the blocked polyisocyanate composition of claim 1; and a polyvalent hydroxy compound.

15. A resin film formed by curing the resin composition of claim 14.

16. A layered body comprising at least two layers of the resin film of claim 15, constitutions of the at least two layers being different from each other,
    wherein each layer thickness of the layered body is 1 m to 50 m.

17. A preparation method of the blocked polyisocyanate composition of claim 1, comprising:
    first reacting the polyisocyanate and the blocking agent containing the malonic acid ester to form a polyisocyanate in which isocyanate groups are partially or entirely blocked by the blocking agent; and
    second reacting the polyisocyanate in which isocyanate groups are partially or entirely blocked by the blocking agent obtained in the first reacting and the active hydrogen compound.

18. A blocked polyisocyanate composition comprising a blocked polyisocyanate derived from a polyisocyanate and at least one blocking agent,
    wherein the blocked polyisocyanate comprises a constitution unit of general formula (I):

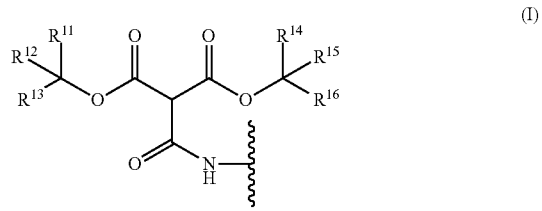

(I)

in the general formula (I), $R^{11}$, $R^{12}$ and $R^{13}$ are each independently an alkyl group which may have at least one substituent selected from the group consisting of a hydroxy group and an amino group, a total carbon number of $R^{11}$, $R^{12}$ and $R^{13}$ is 4 to 20, $R^{14}$, $R^{15}$ and $R^{16}$ are each independently a hydrogen atom or an alkyl group which may have at least one substituent selected from the group consisting of a hydroxy group and an amino group, and a wavy line indicates a bond, and a constitution unit of general formula (II):

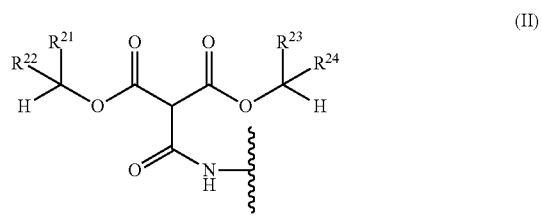

(II)

in the general formula (II), $R^{21}$, $R^{22}$, $R^{23}$ and $R^{24}$ are each independently a hydrogen atom or an alkyl group which may have at least one substituent selected from the group consisting of a hydroxy group and an amino group, and a wavy line indicates a bond,
wherein a molar ratio of the constitution unit of general formula (II) to the constitution unit of general formula (I) is 4/96 to 96/4.

19. The blocked polyisocyanate composition according to claim 18, comprising a constitution unit (I-1) in which $R^{16}$ is a hydrogen atom as the constitution unit of the general formula (I).

20. The blocked polyisocyanate composition according to claim 18,
wherein in the general formula (I) $R^{11}$, $R^{12}$ and $R^{13}$ are each independently a methyl group or an ethyl group.

21. The blocked polyisocyanate composition according to claim 18,
wherein isocyanate groups of the polyisocyanate are partially modified by a nonionic compound.

22. The blocked polyisocyanate composition according to claim 18,
wherein the polyisocyanate has an average number of isocyanate groups of 2 or more.

23. The blocked polyisocyanate composition according to claim 18,
wherein the polyisocyanate is a polyisocyanate derived from at least one diisocyanate selected from the group consisting of aliphatic diisocyanates and alicyclic diisocyanates.

24. The blocked polyisocyanate composition according to claim 18,
wherein the blocked polyisocyanate has an isocyanurate group.

25. A resin composition comprising:
the blocked polyisocyanate composition of claim 18; and a polyvalent hydroxy compound.

26. A resin film formed by curing the resin composition of claim 25.

27. A layered body comprising at least two layers of the resin film of claim 26, constitutions of the at least two layers being different from each other,
wherein each layer thickness of the layered body is 1 µm to 50 µm.

28. A blocked polyisocyanate composition comprising a blocked polyisocyanate derived from an active hydrogen compound, a polyisocyanate and a blocking agent comprising a malonic acid ester, wherein
the active hydrogen compound has both a number-average molecular weight of 60 to 5,000 and an average number of functional groups of 1.6 to 2.4, and is a polyol A,
the blocked polyisocyanate comprises a constitution unit of general formula (I):

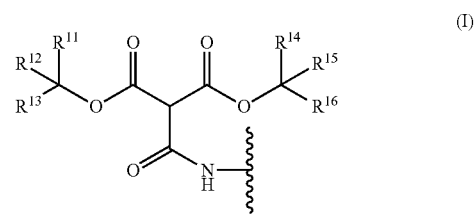

in the general formula (I), $R^{11}$, $R^{12}$ and $R^{13}$ are each independently an alkyl group which may have at least one substituent selected from the group consisting of a hydroxy group and an amino group, a total carbon number of $R^{11}$, $R^{12}$ and $R^{13}$ is 3 to 20, $R^{14}$, $R^{15}$ and $R^{16}$ are each independently a hydrogen atom or an alkyl group which may have at least one substituent selected from the group consisting of a hydroxy group and an amino group, and a wavy line indicates a bond, and
a molar ratio of hydroxy groups contained in the polyol A to the constitution unit of the general formula (I) is 0.5/99.5 to 15/85.

* * * * *